United States Patent
Jann et al.

(10) Patent No.: US 10,740,121 B2
(45) Date of Patent: Aug. 11, 2020

(54) USER INTERFACE FOR NAVIGATING MULTIPLE APPLICATIONS

(71) Applicant: SAP SE, Walldorf (DE)

(72) Inventors: Florian Jann, Heidelberg (DE); Kai Richter, Muehtal (DE); Michael Krenkler, Wiesloch (DE); Jeong-Sook Lee, Walldorf (DE); Jamila Schon, Heidelberg (DE); Emil Voutta, Heidelberg (DE); Tina Rauschenbach, Mannheim (DE); Marc Ziegler, Mauer (DE); David Drayton, Mannheim (DE); Martin Hensel, Karlsbad (DE); Ralf Kaltenmaier, Wiesloch (DE); Carolin Seel, Heidelberg (DE); Janos Varadi, Ludwigshafen (DE); Marcus Nitsche, Bruchsal (DE)

(73) Assignee: SAP SE, Walldorf (DE)

( * ) Notice: Subject to any disclaimer, the term of this patent is extended or adjusted under 35 U.S.C. 154(b) by 39 days.

(21) Appl. No.: 16/016,107

(22) Filed: Jun. 22, 2018

(65) Prior Publication Data
US 2019/0391825 A1    Dec. 26, 2019

(51) Int. Cl.
*G06F 9/451* (2018.01)
*G06F 8/38* (2018.01)
*G06F 3/0484* (2013.01)
*G06F 3/0482* (2013.01)

(52) U.S. Cl.
CPC .......... *G06F 9/451* (2018.02); *G06F 3/0482* (2013.01); *G06F 3/04847* (2013.01); *G06F 8/38* (2013.01)

(58) Field of Classification Search
CPC ........ G06F 9/451; G06F 8/38; G06F 3/04847; G06F 3/04842
See application file for complete search history.

(56) References Cited

U.S. PATENT DOCUMENTS

| | | | |
|---|---|---|---|
| 7,620,890 B2 * | 11/2009 | Dietl | G06F 16/9577 715/234 |
| 8,166,491 B2 * | 4/2012 | Weiss | G06F 9/445 719/329 |
| 8,327,351 B2 * | 12/2012 | Paladino | G06F 8/71 717/106 |
| 8,433,729 B2 * | 4/2013 | Eigemann | G06F 8/38 707/796 |
| 8,612,806 B2 * | 12/2013 | Rossi | G06F 11/263 714/47.1 |
| 8,893,078 B2 * | 11/2014 | Schaude | G06Q 10/06 717/105 |
| 9,098,384 B2 * | 8/2015 | Barak | G06F 17/00 |
| 9,600,681 B2 * | 3/2017 | Evers | G06F 21/6218 |
| 9,904,452 B2 * | 2/2018 | Volkmer | G06F 3/04847 |
| 10,169,055 B2 * | 1/2019 | Eska | G06F 21/31 |
| 10,353,534 B2 * | 7/2019 | Grammatikakis | G06F 3/0481 |
| 10,430,035 B2 * | 10/2019 | Richter | G06F 3/04847 |

(Continued)

*Primary Examiner* — Maikhanh Nguyen
(74) *Attorney, Agent, or Firm* — Fish & Richardson P.C.

(57) ABSTRACT

In one general aspect, a method and system are described for identifying a plurality of functions associated with an application that is operable on a first software platform, identifying a plurality of user interface aspects of the application, identifying a plurality of navigational aspects of the application, generating a reformatted user interface capable of executing the plurality of functions on a second software platform.

17 Claims, 46 Drawing Sheets

(56) References Cited

U.S. PATENT DOCUMENTS

| | | | |
|---|---|---|---|
| 2005/0160371 A1* | 7/2005 | Karson | G06Q 50/22 715/777 |
| 2007/0136676 A1* | 6/2007 | Kruempelmann | G06F 16/9038 715/764 |
| 2008/0134220 A1* | 6/2008 | Weiss | G06F 9/445 719/329 |
| 2011/0270721 A1* | 11/2011 | Kusterer | G06Q 30/04 705/32 |
| 2012/0029929 A1* | 2/2012 | Schaude | G06Q 10/06 705/1.1 |
| 2013/0159784 A1* | 6/2013 | Rossi | G06F 11/3684 714/47.1 |
| 2017/0064004 A1* | 3/2017 | Volkmer | G06F 3/04847 |

\* cited by examiner

295

```
{   "_version": "2.0",
    "identification": {
        "id": "z_why_test_grp_01",
        "layer": "vendor",
        "title": "{{group_title}}",
        "entityType": "group",
        "i18n": "i18n/5D17527DF375974ECBFEB0E423FBC56E.properties"
    },
    "payload": {
        "tiles": [{
            "id": "0002TR8035SI47IE62FR3GM7P",
"appId": "appId1"
}, {
            "id": "0002TR8035SJUP6AW43TU86L0",
            "icon": "sap-icon://Fiori2/F0018",
    "appId": "appId2"
        }],
        "links": [{
            "id": "0002TR8035SI47IE8RZST4OS8",
            "target": {
 "appId": "appId3"
}
        }]
    }
}
```

| Order ID | Status | Changed At | user | Contact Person | Quantity | Total Gross Amount |
|---|---|---|---|---|---|---|
| 500000000 | Paid | 8/ | | | 22.000 EA | 14,385.85 USD > |
| 50000001 | Paid | 8/ | | | 22.000 EA | 15,117.76 USD > |
| 50000002 | Paid | 8/ | *Variant Name 1222 | | 14.000 EA | 5,631.08 USD > |
| 50000003 | Paid | 8/ | Paid Orders | | 11.000 EA | 1,704 USD > |
| 50000004 | Paid | 8/1 | | | 9.000 EA | 761.24 USD > |
| 50000005 | Paid | 8/1 | ☐ Use as Default  ☐ Share 1223 | | 15.000 EA | 101,299.22 USD > |
| 50000005 | Paid | 8/1 | | | 7.000 EA | 101,299.22 USD > |
| 50000007 | Paid | 8/1 | ☐ Execute on Select ☒ Create as Tile | | 15.000 EA | 250.73 USD > |
| 50000008 | Paid | 8/1 | 1224 | | 12.000 EA | 9,715.16 USD > |
| 50000009 | Paid | 8/1 | Ok   Cancel | | 6.000 EA | 3,972.22 USD > |
| 50000010 | Delivered | 8/1 | | | 15.000 EA | 827.95 USD > |
| 50000011 | Delivered | 8/18/15,12:00AM | Panorama Studios(100000004) | Angelica Pretelini | 8.000 EA | 325.94 USD > |
| 50000012 | Delivered | 8/18/15,12:00AM | TECUM(100000005) | Nicole Bohm | 19.000 EA | 12,704.40 USD > |
| 50000013 | Delivered | 8/18/15,12:00AM | Asia High Tech(100000006) | Angelica Pretelini | 15.000 EA | 8,996.40 USD > |
| 50000014 | Delivered | 8/18/15,12:00AM | Asia High Tech(100000006) | Hidehisa Koshiishi | 9.000 EA | 3,459.33 USD > |
| 50000015 | Delivered | 8/19/15,12:00AM | AVANTEL(100000008) | Timothy Oshaughnessy | 19.000 EA | 862.73 USD > |
| 50000016 | Delivered | 8/20/15,12:00AM | Panorama Studios(100000004) | Hidehisa Koshiishi | 5.000 EA | 70.18 USD > |

FIG. 12D

| | | | | | | | 1225 |
|---|---|---|---|---|---|---|---|
Paid Orders — 1226

SAP — Manage Orders

Editing Status: Paid — 1228    Order ID:    Status:    Changed At:    Adapt Filters (1) [Go]
1227

Orders (500)

| | Status | Changed At | user | Contact Person | Quantity | Total Gross Amount | |
|---|---|---|---|---|---|---|---|
| ☐ 500000000 | Paid | 8/8/15, 12:00AM | SAP (1000000000) | Harald Gahn | 22.000 EA | 14,385.85 USD | > |
| ☐ 50000001 | Paid | 8/8/15, 12:00AM | DelBont Industries (1000000002) | Sam Pelt | 22.000 EA | 15,117.76 USD | > |
| ☐ 50000002 | Paid | 8/8/15, 12:00AM | TECUM (1000000005) | Nicole Bohm | 14.000 EA | 5,631.08 USD | > |
| ☐ 50000003 | Paid | 8/9/15, 12:00AM | Asia High Tech(1000000006) | Hidehisa Koshiishi | 11.000 EA | 1,704 USD | > |
| ☐ 50000004 | Paid | 8/11/15, 12:00AM | Asia High Tech(1000000006) | Hidehisa Koshiishi | 9.000 EA | 761.24 USD | > |
| ☐ 50000005 | Paid | 8/11/15, 12:00AM | AVANTEL(1000000008) | Angelica Pretelini | 15.000 EA | 101,299.22 USD | > |
| ☐ 50000005 | Paid | 8/13/15, 12:00AM | Talpa(1000000003) | Julia Pfeffer | 7.000 EA | 101,299.22 USD | > |
| ☐ 50000007 | Paid | 8/15/15, 12:00AM | Panorama Studios(1000000004) | Timothy Oshaughnessy | 15.000 EA | 250.73 USD | > |
| ☐ 50000008 | Paid | 8/16/15, 12:00AM | Telecommunicationes Star(100000009) | Nicole Bohm | 12.000 EA | 9,715.16 USD | > |
| ☐ 50000009 | Paid | 8/16/15, 12:00AM | SAP(1000000000) | Hidehisa Koshiishi | 6.000 EA | 3,972.22 USD | > |
| ☐ 50000010 | Delivered | 8/17/15, 12:00AM | DelBont Industries(1000000002) | Hidehisa Koshiishi | 15.000 EA | 827.95 USD | > |
| ☐ 50000011 | Delivered | 8/18/15, 12:00AM | Panorama Studios(1000000004) | Angelica Pretelini | 8.000 EA | 325.94 USD | > |
| ☐ 50000012 | Delivered | 8/18/15, 12:00AM | TECUM(1000000005) | Nicole Bohm | 19.000 EA | 12,704.40 USD | > |
| ☐ 50000013 | Delivered | 8/18/15, 12:00AM | Asia High Tech(1000000006) | Angelica Pretelini | 15.000 EA | 8,996.40 USD | > |
| ☐ 50000014 | Delivered | 8/18/15, 12:00AM | Asia High Tech(1000000006) | Hidehisa Koshiishi | 9.000 EA | 3,459.33 USD | > |
| ☐ 50000015 | Delivered | 8/19/15, 12:00AM | AVANTEL(1000000008) | Timothy Oshaughnessy | 19.000 EA | 862.73 USD | > |
| ☐ 50000016 | Delivered | 8/20/15, 12:00AM | Panorama Studios(1000000004) | Hidehisa Koshiishi | 5.000 EA | 70.18 USD | > |

Search Results (60) — 1342

300000030 Purchase Order
- Company Name (user): Company A
- Tax Amount: 843,77 EUR
- Confirmation Status: Confirmed
- user ID: 100000031
- Purchase Order Lifecycle..: Closed
- Ordering Status: Delivered
- Gross Amount: 5.284,70 EUR
- Changed At: 01-04-2016 00:00:00
- Invoicing Status: Invoiced
- Net Amount: 4.440,93 EUR
- Approval Status: Approved
- Note Text: EPM DG:PO ID 0300000030 <html>.

300000031 Order
- Company Name (user): Company B
- user ID: 100000024
- Gross Amount: 18.361,08 EUR
- Net Amount: 15.423,00 EUR

300000032 Order
- Company Name (user): Company C
- user ID: 100000039
- Gross Amount: 1.502,97 EUR
- Net Amount: 1.263,00 EUR

300000033 Order
- Company Name (user): Company D
- user ID: 100000029
- Gross Amount: 4.276,86 EUR
- Net Amount: 3.594,00 EUR

300000034 Order
- Company Name (user): Company E
- user ID: 100000001
- Gross Amount: 3.101,12 EUR
- Net Amount: 2.605,98 EUR

300000035 Order

---

Search In: All — 579
Filter By — Purchase Orders — 60 (1344)
Approval Status: Rejected / Initial / Approved
Lifecycle Status: In Progress 15, Cancelled, Rejected (1338b)
Confirmation Status: Initial — 34

| API Outline |
|---|

```
sap.ui.define(
    [
        'sap/ui/base/object'
    ],function(object) {
    "use strict";
    Var SmartNavigation =object .extend ("sap .usehell .services .SmartLinks" , {
        Init Service :function () {
            // initialization logic here for usehell only
            // -- > attach to hash changed event and exclude tracking for all consumers that
did not register for ths service
        },
        /*
            public function to be called by the application using
            returns promise that resolves with the sorted links based on clicks
        */
        get SortedLinks : function (oconfig) {
    // Some logic here to initialize container if not already present
            var clicks =oContainers ["currentApp"] . container .getItemValue ("containerKey");
            return
sap .ushell.Container .services ("CrossApplicationNavigation") .getLinks (oConfig)
function (oResult) {
                mixin (oResults, oClicks)
            });
        },
        _mixin : function (links , clicks) {
            return new promise (function (resolve , reject) {
                // some superfast mixin logic here
                resolve (sortedLiks) ;
            });
        }
    });
    return SmartLinks .init () ;
})

// api user call like this :
oservice .getSortedLinks ({semanticObject : "Project", paramters :  {A  :  "B"}}) . then (
function (oSortedResults)  {
    // do something with sorted results here.....
})
```

FIG. 13F

API Outline

```
(function() {

// TODO: exclude var oHasher = sap.ushell.Container.getService("ShellNavigation").hashChanger;
  var container;
  myTest = {
    Containers ; { },
    attachEvent : function () {
      oHasher.attachEvent ("ShellHashChanged", function(oEvt) {
        Var data = oEvt.getParameters();
        this.getContainer (data.oldShellhash, data);
      }.bind(this));
    },
    getContainer : function(sCont, oData) {
      var that = this, cont = sCont, data = oData;
      if(this.containers[coun]) {
        var oCont = this.containers [cont];
        oCont.setItemValue (oData.newShellHash.split ("-") [0], JSON.stringify (data));
        oCont.save();
        console.log("x_existing:", data);
        console.log("x_",this.containers);
        return;
      }
      sap.ushell.Container.getService("Personalization"). getContainer (sCont) .then(
function (container) {
        // do the transformation done in the UserRecents helper functions here...
        that.containers [cont] = container;
        container.setItemValue (oData.newShellHash.split("-") [0], 
JSON.stringify (data));
        container.save ();
        console.log ("x_new: ", data);
        console.log ("x_", that.contianers);
      });

}
  }
  myTest.attachEvent ();
})()
```

FIG. 13G

USER INTERFACE FOR NAVIGATING MULTIPLE APPLICATIONS

TECHNICAL FIELD

This description generally relates to user interfaces and user experiences across computing systems and computing networks.

BACKGROUND

Web application platforms may use grid matrix-style home screen hub-and-spoke model user interfaces with the intent to reduce application complexity and increase user productivity across desktop and mobile computing devices. Such user interfaces may include functionality to launch (e.g., open) a selected application. There is a need for applications that, in addition to launching applications, can also provide additional navigation and interoperability of the applications or between the applications.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method is described that includes identifying a plurality of functions of an application operable on a first software platform, identifying a plurality of graphical user interface aspects of the application, and identifying a plurality of navigational aspects of the application. The navigational aspects may include at least one identifier associated with performing each of the plurality of functions of the application. The method may also include generating a reformatted user interface for the application. The reformatted user interface may be capable of executing the plurality of functions on a second software platform.

Generating the reformatted user interface may include modifying the plurality of user interface aspects of the application from an architecture associated with the first software platform into an architecture associated with the second software platform, generating, for the plurality of functions and based on the at least one identifier, user-accessible controls capable of executing one or more of the plurality of functions on the second software platform, and generating at least one functional user interface for the second software platform using, the modified user interface aspects, and one or more of the user-accessible controls. The method may further include triggering display of the at least one functional user interface executing on the second software platform, in response to receiving a request to access the application operable on the first software platform. Other embodiments of this aspect include corresponding computer systems, apparatus, and computer programs recorded on one or more computer storage devices, each configured to perform the actions of the methods.

Implementations may include one or more of the following features. The method as recited above in which the application is a legacy application and the reformatted user interface for the application is generated to replace the legacy application while maintaining functionality of the plurality of functions within the single point of entry environment. The method as recited above in which the first software platform includes an object based navigation platform and the second software platform includes an intent-based navigation platform. The method as recited above may further include providing the reformatted user interface as a selectable object in a single point of entry environment. The reformatted user interface may be operable to provide the at least one user interface and one or more user-accessible controls. The method as recited above in which the navigational aspects of the application invoke execution of a search performed on the second software platform. The search may be performed to match the at least one identifier to a predefined data store of identifiers. The at least one identifier may be defined by a plurality of parameters for executing the application.

The method as recited above in which translating the plurality of user interface aspects of the application from a design associated with the first software platform into a design associated with the second software platform includes modifying the plurality of user interface aspects to include a harmonized visual appearance that is consistent with the second software platform. The method as recited above in which generating user-accessible controls that replicate at least one of the plurality of functions includes extracting, for each of the plurality of functions, one or more control types, behaviors, and functionalities and mapping the one or more control types, behaviors, and functionalities to at least one of the user-accessible controls. Implementations of the described techniques may include hardware, a method or process, or computer software on a computer-accessible medium.

The details of one or more implementations are set forth in the accompanying drawings and the description below. Further features of the disclosed subject matter, its nature and various advantages will be more apparent from the accompanying drawings, the following detailed description, and the appended claims.

BRIEF DESCRIPTION OF THE DRAWINGS

FIG. 2I is an illustration showing notification previews and a launchpad within a viewport, in accordance with the principles of the present disclosure.

FIG. 2O is an example of source code utilized to represent a group by an identifier.

FIGS. 12A-12F depict example screenshots of a graphical user interface for entering an order, in accordance with the principles of the present disclosure.

FIGS. 13A-13E depict example screenshots of a launchpad enterprise search application, in accordance with the principles of the present disclosure.

FIG. 13F shows example source code of an API for a links service.

FIG. 13G shows example source code of a click detection implementation for a get links service.

Like reference symbols in the various drawings indicate like elements.

DETAILED DESCRIPTION

Figure 1:
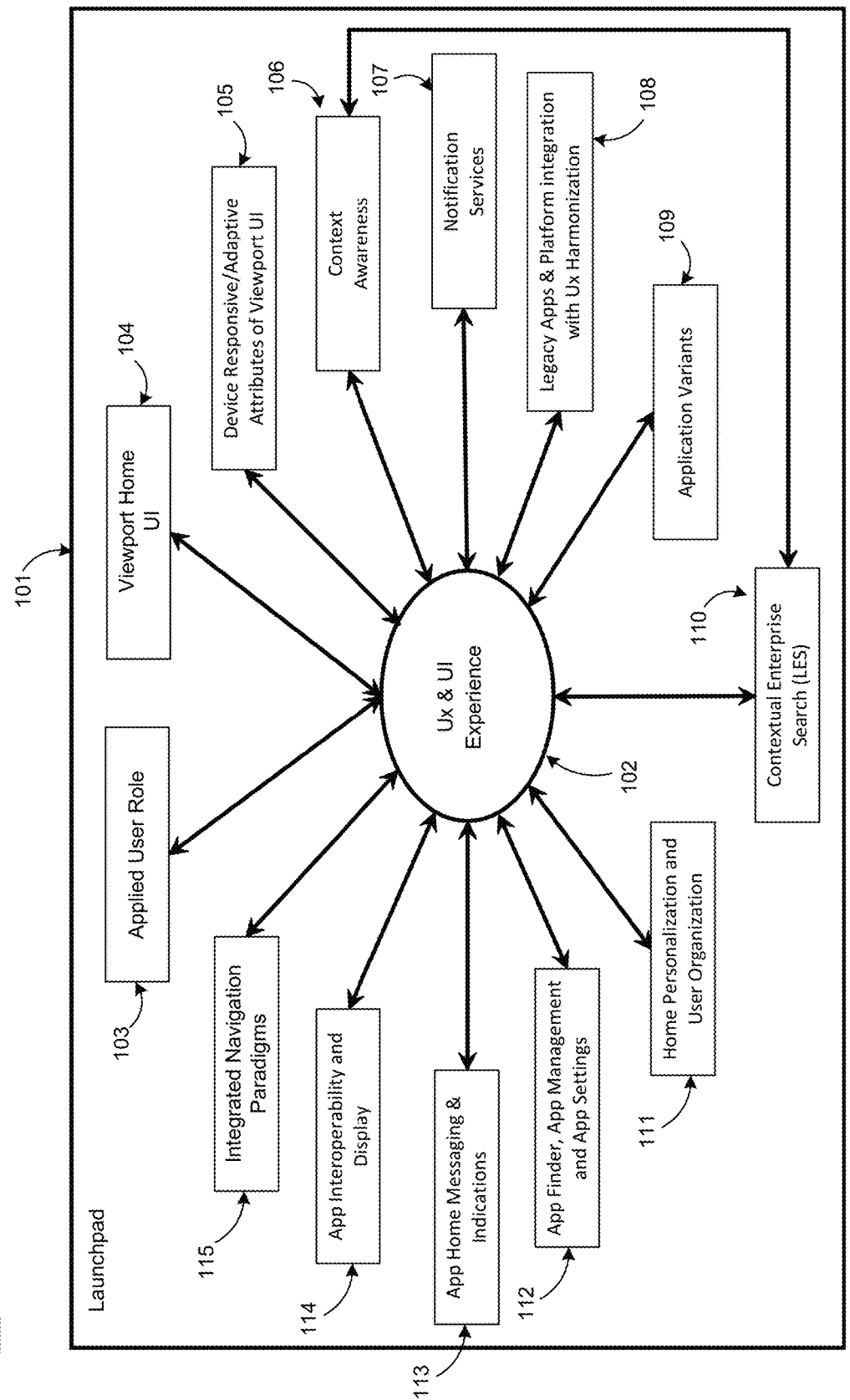
FIG. 1 is an example block diagram of an architecture for facilitating the user interfaces and user experiences described herein.

The provision of a user interface with a single entry point for a variety of applications can enable a user to perform any number of tasks at a glance. The systems and methods described herein provide a comprehensive, technically integrated, and fully device-responsive point of entry in a user interface for accessing both native applications (e.g., SAP Fiori® applications and platforms) as well as legacy applications and platforms. The user interface may be provided by a runtime environment hosting a number of modularized apps in coherent and interconnected ways and on any computing device. Such a user interface may be referred to herein as a launchpad.

In general, the launchpad represents a front facing software user interface executed by a client computer device structure (e.g., framework) that is provided, for example, in a web interface. The launchpad provides access to, or interaction with, a suite of multiple and diverse applications (e.g., data sources), in accordance with the principles of the present disclosure. In addition, the launchpad can simultaneously provide a Single Point Of Entry (SPOE) for access to both native SAP Fiori® implemented as well as legacy systems, platforms, and apps. As used herein, a legacy application and associated content may include applications, services, databases, and/or platforms that have been inherited from languages, platforms, and/or services before SAP Fiori® architecture was made available.

The systems and methods described herein may integrate any number of legacy applications, services, databases, applications (e.g., apps), or services. The integration may provide functions and visual designs to harmonize the legacy apps and content into the SAP Fiori® user experience and interface.

In operation, the launchpad may include any number of applications that are configured to each specific user based on an applied user role. An applied user role may represent an administrator applied role associated with a user within a specific domain, (e.g., human resources, user relationship management, procurement, etc.). In particular, applications (i.e., apps) accessible from the launchpad may be designed and assigned for a specific role. In some implementations, the apps may include relevant tasks and activities assigned to a user according to the functional role of the user within a company.

Beyond configuring the launchpad app to an applied user role, the users may further tailor (e.g., configure) apps according to relevant contexts for the way the user wishes to work. For example, a user in a sales manager role may want to change the contextual attributes of a standard "Manage Orders" app according to personal preferences. These changes may include, but are not limited to, visual display of content, (e.g., screen layout), financial content, filtering orders by amount, geographical area or status, sorting by date or order number, etc. In some implementations, a user may also add, remove, change or hide filters associated with the app.

In some implementations, it is possible for a user to re-configure one app into many different contextual variations that are relative to the how the user produces work-product. Such contextual variations may be referred herein as variants. The variations of a launchpad app may relate to, and subsequently be re-named and assigned to a specific launchpad grouping of apps, in the form of one or more new launchpad app. In effect, such apps (and corresponding selectable/launch-able app tiles) may enhance the contextual nature and functionality of the launchpad experience. In some implementations, as a user creates new variant launchpad apps, the launchpad may increasingly become more personalized and optimized, thus enabling users to produce work-product faster and more reliably.

In some implementations, the launchpad can be used for the multiple and diverse applications and may, for example, provide services to a user for application-to-application navigation, personalization, search, create custom tiles, shell configuration, tile visual configuration, create and edit bookmarks, edit tile information, and edit tile visual properties, etc. The launchpad may be designed to provide a common, same, or unified user experience (UX) to the user when launching, accessing, or interacting with one or more of the multiple applications.

In an example implementation, a backend or gateway computer system (which may be connected to multiple applications or hosts) may generate the launchpad. The launchpad may be delivered or presented as a web page on the client computer device. The launchpad may serve as a single web-based entry point (e.g., user interface) for multiple applications across various platforms and devices.

Collectively, the designs, methods, architectures and processes described throughout this disclosure deliver a seamless interface and experience between launchpad native applications (e.g., apps) and legacy applications and systems that may remove and/or mitigate barriers to user adoption by incorporating and running legacy applications and systems in the launchpad within the SPOE.

FIG. 1 is an example block diagram of an architecture 100 for facilitating the user interfaces and user experiences 102 described herein. FIG. 1 is presented as a non-limiting example of a software architecture, and it will be appreciated that many other architectures may be implemented to facilitate the functionalities disclosed herein. The architecture of FIG. 1 may provide an array of integrated functional components 103-115 that act in concert as a platform computing system (or systems) to deliver a single entry point environment for a comprehensive suite of enterprise applications. Architecture 100 may provide resources for user, administrator and system participation including services and functionalities to generate a multiple application environment configuration, (e.g., launchpad) and corresponding user experience 102 that seamlessly runs across all desktop, laptop, tablet and smartphone devices.

As shown, the architecture 100 includes functionality to generate and manage aspects of applied user roles 103, viewport home user interfaces module 104, device responsiveness/adaptiveness attributes of the viewport user interface module 105, context awareness module 106, notification services module 107, legacy apps and platform integration (providing user experience harmonization) 108, application variants module 109, contextual enterprise search module 110, home personalization and user organization module 111, app finder, app management, and app settings module 112, app home messaging and indications module 113, app interoperability and display 114, and integrated navigation paradigms module 115.

The applied user role 103 may refer to a specific role associated with a user that is associated with relevant tasks and activities assigned to a user according to the functional role of the user within the enterprise. The apps may be bundled into catalogs according to a related domain that in turn, enable user authorizations. In an embodiment, an example of this taxonomy may include a finance domain, an accounts payable—operational processing catalog, and an accounts payable accountant role for any number of app intents or targets, for example. Example content provided to such a taxonomy may include, but is not limited to manage accounting documents, clear outgoing payments, display supplier balances, etc. that in turn authorize apps to be deployed on the launchpad for a user. Relevant tasks, activities, and content may be provided based on the areas of expertise associated with the user role and/or work-related responsibilities associated with the user.

In one example, an applied user role module 103 may initially tailor a user experience and user interface experience 102 of the launchpad 101 and viewport home UI 104 to conform to a user's functional role within an enterprise, and may filter access to multiple apps contained in the launchpad based on the applied user role for a specific user. As an initial configuration of the system experience, the applied user role module 103 may reduce the number and scope of apps accessible from the launchpad, thus significantly simplifying and personalizing aspects of the launchpad, experience 102, and viewport home user interface module 104, for example, when thousands of app may apply. In general, the launchpad 101 and viewport home user interface module 104 may contain responsive/adaptive attributes module 106 that is designed as a responsive and adaptive user interface able to be simultaneously deployed on a broad array of devices. Resolutions and screen sizes may be adapted to desktop computers, mobile tablets, smartphones, smart watches, etc. These devices may deploy many varying screen sizes and resolutions. In an additional embodiment, the responsive display of the launchpad 101 and viewport home user interface module 104 may be deployed in a computer browser window of varying sizes according to user adjustments. In all responsive and adaptive deployments, the launchpad 101 and viewport Home user interface module 104 provides a functional user interface related to the user operation of the user interface including but not limited to navigation, scrolling, home tile displayed content, tile selection, app workflow and drill-down, etc.

The viewport home user interface (UI) module 104 may include a window/interface that represents a first screen users are provided after logging in. The viewport home user interface module 104 may be used to provide selectable content that can transform a single screen view into three or more multifunctional screen areas, (e.g., left/center/right) without causing the user to lose the context of the home experience.

The context awareness module 106 is an infrastructure embodiment of the launchpad 101 app runtime environment and the user experience and user interface experience 102. The context awareness module 106 may provide the means by which apps and user workflows may contextually relate to each other within the applied user role 103. As such, contextual awareness module 106 provides a basis for cross-app content (data) interoperability and perceived intelligence to users based on their role as related to corresponding workflows.

In one example embodiment, context awareness module 106 may cause a currently selected app to display data (content) from any of one or more other apps and/or backend services that are related to the user's current workflow context. In some implementations, a smart link may be presented in the format of a text link control that uses metadata annotations to offer user-specific navigation by analyzing the user's assigned apps to offer only relevant navigation targets. In an example, a user selects a create an ordering app tile from the viewport home user interface module 104 that contains a product list. After selecting a product, a smart link (e.g., Change Product Price) may be displayed that when selected triggers a popover that for example may provide a user interface control object for changing the price amount. In an example embodiment, the popover may also display detailed information about the product. In some implementations, the popover may also display in-stock quantities extracted from an inventory control app. In some implementations, the popover may also display other smart links for example, to navigate to other related apps to allow the user to take other actions that are contextually related to the product within the user's contextual workflow such as, for example, an app object to adjust the user's credit limit, or an accounts receivable app object to view the user's outstanding invoice balance.

In general, the use case example embodiments as described above may be dynamically constructed in real-time, in response to user actions for both structured workflows and unstructured situation based circumstance, whereby the user has selected a smart link to another app context that differs from a previous context. In this manner, contextual awareness may be a dynamically fluid and user-relative according to workflow actions and selections.

The notification services module 107 may deliver real-time streaming notifications from a variety of system sources which may include, but are not limited to, workflows, system alerts, app reminders, approval request actions, collaborative messages, enterprise digital assistant (EDA) notifications, user actions (confirmations), etc., pertaining to an applied user role and corresponding launchpad app permissions and authorizations.

The legacy apps and platform integration module 108 may provide user experience harmonization that focuses on the visual and internal app interaction experience of a legacy app or platform. As it is possible that legacy apps and platforms may run many multiple disparate user interface frameworks, tools, visual design, control libraries, backend bindings, etc., applying harmonization may be achieved in different ways depending on the legacy system. In one embodiment, an additional "Harmonized" user interface layer may be implemented that sits on top of an existing legacy user interface framework without the modifying or removing an existing legacy user interface framework. The application variants module 109 may generate multiple versions of particular applications based on user role, context, and/or input.

Figure 2A:
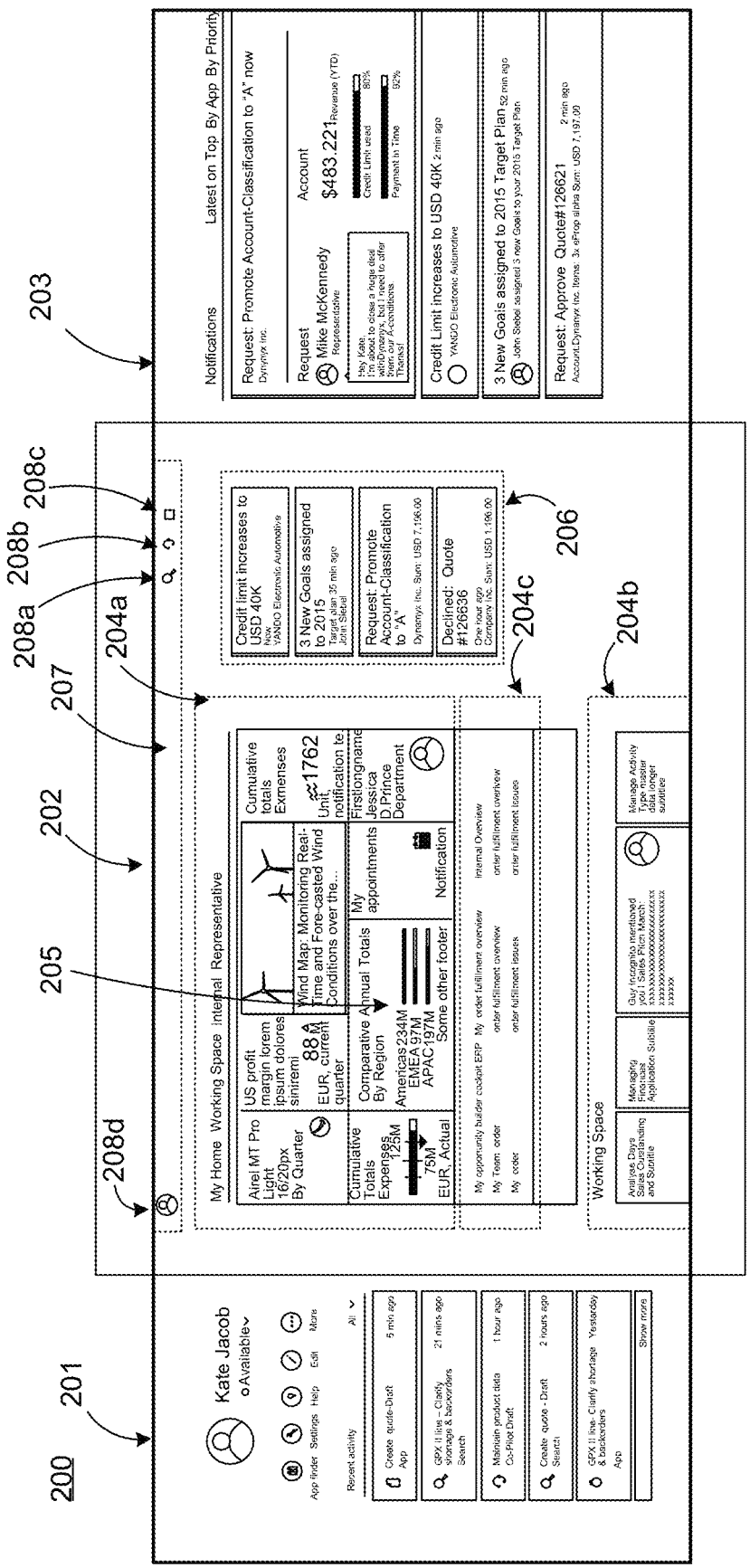
FIG. 2A is an illustration showing an example viewport displayed in a workspace container, in accordance with the principles of the present disclosure.

FIG. 2A is an illustration showing an example viewport displayed in a workspace container 200, in accordance with the principles of the present disclosure. The viewport represents an intelligently integrated, multifaceted user interface. The viewport includes a partial view of a larger screen surface which in effect transforms a single-screen view into three multifunctional screen areas, (Left/Center/Right). In general, the viewport is available at any time and in any application, and provides a clear screen orientation for accessing corresponding application information as well as generalized system functionalities and navigation options without ever disrupting a user's context of a current task at hand.

The viewport may include a launchpad in which to launch and connect with any number of tasks, messages, apps, etc. The launchpad can present thousands of apps in a tile-based Home Screen visualization at the same time, technically integrating all apps and legacy systems into a single interoperable system solution. The launchpad is executed using a runtime environment that provides a technical foundation by which all native launchpad and legacy apps contained in the launchpad run and are functionally integrated (e.g. navigation, search, cross-app data access, actionable notifications, contextual system awareness, etc.) to act as one system. The launchpad provides a home screen launch area, but also ensures seamless interoperability across all apps, consistent app navigations, and access/display of live app data from any app to any app, as also may be referred to as cross-app integration.

As shown in FIG. 2A, the launchpad includes several groupings of tiles and data and is included in a center container 202 (e.g., "Work Area"). The launchpad in the container 202 provides content relevant to the user's work, domain, or role in the enterprise. A left side container 201 (e.g., "ME Area") with content personal to the user may pertain to content in the launchpad or may be independent of content in the launchpad. A right side container 203 (e.g., "Notifications Area") may include notifications directed to the user that pertain to content in the launchpad or other content. In some implementations, these containers 201, 202, and 203 may be referred to collectively herein as "viewports." In accordance with the principles of the present disclosure, the personalized web interface may be presented as a uniquely integrated, multifaceted user interface which may, in effect, transform a single-screen view on the client computer device into three multifunctional screen areas (e.g., Left/Center/Right "viewports").

In the example of FIG. 2A, the workspace area 202 is located in the center of the container 200. In an example, the workspace area 202 may display either the launchpad tile-style home or an active app screen that was previously selected/opened from a home tile. The left "Me Area" 201 provides various generalized functionalities related to the user and their operation and personalization of the enterprise software environment including access to System/App Settings and the App Finder which function together to manage thousands of apps. The right "Notifications Area" 203 displays a broad array of notification types (System Alerts, messages, reminders, tasks alerts, etc.) in a customizable "Card-Style" listing format.

The launchpad, which provides customized or personalized executable and interactive content for a user, may also be referred to as the "personalized UI", "personalized web interface", "home page," or "home screen" herein. The launchpad may be the first page that a user sees after the user has logged in. The launchpad may be a shell that hosts user interface applications (e.g., apps) and provides the user interface apps with services such as navigation, personalization, embedded support, and application configuration. The launchpad may represent an entire client containing cross-functionality (e.g., search, notifications, navigation, etc.) and an interface for hosting and managing all content (e.g., apps, catalogs, etc.).

The content of the personalized user interface may be organized in one or more containers (e.g., workspace container including at least a center container, a left container, and a right container) for display on a display screen of a client computer device. The workspace container may contain the launchpad (e.g., home page), which may act as the starting or focal location for initiating application-to-application navigation, personalization, search, and incident creation, just to name a few examples.

Each of the multiple applications may be represented by, or delivered via, content (e.g., a graphical user element (GUI), link, tile, or other object) on the launchpad. Further, the content of the launchpad may be customized or personalized to a user (e.g., based on user role, authorization level, user interests or needs, etc.) for access to, or interaction with, a selected subset of the multiple applications (or data sources). Each of the selected subset of multiple applications may be represented a specific object (e.g., a tile or link) on the launchpad. The specific object (e.g., tile or link) may be identified or labelled by a name, title, or icon indicating the specific application which the specific object represents. The tile or link (e.g., by a single click) may be used as an application launcher on the launchpad (e.g., web interface) to launch the application that the tile or link represents.

The tiles corresponding to the specific applications represented on the launchpad may be organized as a group or array of tiles in a "tiles area" of the user interface hosting the launchpad. Similarly, links corresponding to specific applications represented on the launchpad may be organized as a list of links in a "links area." A Design Time Tool (e.g., available, for example, in a menu or via a tile or link on the launchpad) may allow users or administrators to define which applications should be displayed as links or tiles on the launchpad. Users/Administrators may personalize the tiles area and the link list area to a user.

One or more containers of the personalized user interface may have adjustable amounts of displayed content (e.g., number of tiles) (and correspondingly adjustable display size or display area) so that the same personalized user interface can be adapted for display on different-sized display screens of different client device types (e.g., smartphone, smart watches, laptops, work station, tablet, desktop computer, etc.), and across all possible deployment options (e.g., on-premise, cloud, as-a-service, etc.). Which ones of the one or more containers are displayed on the display screen at a given moment may depend, for example, on the status of tasks or activities being accessed by the user navigating the viewport between left, center, and right areas, for example. Particular containers (e.g., of the viewport) may or may not be displayed based, for example, on the size of the display screen of the client computer device available for display.

In example implementations, a container (e.g., center container) may be used to display content for a user (e.g., application/tiles relevant to a user's work or role). In some implementations, if no notifications are available, the launchpad may overtake space typically set aside for notifications.

In some implementations, the launchpad may be placed with a visual effect, including sliding in from a top of a user interface and bouncing into place in the UI. In another example, the launchpad can be scaled up (e.g., maximized into view) and faded out of view upon detecting a user has exited the launchpad UI.

In some implementations, the launchpad can be executed on multiple devices, use responsive web design, and be deployable on multiple platforms. In some implementations, the launchpad is the entry point apps on mobile or desktop devices. The launchpad displays various tiles. In general, the tiles are square or rectangular objects that provide access to applications. Which tiles are displayed on a user's entry page may, among other things, depend on the user's role. Depending on the role, the user can choose from a wide array of ready-to-use tiles from the tile catalog as part of the launchpad personalization.

In some implementations, the launchpad may be delivered to a user through for example the workspace area of the viewport.

A user may optionally create, alter, hide, and/or remove groupings containing one or more tiles, or an empty grouping containing zero number of tiles. Tiles may be grouped together in any number of ways using any number of organizational paradigms including, for example, stacked or hierarchical organizational paradigms. A user may browse, traverse, etc. a collection (e.g., grouping) of tiles in any number of ways. The placement, location, sizing, arrangement, etc. of tiles (or tile grouping) is responsive, flexible, extensible, and dynamically configurable.

In some implementations, the launchpad may offer one or more comprehensive resource locators, finders, etc. While the launchpad may improve and/or augment aspects of an app environment, the launchpad may also operate and/or function in any number of other environments, for example in augmented reality or virtual reality (AR or VR) environments.

In some implementations, the launchpad may reside (and operate). within a user interface on any target device including, for example, any combination of one or more of a desktop, a notebook, a tablet, a smart phone, a smart watch, etc. and may among other things dynamically adjust or adapt aspects of itself to account for any particulars (e.g., display real estate, input mechanism(s), 3D orientation, etc.) of a target device.

In some implementations, the launchpad can provide access to systems and apps in a tailored fashion for any number of users. For example, the launchpad can provide a customized viewport user interface for each user as well as contextual searching capabilities and legacy apps and platform access.

Referring again to FIG. 2A, the viewport home shown by container 200 includes area 202 that may display, for example, either the launchpad (e.g., home as is shown in FIG. 2A) or an active app screen (not shown) that was previously selected and opened from any one of an app tile within the launchpad home tile groupings 204a and 204b, or a text link within the link list area 204c, just to name a few examples. In some implementations, app tiles, among other things, may contain visualizations of live data related to the app. For example, a Comparative Annual Totals tile 205 may visually display an app title, and bar graphs of regional totals.

In one example embodiment, a notifications preview 206 may be displayed within the viewport home UI. The notifications preview 206 may include any number of messages regarding tasks performed by the user, tasks requested of the user, updates to system events, or communications, etc. directed to the user of the particular viewport home UI. In some implementations, display of a notifications preview may be enabled or disabled by a user in a settings UI. In some implementations, display of the notification preview may be omitted by the system's responsive/adaptive dynamic rendering methods in device screens that may not provide ample screen size and resolution to support display of both home tiles 204a-b and link list area 204c together with notifications preview 206.

In some implementations, a left Me Area 201 provides various generalized functionalities related to the user and their operation and personalization of the multiple application environment including, but not limited to, any of a user profile, setting user presence, app finder, central system settings, launchpad personalization, help, a card-style list of recently or frequently used apps, searches, and/or document forms, just to name a few examples. In some implementations, a right Notifications Area 203 displays a broad array of notification types that may contain, among other things, system alerts, messages, reminders, user-actionable tasks alerts, etc. in a customizable card-list format.

Figure 3:
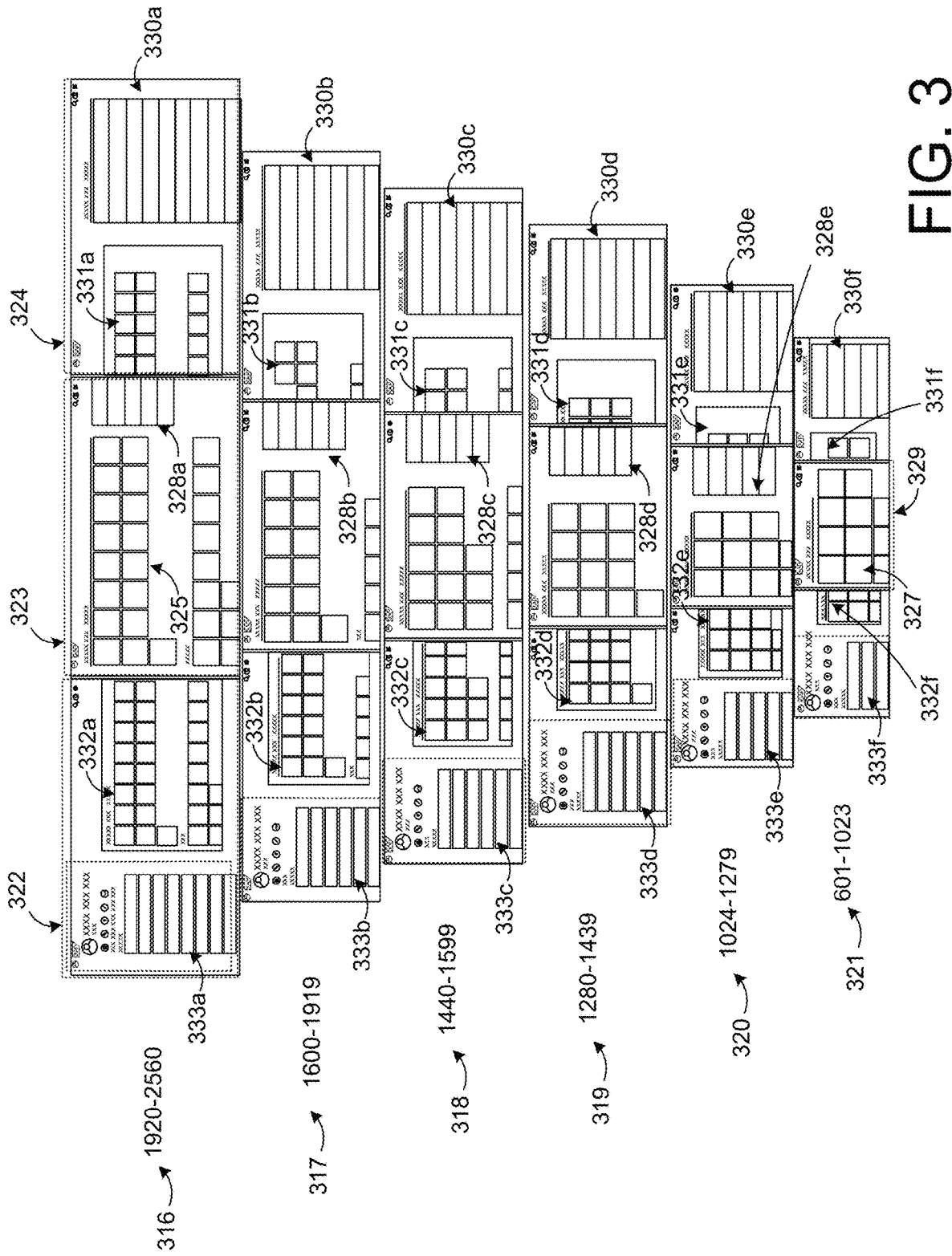
FIG. 3 is a diagram of example screenshots of a launchpad, in accordance with the principles of the present disclosure.

As shown in FIG. 2A, a shell bar area 207 is shown as a dotted line area indicating the area can be larger or smaller than illustrated. The shell bar area 207 may be persistently displayed on all launchpad app screens including the home viewport screen. The shell bar area 207 may include any number of icons or selections that may provide navigation and launch capabilities for various global aspects of the launchpad system and apps. For example, icon 208a may launch enterprise search functionality as referenced to in FIG. 1, contextual enterprise search 110. Similarly, in FIG. 2A, an icon 208b may launch or hide the EDA application and UI. Selecting icon 208c may navigate from the home viewport 202 or the me area 201 to the notifications area 203. In some implementations, upon again selecting icon 208c from the notifications area 203 may toggle back to the home viewport 202. In an additional embodiment, when in the notifications area 203, selecting the viewport hinting area as shown in FIG. 3, areas 331a-331f, may cause an additional return navigation from the notification area back to home user interface 202. In some implementations icon 208d may navigate from either the home viewport 202 or from notifications area 203 directly to the Me Area 201. When in the Me Area 201, selecting icon 208d a second time may toggle back and forth between the home viewport 202 and the me Area 201.

In some implementations, the container 200 can be used to perform various parallax animation transitions for navigation between viewport areas. For example, viewport navigations between the home viewport (center workspace) area 202, the left Me Area 201, and the right notifications area 203 include parallax animation transitions that impart a user's context and navigations between each area (left/center/right) of the viewport user interface (container 200) that simulates a user's head turning to the left and to the right in a three-part perspective panoramic view without a user's ever losing the context of the home viewport paradigm.

Figure 2B:
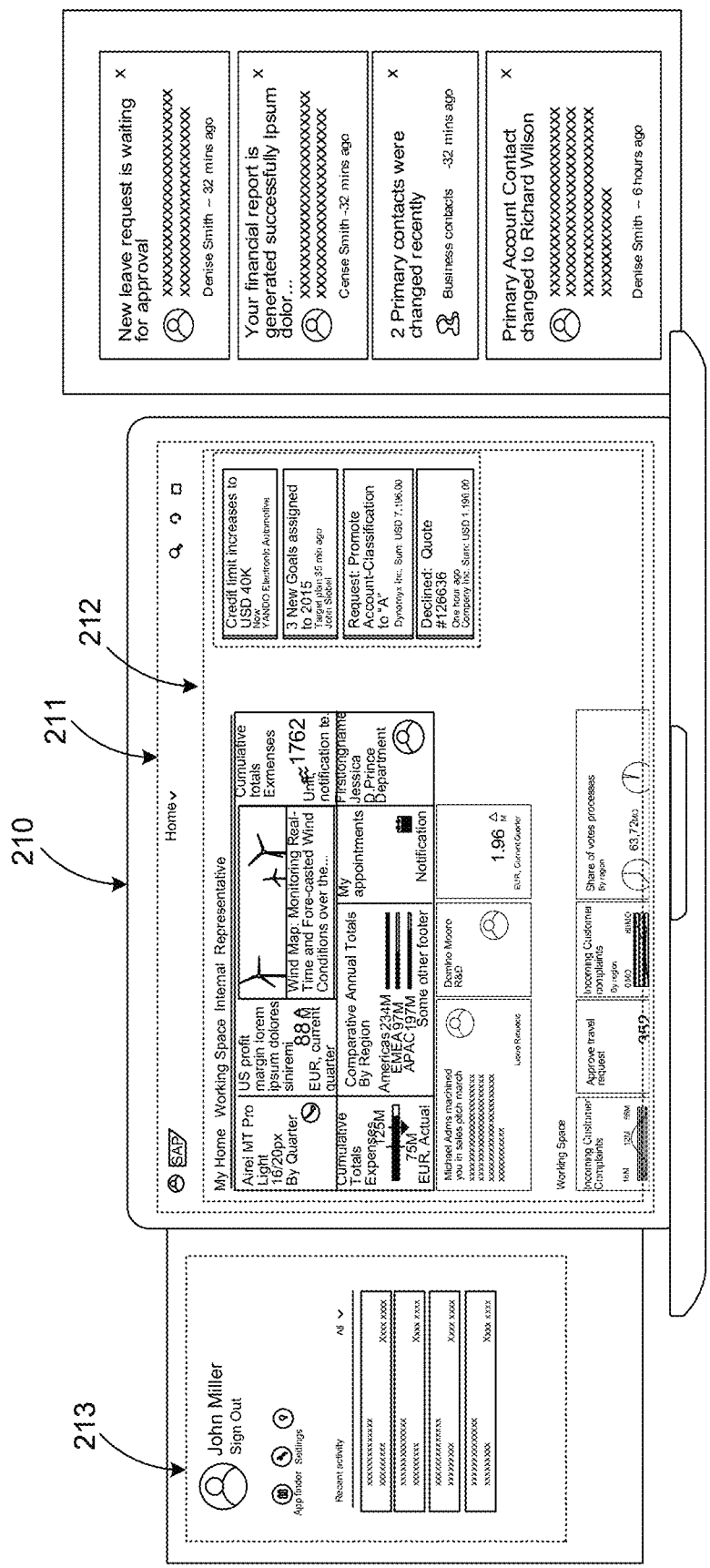
FIG. 2B is an illustration showing an example launchpad in a viewport displayed in a workspace container, in accordance with the principles of the present disclosure.

As shown in FIG. 2B, the elements shown in the center home viewport 211 may include, but are not limited to tiles and notification preview card-style listing and text content and labels as shown within the dotted line 212. Such elements are rendered to an optimized scale, readability and user selection interactions for a particular operating system and/or device. Selection of icon 208d in FIG. 2A may cause the navigation to the me area 201. The me area target 213 represents an initial state of the parallax animation transition as the viewport navigates from the center view 210 to the me area target 213 in a smooth sliding motion towards the right as shown by arrow 214.

Figure 2C:
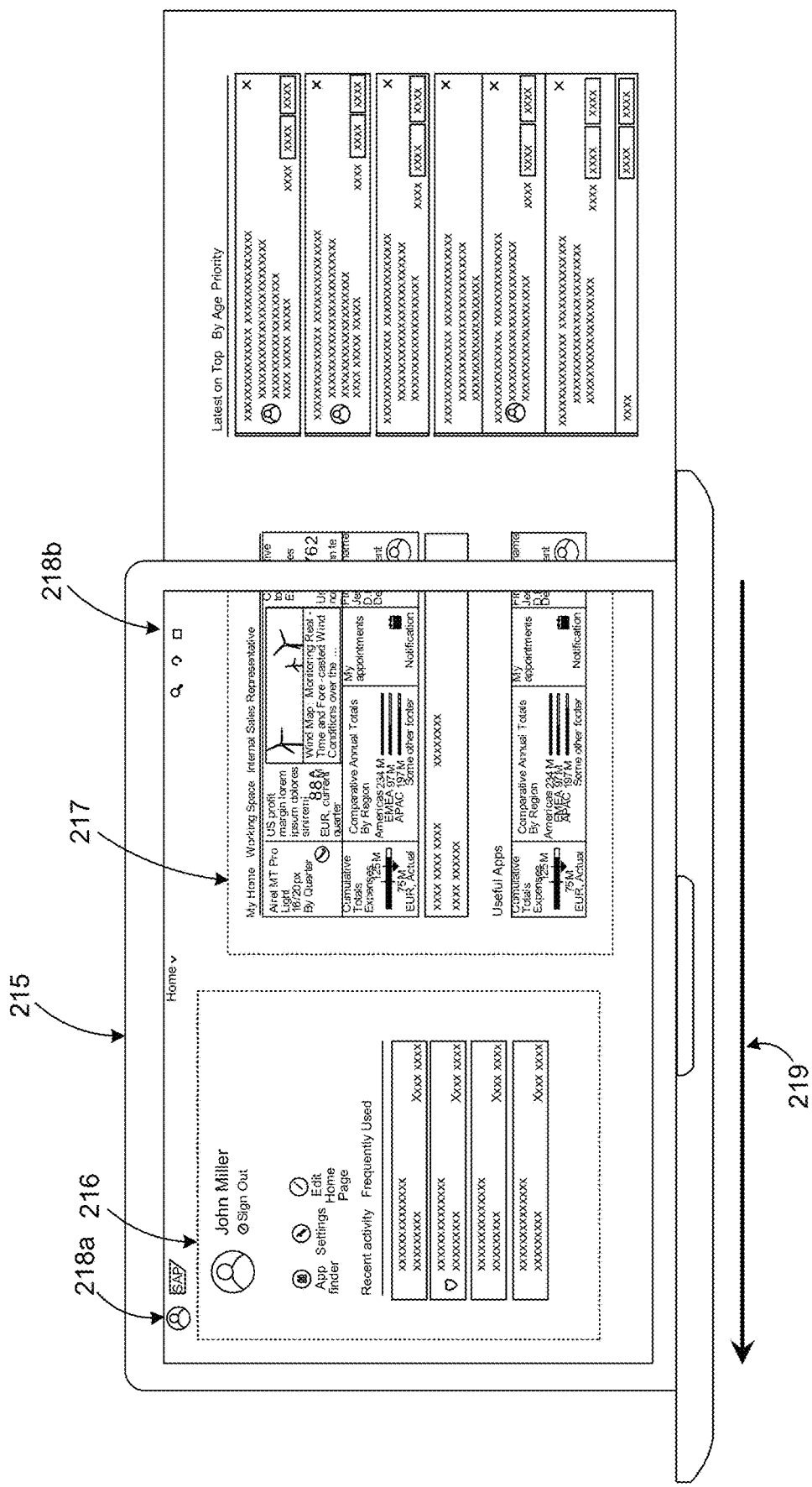
FIG. 2C is an illustration showing an example active application screen being scrolled to provide a parallax transition in a workspace container, in accordance with the principles of the present disclosure.

At the starting point of the transition sliding animation, the me area target 213 elements are rendered in a reduced size. As the transition sliding motion moves the viewport towards the left me area target 213, all reduced size elements gradually increase in size (e.g. zoom-in) until the me area is at a center viewport position as shown in FIG. 2C at 215 whereby all me area elements 216 are finally rendered in an optimized scale, readability and selection interaction for the device, whereby all functionality related to the me area 216 is now enabled. In some implementations, at the same time during the sliding parallax transition motion towards center viewport position 215 as described above, the home viewport elements 212 in FIG. 2a gradually decrease in size (e.g. zoom-out) until the parallax transition sliding animation reaches the me area center viewport position 216 in FIG. 2C whereby all home viewport elements 217 are now rendered in a reduced size. In some implementations, the reduced size home viewport elements 217 are disabled (e.g., individual selection of tiles and other selectable elements is not possible).

Figure 2D:
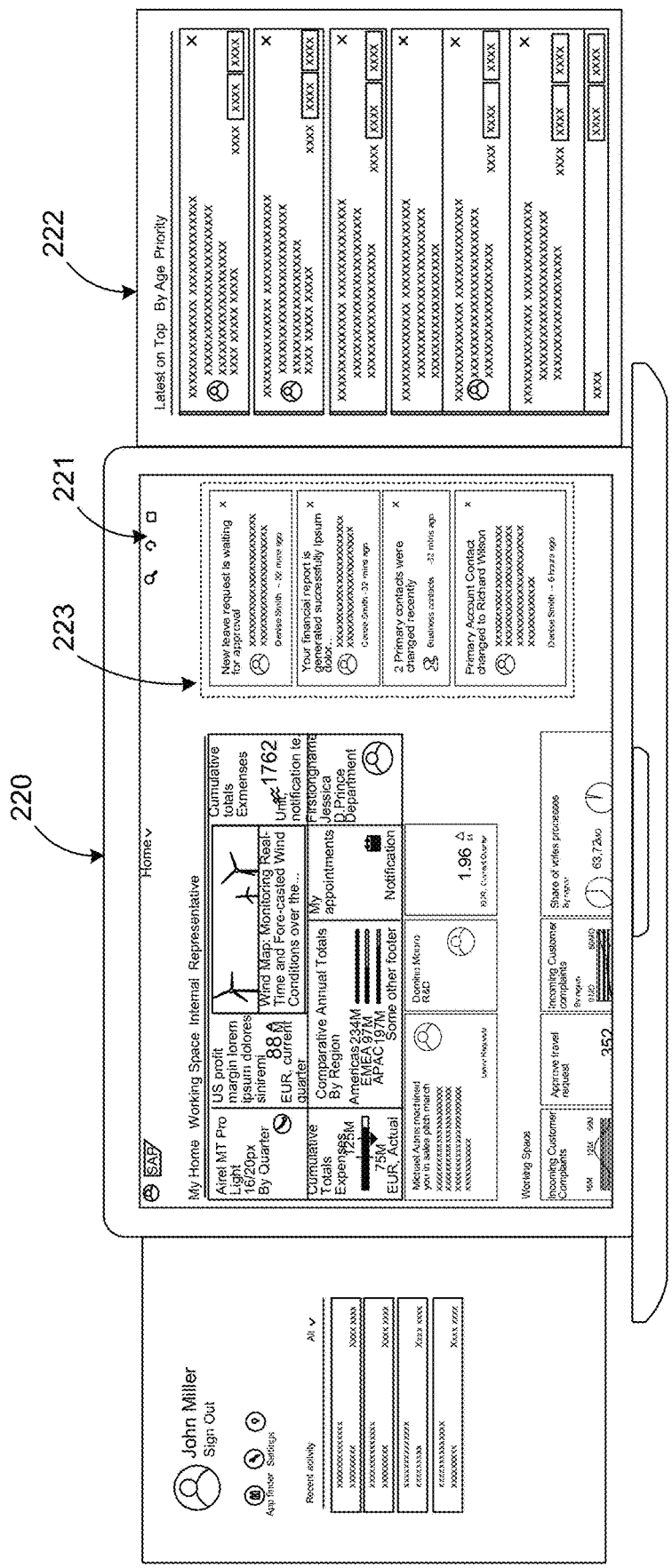
FIG. 2D is an illustration showing an example launchpad in which a user is navigating a notification viewport area, in accordance with the principles of the present disclosure.

In some implementations, selecting the reduced size home viewport elements 217 area may cause a reverse parallax transition back to the center-position of the launchpad viewport home 220 in FIG. 2D whereby all described parallax animation and transition movements described above occur in a reverse order and direction as indicated by directional arrow 219 in FIG. 2C. In some implementations, selection of icon 218a may also cause a reverse parallax transition back to the center-position of the launchpad viewport home 220 in FIG. 2D. In some embodiments, icon 218a may toggle between viewport home 210 in FIG. 2B and me area 215 in FIG. 2C.

Figure 2E:
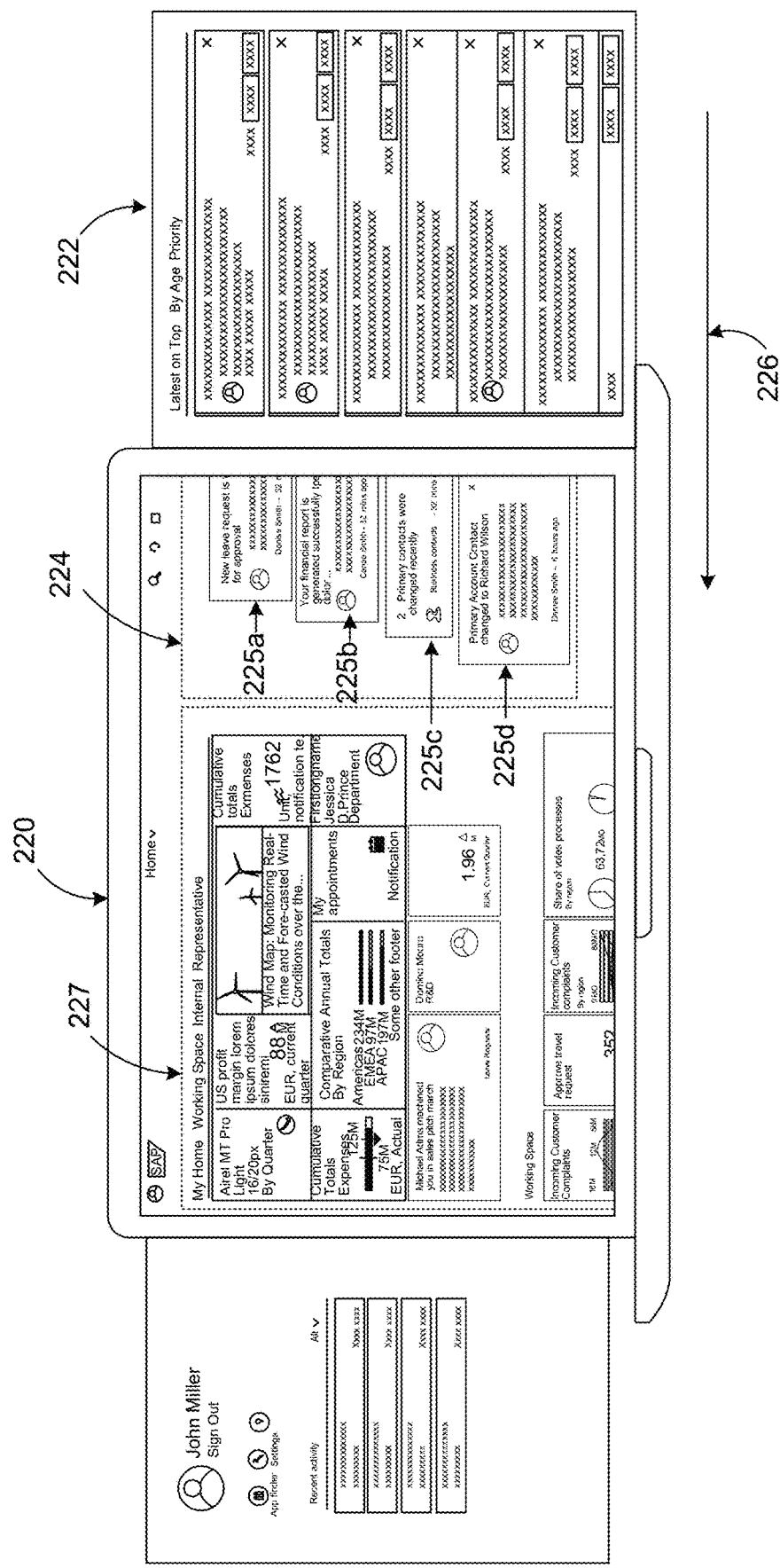
FIG. 2E is an illustration showing an example of a notification card list shown in a cascade.

FIG. 2D is an illustration showing an example launchpad in which a user is navigating a notification viewport area, in accordance with the principles of the present disclosure. In this example, the user selects notification icon 221 to navigate to the notifications viewport area 222. Upon selection, the first parallax transition animation may cause the notification preview card-style list 223 to be removed from the launchpad viewport home view 220 in a cascading card-by-card fashion as shown in FIG. 2E at 224. The cascading removal animation sequence of notification preview cards starts with the top card 225a sliding toward the right edge the screen, sequentially followed by card 225b, then card 225c then finally card 225d. After all cards have been removed, the parallax transition sliding animation begins towards the left as indicated by arrow 226 incrementally exposing the notification area 222. Similarly, as previously described, at the same time during the parallax transition sliding animation, the home viewport elements 227 gradually decrease in size (e.g. zoom-out) until the parallax transition sliding animation as indicated by arrow 232 reaches the notification area center viewport position 228 in FIG. 2F whereby all home viewport elements 229 are now rendered in a reduced size and the fully functional, non-preview notification card-style list 230 is available to the user.

In some implementations, the reduced size home viewport elements 229 are disabled. In some implementations, selecting the reduced size home viewport elements 229 area, or notification icon 231a may cause a reverse parallax sliding transition as indicated by arrow 232 back to the center-position of the launchpad viewport home 233a in FIG. 2G and whereby the home viewport elements 233b are now rendered in a predefined size.

Figure 2F:
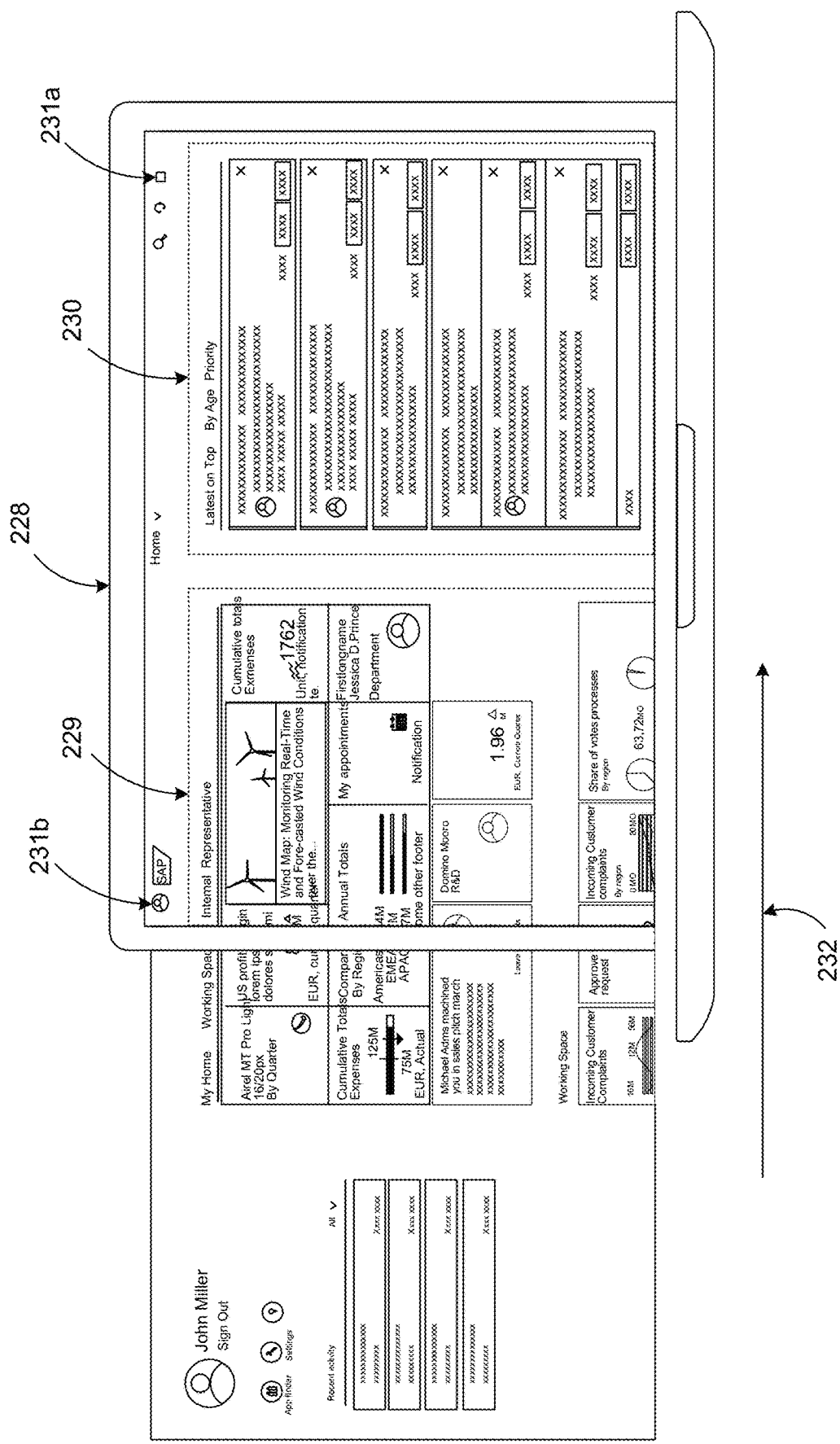
FIG. 2F is an illustration showing an example viewport elements rendered in a reduced size, in accordance with the principles of the present disclosure.
Figure 2G:
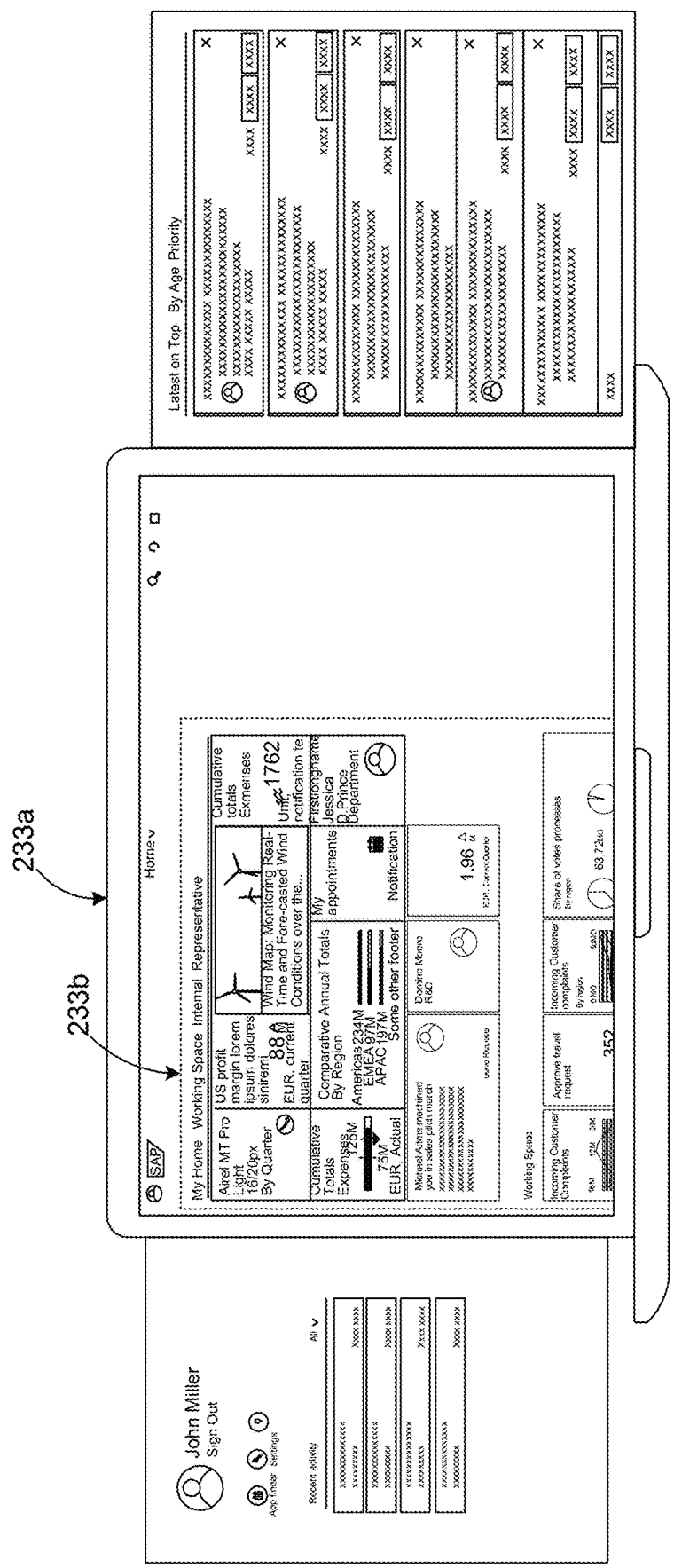
FIG. 2G is an illustration showing an example reverse parallax sliding transition for a launchpad, in accordance with the principles of the present disclosure.
Figure 2H:
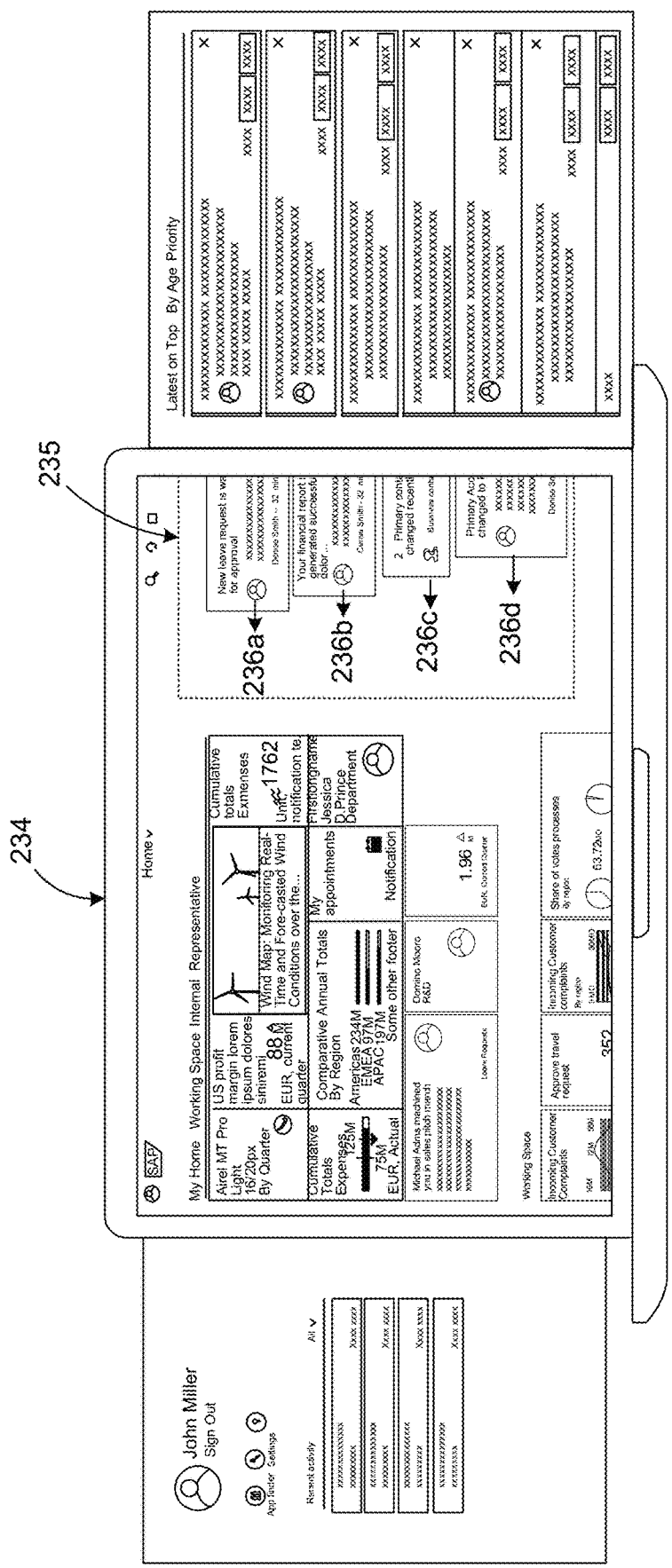
FIG. 2H is an illustration showing an example launchpad with a notification list in a viewport, in accordance with the principles of the present disclosure.
Figure 21:
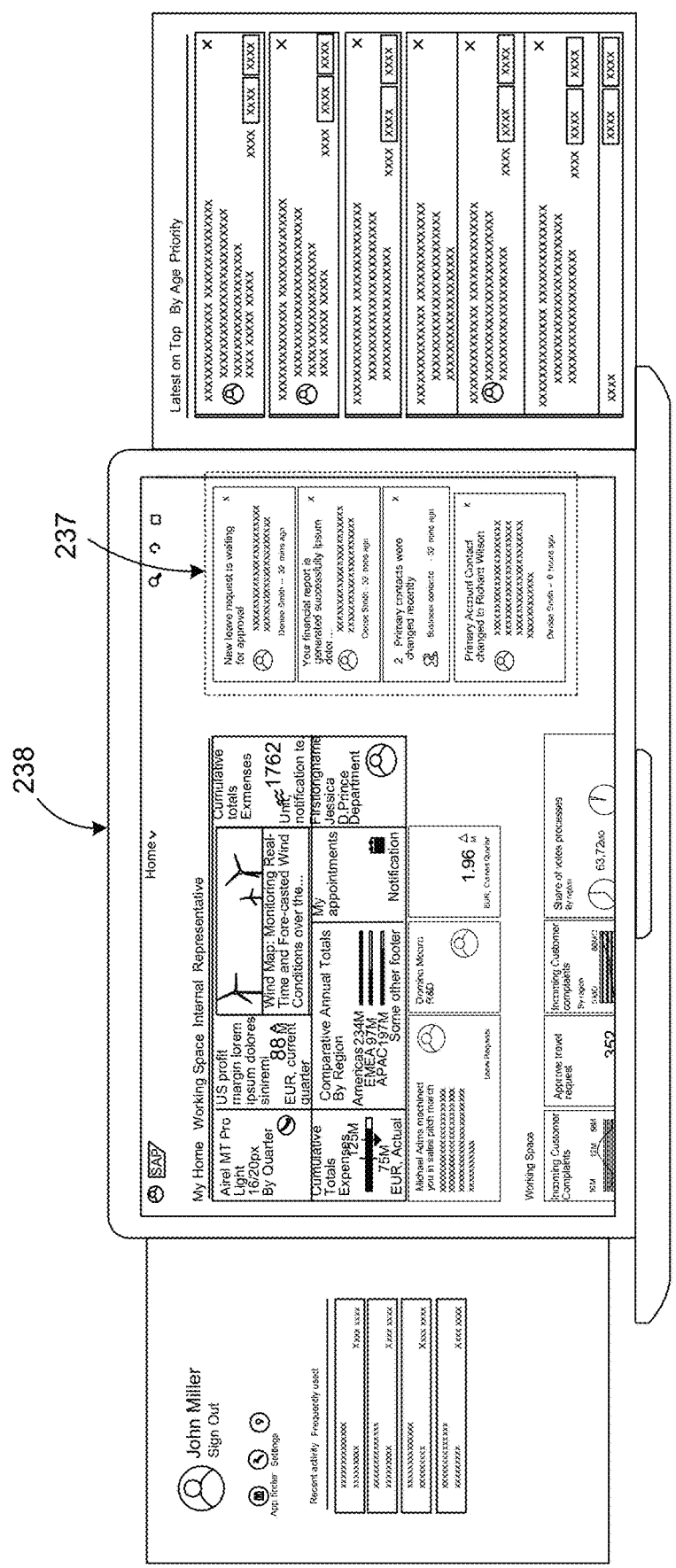

Referring now to FIG. 2H, following the sliding transition as described, the notification preview card-list 235 re-enters the launchpad viewport home view 234 in a sequential cascading card-by-card fashion starting with the top card 236a and followed by cards 236b, 236c, and finally 236d until all notification preview cards in the list as shown in FIG. 2I at 237 are fully displayed with the operable launchpad viewport home user interface 238.

In general, the viewport shown in container 200 (FIG. 2A) can allow a user to navigate from the left Me Area 201 directly to the right notifications area 203 and also in reverse (i.e., from the right notifications area 203 directly to the left Me Area 201). As shown in FIG. 2C, when in the Me Area 215 selecting the notifications icon 218b will cause a back-to-back parallax transition from the left Me Area 215 in FIG. 2C to the center viewport home 220 in FIG. 2D after a momentary pause on to the right notifications area 228 as shown in FIG. 2F. Each parallax transition is as described above except without the displaying the notifications preview 223 in FIG. 2D and corresponding notification card removal animation 224 in FIG. 2E as that would distract from the direct navigation intent. In the reverse, when in the right notification area 228 as shown in FIG. 2F selecting the Me Area icon 231b will display the back-to-back parallax transition as described but in a reverse in navigation to the viewport home 220 in FIG. 2D then after a momentary pause on to the Me Area 215 as shown in FIG. 2C.

Figure 2J:
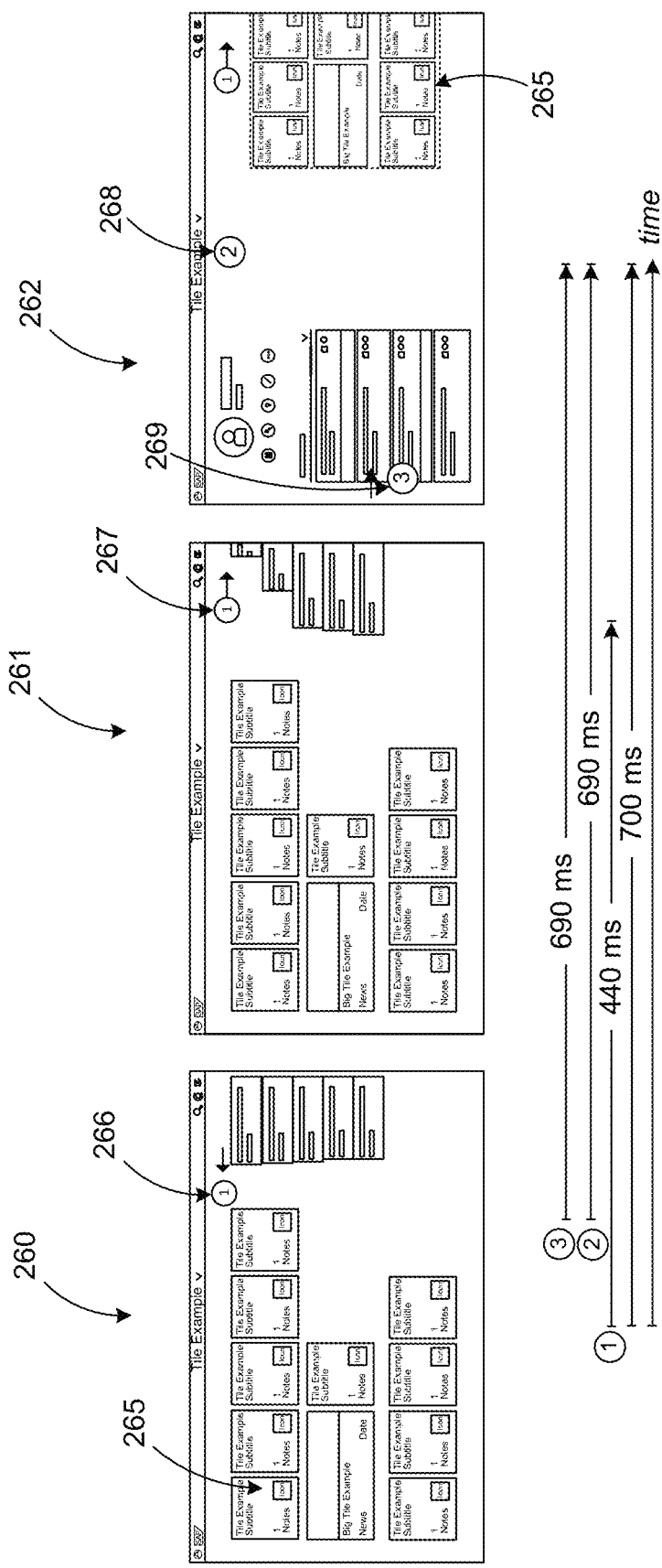
FIG. 2J is an illustration of elapsed time for a number of parallax transition actions, in accordance with the principles of the present disclosure.

FIG. 2J is an illustration of elapsed time for a number of parallax transition actions, in accordance with the principles of the present disclosure. Referencing screenshot 260 and 261, animations as indicated by the number 1 at 266 and 267 represents the card-by-card cascading in, and card-by-card cascading out animations of the notifications as shown in FIG. 2H at 235 and FIG. 2E at 224 respectively at a duration of about 440 milliseconds as shown in FIG. 2J (shown below the screenshot images). Referencing screenshot 262 animation indication number 2 at 268 and animation indication number 3 at 269 represent the parallax resizing (zoom-in) and slide-in animations of the me area activities list and header 213 and 216 that simultaneously occurs with resizing and slide-in animation of tiles 265 also shown in areas 212 and 217 in FIG. 2B and FIG. 2C respectfully at a duration of about 690 milliseconds as shown in FIG. 2J.

Figure 2K:
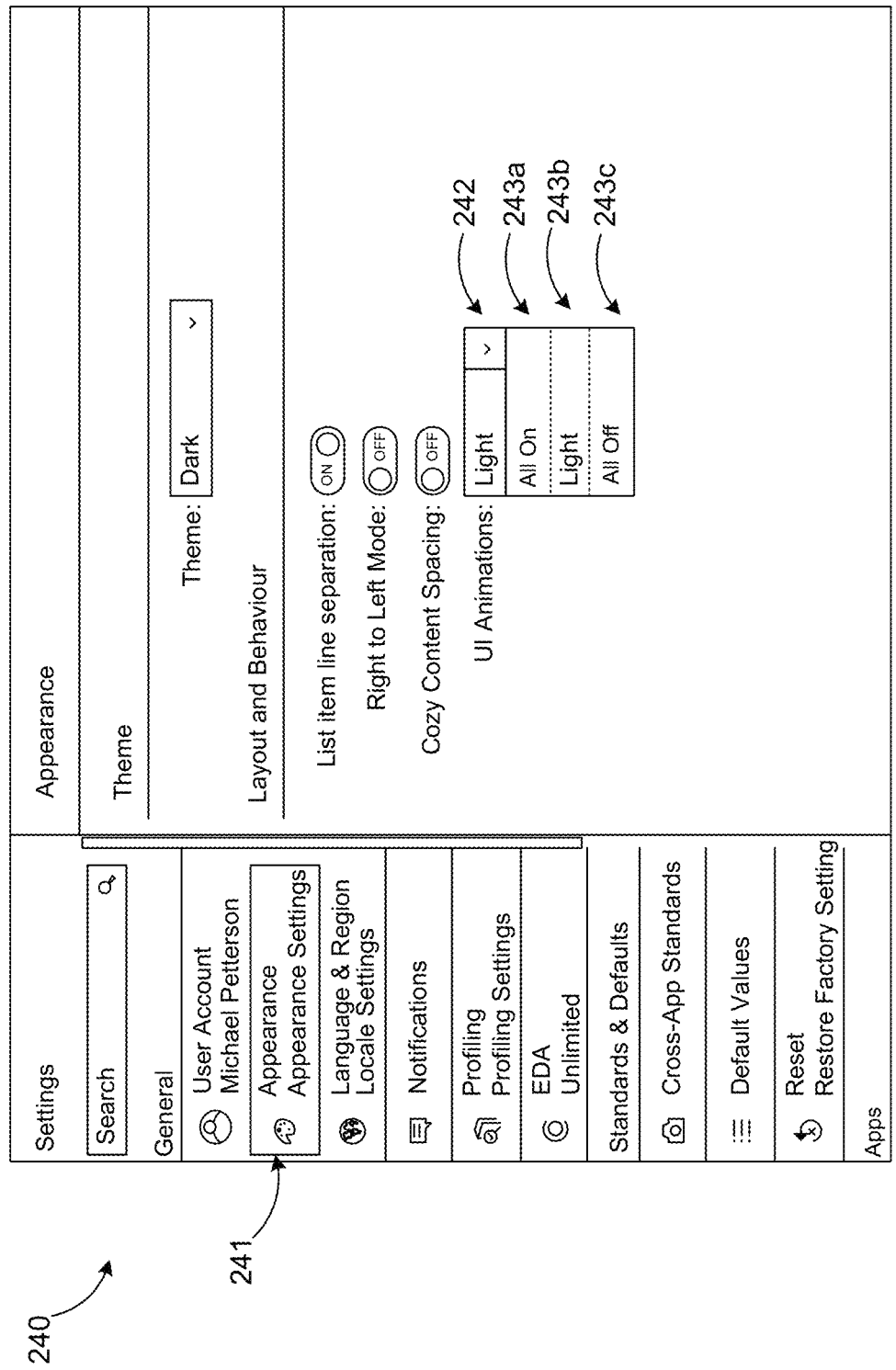
FIG. 2K is an illustration of an example settings dialog for parallax transition animations, in accordance with the principles of the present disclosure.

FIG. 2K is an illustration of an example settings dialog for parallax transition animations, in accordance with the principles of the present disclosure. The parallax transition animations among other animations in the launchpad may be optionally modified by a user in a settings user interface as shown in Appearance Settings user interface 240. In some implementations, appearance settings user interface 240 shows the appearance settings list item 241 as being selected. In some implementations, a drop-down style control 242 may be used to display and select from an option list for user interface animations including but not limited to All On 243a, Light 243b, and All Off 243c. The Light 243b option is shown as being selected via a highlight and as indicated in the Drop-Down field 242. In some implementations, there may be up to four animation options including but not limited to All On (e.g., full mode), Light (e.g., basic mode), Minimal (e.g., animations of only fundamental functionality), and All Off, (e.g., no animations of any kind).

In some implementations, the All On 243a option may cause the launchpad to display all animations, for example all parallax transition animations and behaviors as described above. In some implementations, the All Off 243c option may turn off or disable all launchpad animations including but limited to parallax transitions whereby, for example, navigating between launchpad left, center, and right areas simply cuts (snaps) to each area without any animations in-between navigations. In some implementations, the Light 243b option may turn off or disable some aspects of launchpad animations including, for example, parallax scaling animations as described in FIG. 2C at 217 whereby launchpad elements 212 of FIG. 2B are reduced in size during transition from the center home 210 to the Me Area 215 in FIG. 2C. As an example, the launchpad elements 212 of FIG. 2B may not be reduced in size but instead remain at the full-scale size during the transition from the center home 210 to the Me Area 215 in FIG. 2C. In some implementations, the Light 243b option may disable all other like scaling animations within the launchpad parallax transitions corresponding to a user's navigation of the viewport areas. In some implementations, providing animation variations may be according to a user-defined preference for their launchpad experience. In some implementations, providing animation variations may provide changes such as improvements in performance of the launchpad experience when, for example, utilizing devices that have not been kept up to date with typical software and operating system updates.

In some implementations, animation modes may be configured in a configuration control with a parameter "animationMode." If no animation mode is provided the default value "full" (e.g., All On) may be set on initialization. The string is validated against the enumeration list "sap.ui.core.Configuration AnimationMode." For example: "window ['sap-ui-configr']['animationMode']=Configuration.AnimationMode.basic;" or as URL parameter: "animationMode=full"

In some implementations to get the current animation mode, the method "sap.ui.core.Configuration.getAnimationMode( )" returns the current animation mode. In general, the animation mode should not be cached because it can be changed during runtime.

In some implementations, as related to usage in CSS, the value for the attribute "data-sap-ui-animation-mode" on the <html> document root element is injected automatically on loading with the return value from "sap.ui.core.Configuration.getAnimationMode( )." If the mode is changed the value of "data-sap-ui-animation-mode" is updated correspondingly. The attribute can be selected with "html[data-sap-ui-animation-mode="<mode>"]

If the animation mode is set to "full" or "basic": html [data-sap-ui-animation-mode="full"]. someClassName, html[data-sap-ui-animation-mode="basic"].someClassName {transition-duration: 1.0 s;}

If the animation mode is set to "minimal": html[data-sap-ui-animation-mode="minimal"].someClassName {transition-duration: 0.1 s;}

If the animation mode is set to "none": html[data-sap-ui-animation-mode="none"].someClassName {transition-duration: 0.0 s;}

To set the animation mode during runtime, use the method "sap.ui.core.Configuration.setAnimationMode (<AnimationMode>)" which sets the current animation mode during runtime (e.g. "config.setAnimationMode(Configuration.AnimationMode.basic)".

As indicated above, the launchpad may provide seamless interoperability across all apps, consistent app navigations, and access/display of live app data from any app to any app, as may also be referred to as cross-app integration (or cross-app data integration). To provide cross-app data integration a common data model (CDM) may be implemented. The CDM focuses on representation of apps within a layered repository to provide redundancy free integration with transport and translation management. The CDM may be a runtime representation that focuses on performance minimization of roundtrips and adequate load granularity for the launchpad and associated apps. The CDM may close feature parity gaps between platforms by, for example, moving to single implementation of service. In some implementations, additional information may be merged in from an application index (e.g., application paths, cache buster IDs, deployed software versions, etc.), and user specific filtering.

Figure 2L:
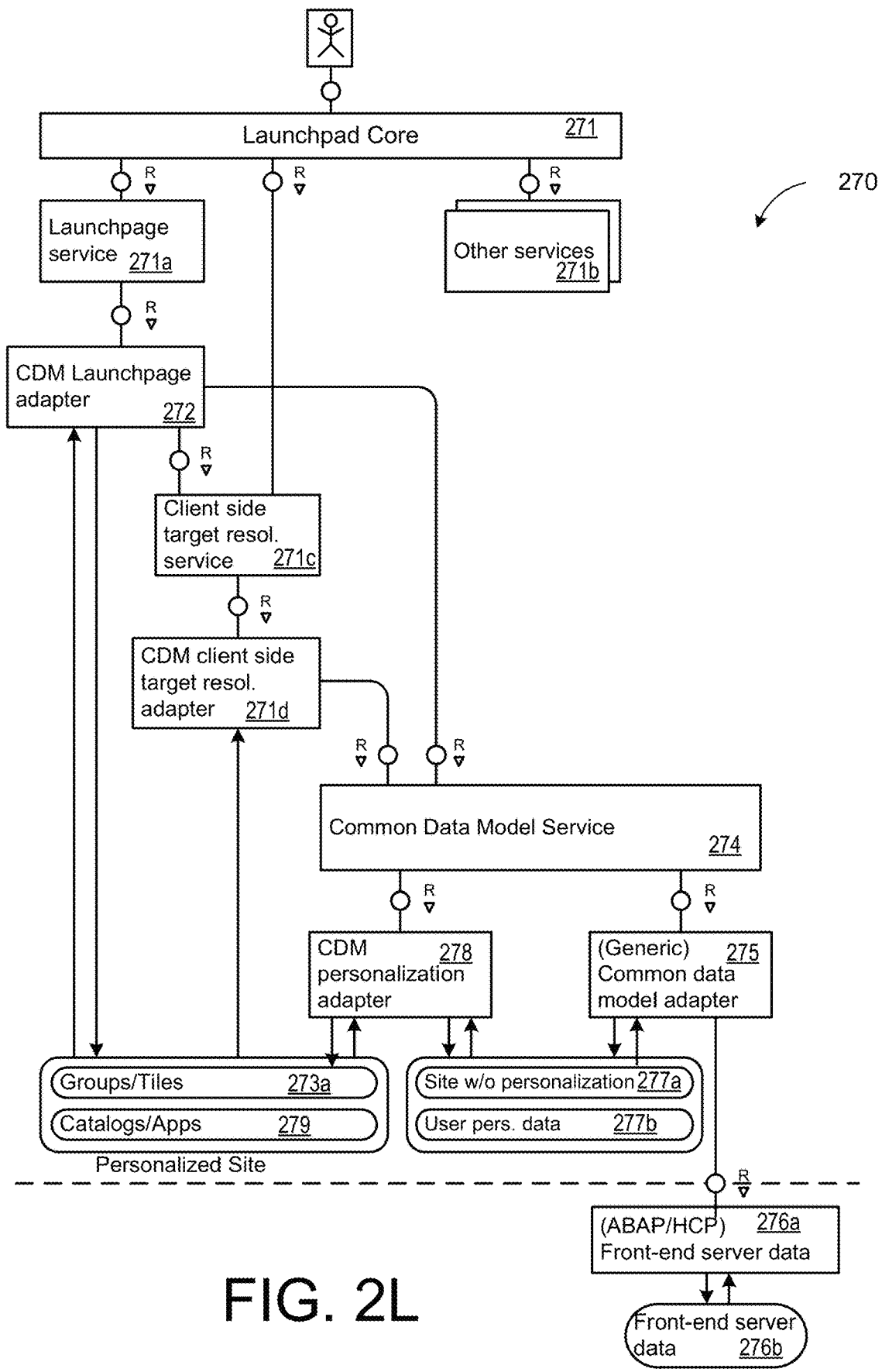
FIG. 2L is an example architecture for a common data model utilized by the launchpad.

FIG. 2L is an example architecture 270 for a common data model utilized by the launchpad. The architecture 270 may include a launchpad core 271, which represents the launchpad without the launchpage service 271a. The launchpad core also utilizes other services 271b and client side target resolution service 271c (using CDM client side target resolution adapter 271d), and a CDM service 272 (and adapter). In general, the respective adapters are CDM specific so CDM can be seen as a new launchpad platform.

During startup of the launchpad, groups and tiles 273a may be displayed on the home screen for a particular user. The launchpad core 271 may trigger the creation of the launchpad and may utilize the launchpage service 271a to retrieve the data about the groups and the tiles 273a.

In some implementations, the launchpage service 271a delegates those requests to a CDM launchpage adapter 272. The CDM launchpage adapter 272 calls a CDM service 274 in order to get the CDM data 276a. The CDM service 274 delegates to the CDM adapter 275, which loads the CDM data 276a from a front-end server 276b.

The data may be stored according to a particular format. The storage format may include at least two parts: a site without personalization 277a (which is the same for all users having assigned the same roles) and the user specific personalization data 277b. These two parts of the user's home screen description may be provided as input to the CDM personalization processor 278, which applies the personalization data to the site without personalization and creates the personalized site which is then exposed to the CDM launchpage adapter 272 and the client side target resolution adapter 271d.

The CDM launchpage adapter 272 may use the received group information (e.g., groups and tiles 273a) to display the groups. In the site data the groups may contain intents, but may not contain further data about the tiles to be displayed inside the group(s). To obtain the tile date, the architecture 270 resolves one or more intents. To do this, the client side target resolution service is called via a newly introduced method (e.g., resolveTileIntent). The service delegates to the client side target resolution adapter 271d which via CDM service gets access to the personalized site. For static and dynamic tiles, the tile data may be contained in the data for the respective app 279. For custom tiles, there may be a separate tile entry in the site which contains the tile data including the UI5 component of the tile app itself. All tile data for the (visible) tiles on the home screen is by that mechanism via the launchpage adapter 271a and service provided to the launchpad core 271, which then can initiate the display of the respective tiles.

In the launchpad, the end user can personalize a home screen. This ca, for example, include renaming of a tile title or a group, adding of a tile, deletion of a tile or group, a move of a tile to a different group, etc. In this example, the launchpad core 271 calls the respective method in the launchpage service 271a, which delegates to its CDM adapter, which can directly change the group/tiles 273a part of the personalized site. As the user does not save operations separately, the launchpage adapter 272 takes care of storing such operations by triggering the CDM service 274 which uses the CDM personalization adapter 278 (e.g., processor) to create the personalization data 277b as the necessary information to for the next startup of the launchpad to get from the site without personalization to the personalized site again (i.e., to recreate the current state again). The CDM adapter 275 then asynchronously saves the personalization data on the front-end server 276b.

In general, components that execute by way of the CDM runtime include at least CDM launchpage adapter 271a, client side target resolution service 271c, CDM client side target resolution adapter 271d, CDM service 274, CDM adapter 275, groups and tiles 273a, site without personalization 277a, user personalization data 277b, CDM personalization processor 278, and catalogs and apps 279.

Figure 2M:
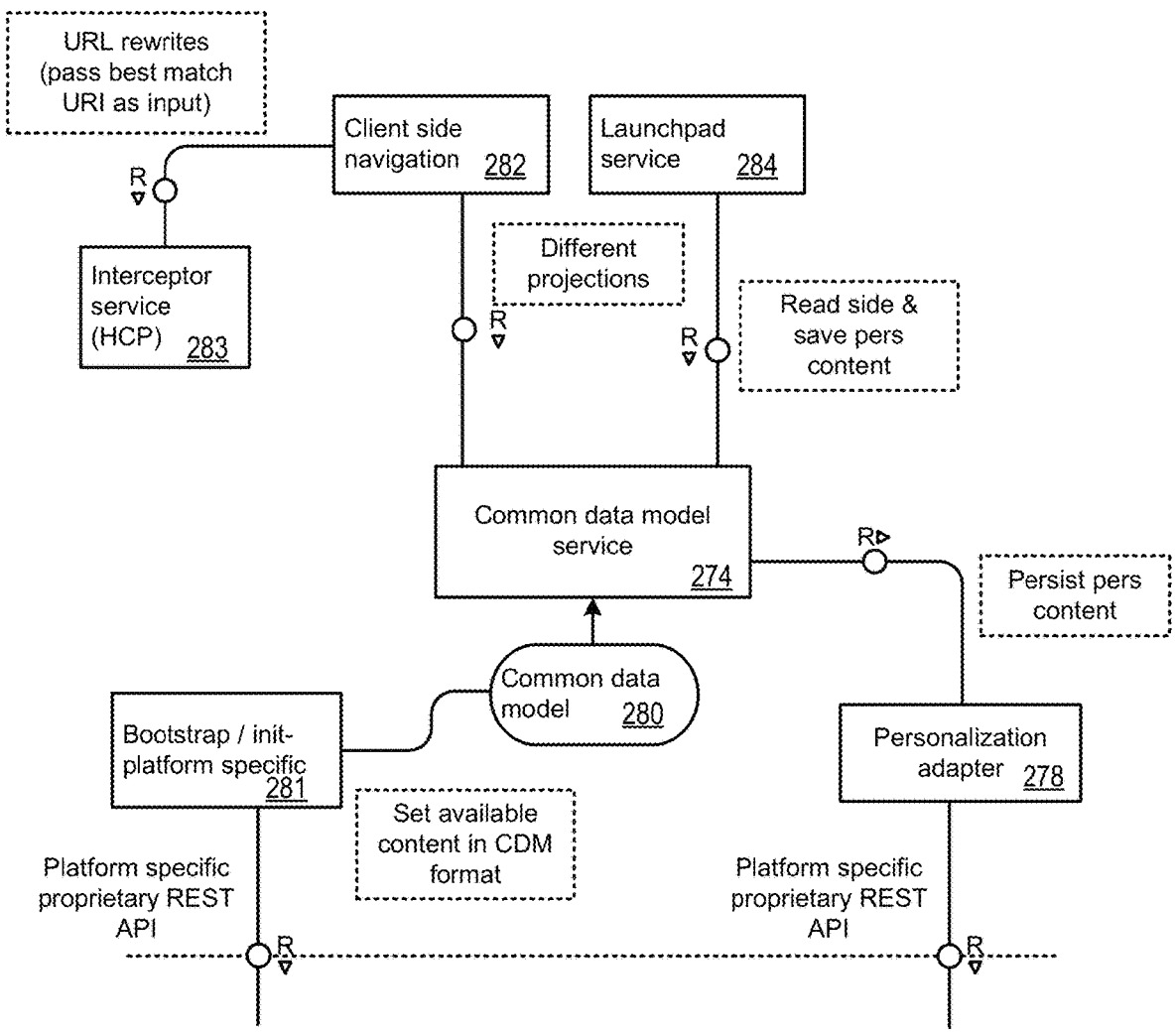
FIG. 2M is an example flow diagram illustrating a common data model that can be utilized for cross-app integration

FIG. 2M is an example flow diagram illustrating a common data model service 274 that can be utilized for cross-app integration. The CDM service 274 may access one or more common data models 280, which may access any number of bootstrap/platform specific content 281. The common data model (CDM) 280 may be used to set available content from another platform (e.g. a non-SAP Fiori® platform) to a format usable with the CDM 280 and service 274. In particular, the CDM 280 may access platform specific proprietary REST APIs and modify the way in which the platform and content associated with the platform is accessed, utilized, and displayed. Similarly, the CDM service 274 can use the personalization adapter 278 to retrieve, modify, and represent persisted personalized content associated with one or more users accessing an application during cross-app activities.

A client side navigation component 282 may access and invoke one or more interceptor services 283 (e.g., via HANA Cloud Platform) to rewrite a particular URL to provide seamless access between one or more applications. For example, when the interceptor service is invoked, the systems described herein may rewrite a URL with a best match URI and pass such a URL to the CDM service 274. The launchpad service 284 may save and persist content accessed and modified using the CDM service 274.

Figure 2N:
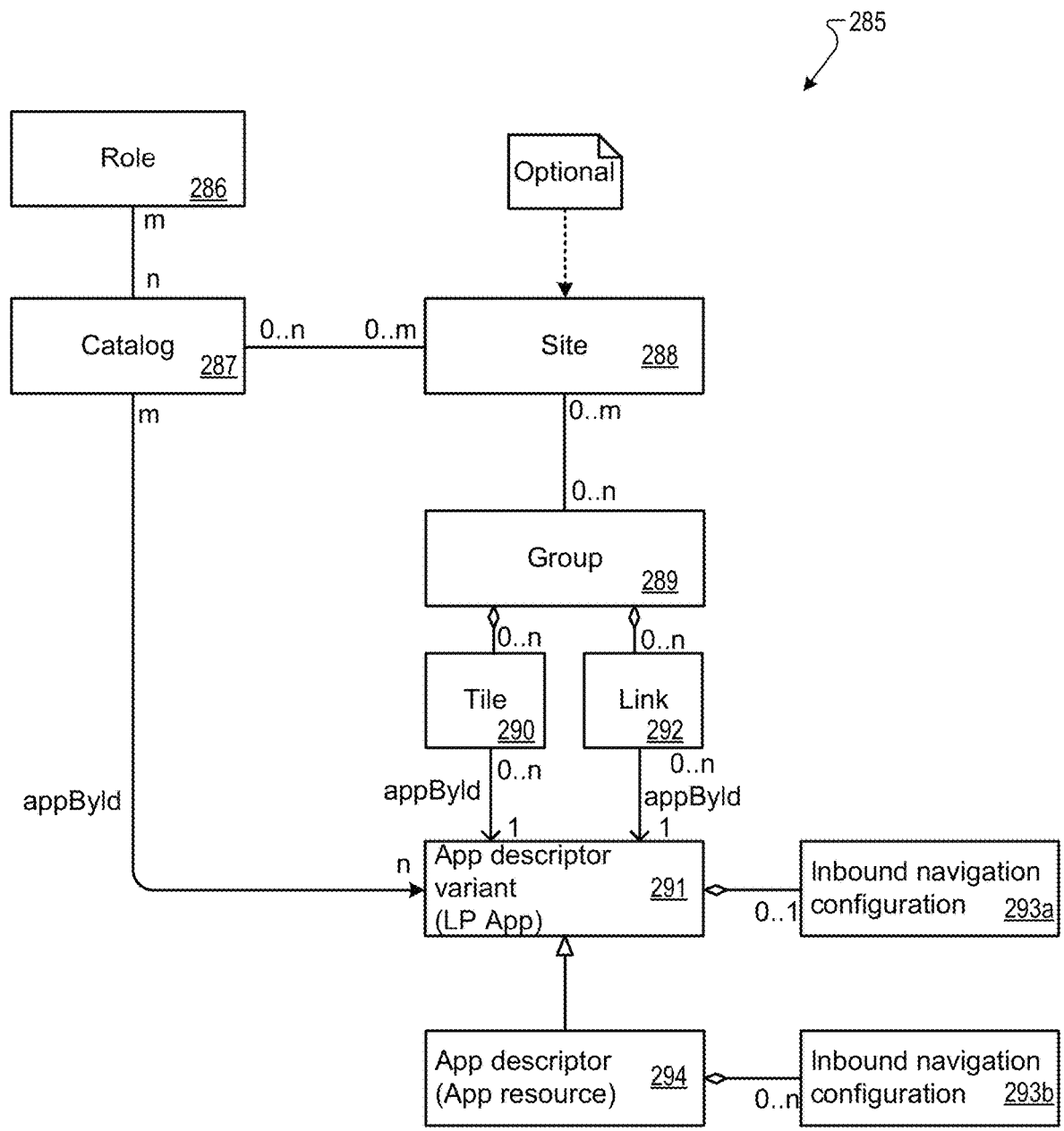
FIG. 2N is an example class diagram illustrating a common data model.

FIG. 2N is an example class diagram 285 illustrating a common data model. In this example, the diagram 285 is used to enable referencing of tiles and groups by identifier (e.g., ID) rather than by navigation intent similar to the mechanism used to reference apps by ID. This may provide consistency across tiles and groups at runtime by changing the CDM specification to instead reference apps from tiles/links via app ID.

As shown in FIG. 2N, a number of core entities are depicted. The entities may be common on all platforms as well as the separation of app descriptor variants and app descriptors. The entities may include a role 286, a catalog 287, a site 288, a group 289, a tile 290, a link 292, an app descriptor variant 291, and an app descriptor 294.

Furthermore, the diagram 285 depicts relations to the inbound navigation configuration 293a and 293b (signature for intent based navigation) and the constraint that an app descriptor variant can only expose a single inbound, while on app resource level, multiple inbounds are supported. The relation of catalogs 287 and groups 289 to a site 288 is optional.

In one example implementation, the launchpad bootstrap configuration (i.e., launchpad settings including default settings like theme, home page personalization enablement, notifications enablement, etc.) was used from the design-time CDM to ensure that tiles 290 and groups 289 reference apps by ID instead of a navigation intent. FIG. 2O is an example of source code 295 utilized to represent a group by an identifier.

FIG. 3 illustrates example embodiments 316-321 of the responsive and adaptive launchpad 101 and viewport Home user interface screen 104 as may be deployed on desktop and/or tablet device screen sizes and resolutions in a landscape orientation. Each example illustration shows each of the three viewport area screen views 322, 323, 324 (left Me Area/center Workspace Area/right Notification Center Area) as may navigated to by a user. In some implementations, as is illustrated in tile areas 325, 326, and 327, as the screen size and resolution decreases in examples 316-321, the tiles are responsively re-rendered in a wrapping fashion in order to fit within the available center area screen space while maintaining a usable and readable tile size and scale. In a responsive and adaptive fashion, as the screen size and resolution decreases in examples 316-320, the notification preview areas 328a-328e provide an advantage of maintaining both a usable and readable notification card size and resolution within the card-style list to consistently display only five, or another number notification preview cards, in all possible screen sizes and resolutions. In some implementations, the number of notification preview cards in a preview listing may vary depending on the individual notification card types and sizes.

In some implementations (as shown in the smallest screen size and resolution representation 321 and center viewport area 329), if the screen size and resolution is not adequate to display (e.g., fit) notification previews, the notification preview list is adaptively omitted from the screen by the launchpad user interface frontend to allow the higher priority view and operation of the home tile UI. In some implementations, the notification center is generally made available via viewport navigation even if omitted from the viewport home screen area view area 323.

Again referring to FIG. 3, notifications center areas 330a-330f illustrate responsive/adaptive means for display of the notifications as may be deployed on desktop and/or tablet device screen sizes and resolutions in a landscape orientation. As illustrated in 330a-330f, notification cards within a list of cards maintain a size and scale to maintain usability and accessibility. In an adaptive method to adequately display the notification center card-style list on varying screen sizes and resolutions in the right notification center view, the launchpad adaptively removes a number of card-style notifications from the viewable list to consistently maintain a readable size for each notification card within the notification list for all of varying device screen sizes and resolutions as shown in FIG. 3, by 316-321 at 330a-330f. In some implementations if there are more cards than can be displayed in the list, a user may vertically scroll the list to expose hidden cards.

Additionally, in some implementations, in the right notification area 324, the GUI screen area for all size and resolution illustrations as shown in 316-321, other responsive and adaptive visual modifications and adjustments may be made to accommodate screen size and resolution constraints. In some implementations, the viewport navigation parallax animation hinting image size of the home center tile area 331a through 331f may be reduced to accommodate the overall screen real estate available to adequately and readably display, in each of illustrations 316-321, area 324 the notification list in the right viewport screen areas 330a-330f.

Similarly, in FIG. 3 as described above, the me area 322 for all depicted screen sizes and resolutions 316-321 and navigation parallax animation hinting areas 332a-332f may be reduced in size only to accommodate the overall screen real estate available to adequately and fully display in the user controls area UIs 333a-333f as shown inside the dotted line in each of illustrations 316-321.

Figure 4:
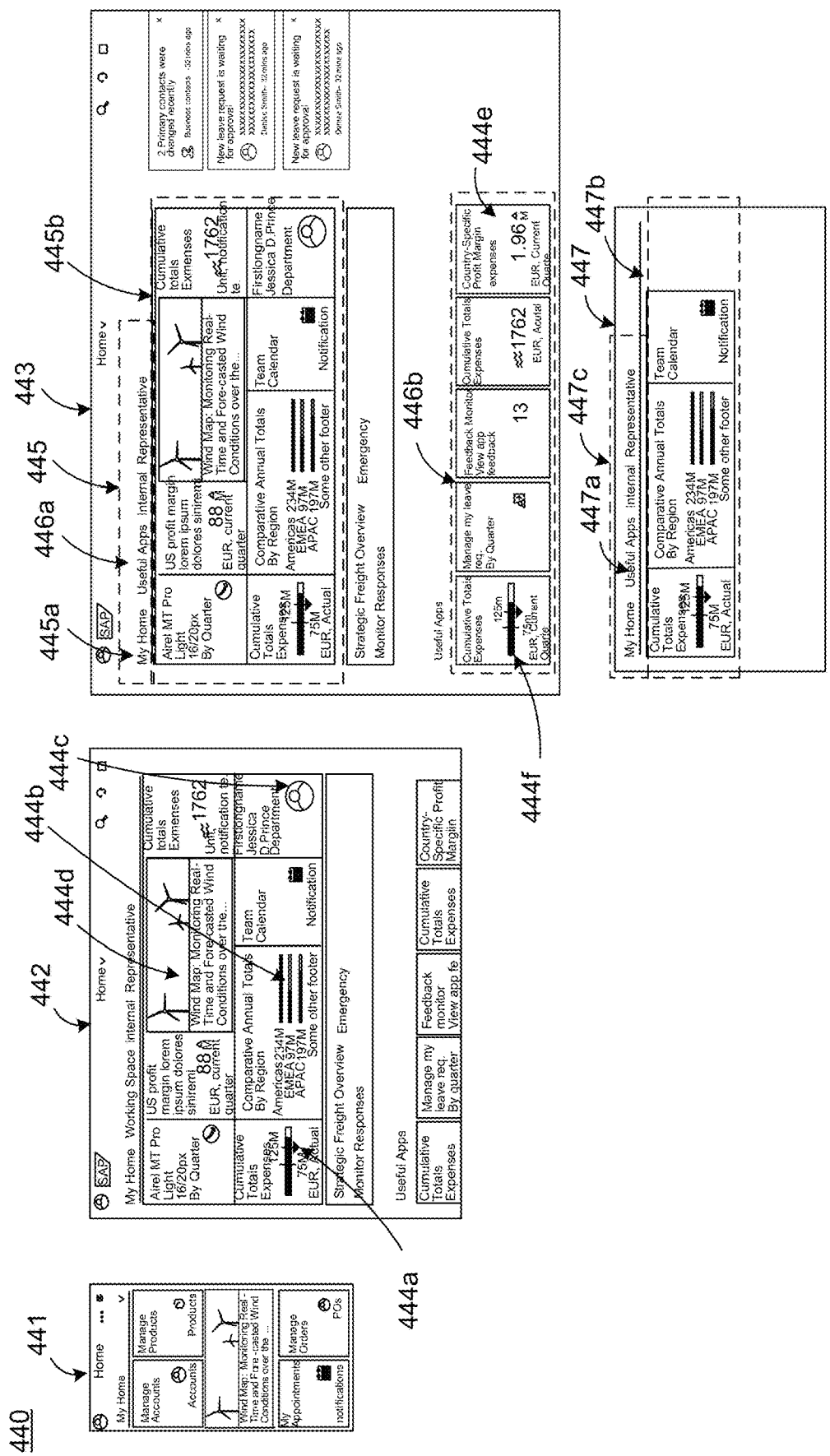
FIG. 4 is a diagram of example screenshots of a launchpad user interface, in accordance with the principles of the present disclosure.

FIG. 4 shows three example illustrations of a responsive adaptive launchpad home user interface 440 including various tile types and content detail. A viewport user interface 441 is a small size for smartphone devices, launchpad home user interface 442 is a medium size for tablet devices, and launchpad home user interface 443 is a large size for desktop or large screen size and resolutions tablet devices. In some implementations, the tile size displayed on smartphones as shown in launchpad home user interface 441 may be geometrically smaller via adaptive means than those on tablets and desktops to fit tiles in a two-tile width, for example.

In some implementations tile 444a is a launch tile type containing a title and an icon. The basic launch tile type is used to launch an app or content. In some implementations tile 444b is double wide size comparison micro-chart type showing detailed regional annual totals comparisons with semantic coloring in a horizontal bar graph data visualization. In some implementations, a micro-chart tile type may be alternately rendered a single wide size. In either a single or double wide tile size format a micro-chart tile may use other micro chart formats, for example as shown in 444f In some implementations tile 444c is a monitoring tile type used to display updates or an object count in near real time. In some implementations tile 444d shows a feed tile type which among other things, may, as an example, display news, sports, or political headlines, a background image, a time stamp, and may flip-through, for example, news, sports, or political messages which may be specifically configured for the tile.

In some implementations to provide accessibilities, the feed tile may contain a start and pause button which may be adaptively configured in different ways depending on device type (e.g., touch or pointer/mouse). In some implementations, the feed tile may provide a visualization of the number of flip-through slides, via for example a horizontal line of dots as shown at the bottom of the tile 444d. In some implementations tile 444e may be a KPI (Key Performance Indicator) tile which may typically be used to measure and monitor a company's performance at a strategic and operational level. KPIs are displayed as large easy to recognize digits. In some implementations, the KPI tile may also display deviation arrow indications, negative values and scaling factors. In some implementations, the use of semantic colors may be used to, for example, to emphasize KPI content, e.g., the color red, or another color, to show problematic values, and for example a color green, or another color, to show acceptable values.

In some implementations, all launchpad UIs 441, 442, and 443 may incorporate common selectable tile groupings with corresponding text labels that describe the contextual nature of the tiles within a group. In an example embodiment as shown, an anchor bar 445 is persistently displayed at the top of the page contains three groups entitled My Home, Useful Apps, and Internal Sales Representatives. As shown, selecting My Home item 445a places an underline under the text label causing the corresponding My Home tiles grouping 445b to be displayed at the top of the page under the anchor bar 445. Similarly, in some implementations, selecting an alternate anchor bar item, for example Useful Apps 446a would cause the screen to auto-scroll placing that group 446b to be displayed at the top of the page under the anchor bar 445 (not shown).

In some implementations, the anchor bar functionality as described above may be changed to that of a tab bar in a settings or other area as will be described later in this specification. While an anchor bar and tab bar may be visually identical, the functionality is not. In some implementations as shown in 447, the tab bar 447c may not auto-scroll through all groupings on the home page, but instead display only the tile group corresponding to the selected tab bar item on the entire launchpad home page.

As shown in screen 447 a user has selected the Useful Apps tab bar item 447a which places an underline under the text label and causes the display of only the Useful Apps tiles 447b at the top of the page below the tab bar 447c. In this embodiment, no other app groupings and corresponding tiles are displayed on the page. In some implementations, if there are more tiles than can be displayed on the launchpad home page, the user may scroll through the tiles to view those that may be hidden, (not shown). Tab bar 447c displays one group at a time as is selected by a user in the tab bar 447c. As tab bar functionality disables viewing all grouping tiles except for the selected group, it may, for example, allow a user to focus on only a selected group. In some implementations, tab bar functionality may improve performance of the launchpad for users who have configured their launchpad home a large number of groupings and corresponding tiles.

In general, the launchpad 101 described herein can effectively combine responsive and adaptive visual, functional, and animation design to consistently and persistently impart contextual awareness to users accessing the launchpad and associated software system/apps. For example, the launchpad 101 may provide contextual navigation capabilities. That is, while utilizing the systems described herein, users are aware of what screen or screen area they have navigated to, and from what screen or screen area they have navigated from. For example, a display between launchpad viewport areas is shown and notification preview cards depict exit and entrance animations between viewport home and notification areas as shown in FIGS. 2D-2I.

The launchpad 101 may provide navigational transitions using animations. Through animation, users are aware of their journey and direction between screen or screen area navigations, providing affordances, for example, for a directional movement of a screen or screen area (e.g., a userbeing aware of where they are being navigated to before they arrive at a target destination), as shown in FIGS. 2A-2I.

The launchpad 101 may provide an awareness of live content and what a current user focus should likely be, for example as shown in FIG. 4. The launchpad tiles display live content associated with a launchpad app context. For example, providing contextual insights as to areas of importance for a user that may be explored further by selecting a tile. In some implementations, a user may explore tile groups which are contextually organized according to content and interrelated functionality via the tab bar 447 or anchor bar 445.

Figure 5A:
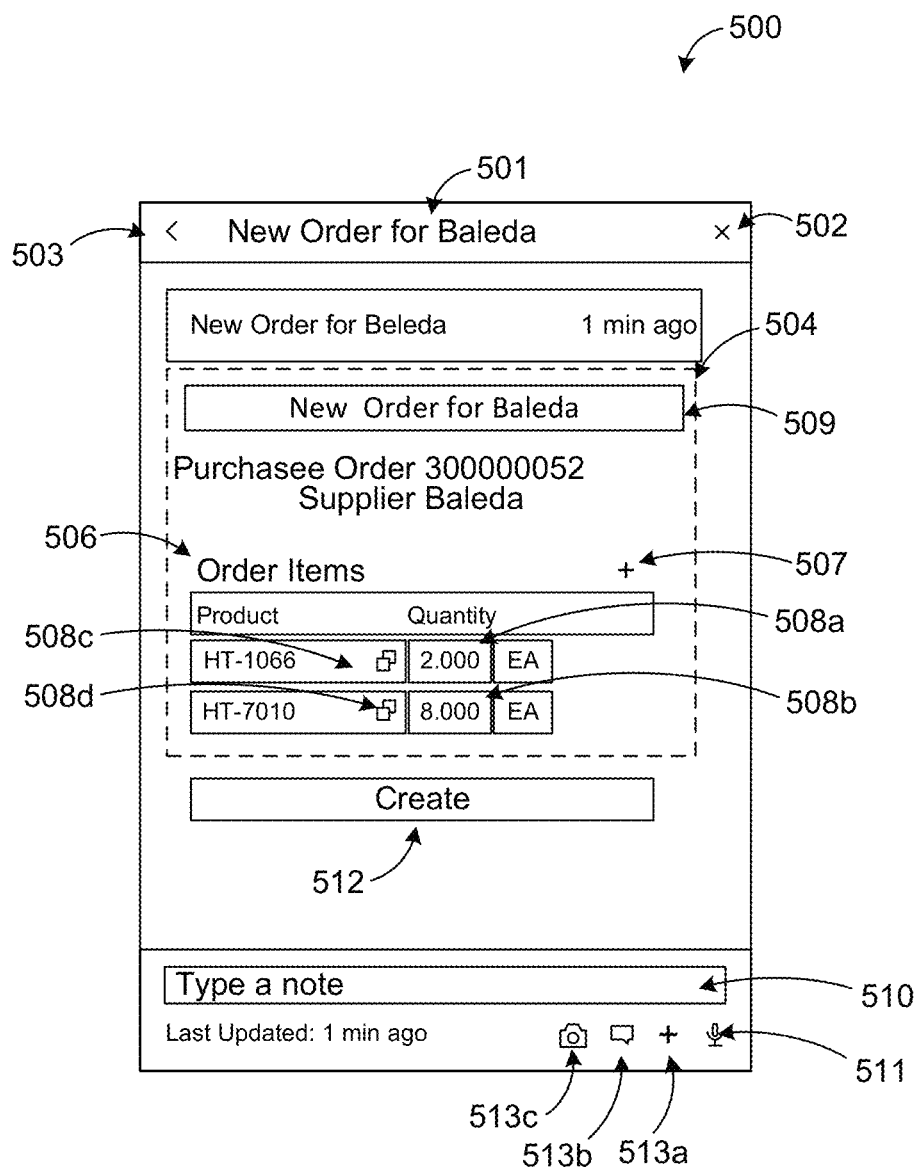
FIGS. 5A-5B are example screenshots depicting examples of an enterprise digital assistant (EDA) user interface, in accordance with the embodiments described herein.
Figure 5B:
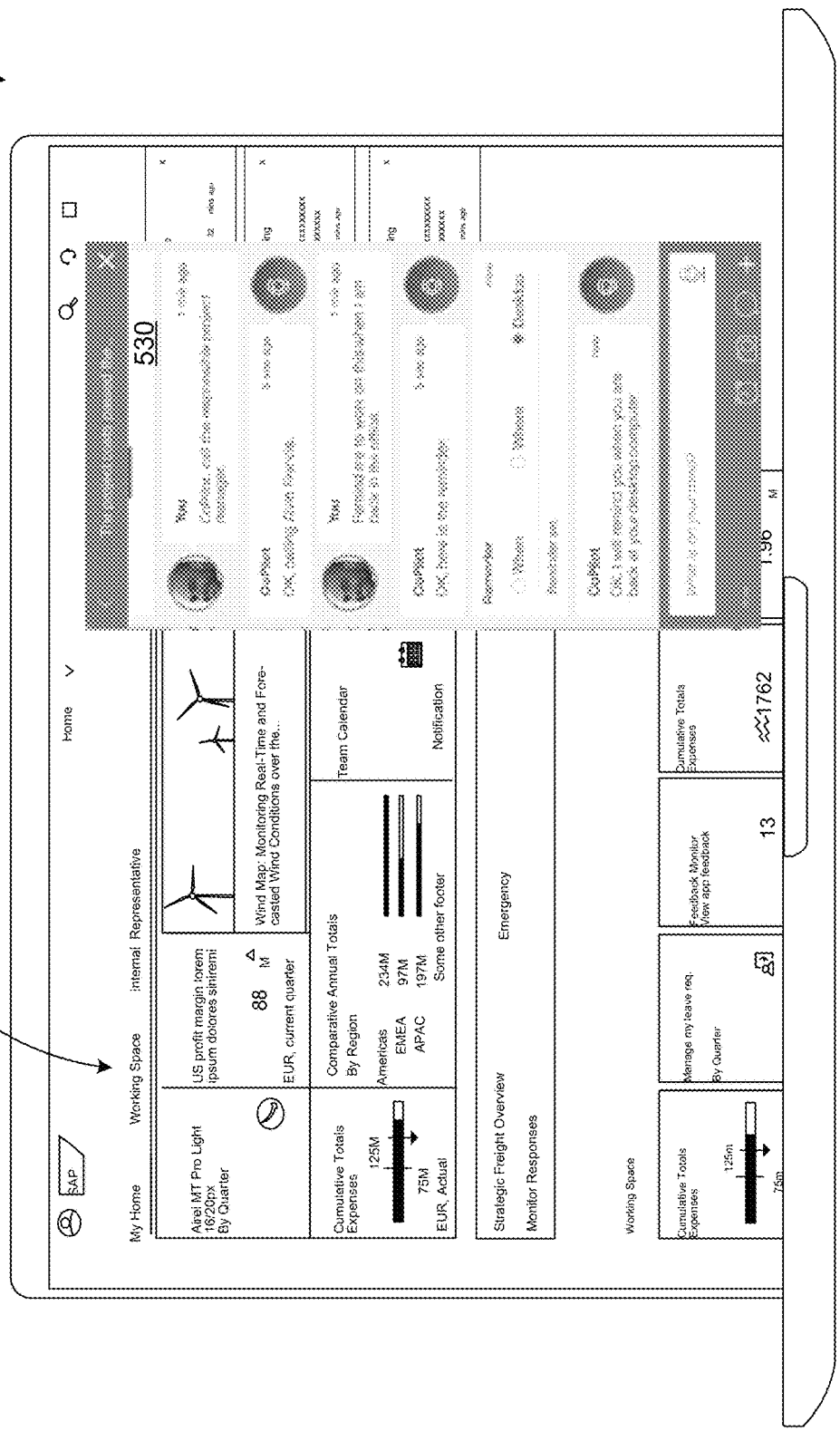

FIGS. 5A-5B are example screenshots depicting examples of an enterprise digital assistant (EDA) user interface 500, in accordance with the embodiments described herein. For example, interface 500 may represent the launchpad EDA. The EDA is an extension of the launchpad contextual experience and functionality that, among other things, may enrich the launchpad app experience by providing context awareness and information through recognizing and identifying entities in free text, (e.g., chat message text, notes, etc.) and offering an easy and intuitive interaction for the user.

The EDA may utilize natural language processing (NLP), Machine Learning, (ML), and AI modeling, among other technologies, to carry out both text and conversational interactions between a user and the EDA system. In some implementations, user inputs may be interchangeably done via text and voice inputs. In some implementations, system responses may be delivered by either text or text-to-voice methods and corresponding technologies. The EDA user interface may be a dynamic multimodal popup-style GUI component that is transportable across all devices and platforms while maintaining a scalable common cloud-based backend as further described below.

In some implementations, the EDA is a gradually growing user interface artifact and software entity that accompanies users on a journey from issue to solution while providing support with relevant context and actions. It may first serve as a memory aid, but may incrementally evolve into valuable transactional tasks and collaboration action facilitator as it matures in meaningful ways that bridges the gap between predefined application functionality and processes according to a user's personal way of working. It is accessible in the launchpad and within any launchpad app at any time and in any context associated with a user role. The EDA may be used by users of the system to communicate, collaborate, and create actionable transactions in desktop or mobile scenarios. Some examples of EDA types and configurations may include Personal Notes, Screen Captures, Images, Chat, System Messages and Alerts, Tasks, etc. that may be organized into homogenies, (all of the same type), or heterogeneous (many different types) of contextual collections of interactions to further aid in processes.

In some implementations, header 501 displays a text title for the current EDA operation "new order for Baleda," and a close button icon 502 that may be used for closing the EDA window. The header 501 may also display a back button icon 503 that may be used to navigate to content from a prior EDA display. In some implementations, prior GUI content may be dynamically displayed by a multi-modal method based on functional user selections and actions without the need for dedicated navigation buttons and controls. Area 504 may display an entity, for example, a create order, as shown. In some implementations, area 504 may include an order number 505 as may be defined by the EDA system and an order item 506 including product and quantity information. In some implementations, a plus (+) button 507 may enable a user to add items to the order listing 506, text fields 508a and 508b for entering or editing product quantities, and product select field to enter or edit product types. In some implementations, a time stamp 509 may be determined by the EDA system as to when the order was created. In some implementations, a text field 510 may provide text input means for a user to ask the system question or generally converse with the system.

In some implementations, the EDA system may provide a microphone icon button 511 allowing the user to input voice questions or generally converse with the system. In an example embodiment, a user may have asked the system, either by text or voice to "create a new order for Baleda." In response, the EDA system may generate the order 504. In some implementations, a user may have asked the system to "enter the same products from the most recent order." In response, the system may have entered the products and quantities 508a-d. In an example embodiment, a user may select the create button 512 to finalize the order with cost amounts and submit the order for approval. In some implementations, the EDA user interface may provide optional actions 513a-c. In some implementations, add button 513a may be used for adding a new software object or entity to the EDA screen 500. For example, a contact, user invoice, a quote, may be added. In some implementations, the chat icon button 513b may be used to add an instant message chat. In some implementations, the camera icon button may be used for adding a screen capture of an underlying screen, for example the launchpad home screen 521, as shown in FIG. 5B in screenshot 520. FIG. 5B also shows a screenshot 530 of an EDA assisting the user accessing home screen 521. The EDA shown in screenshot 530 is seated on top of the launchpad (e.g., 521).

While the EDA (e.g., example shown in screenshot 530) may use a backend Text Analysis service to recognize possible entities, it may also look up the entities via a search/lookup service. This is done via the launchpad enterprise Search 110 and the application programming interface (API) of FIG. 1. In some implementations for each recognized entity that may have been entered in text as previously described in the order use case described above, a fuzzy search of the identifier part of the rule will be triggered. Each search result will go through a matching algorithm to identify if the search result matches the recognized entity. If a match happens, the information gets persisted and rendered—in case of the EDA user interface, the identified text may be highlighted (e.g., similar to a link). If the information pertains to an entity, a popover UI may be provided upon receiving a user selection on the link.

The launchpad EDA desktop client may be an optional launchpad component with one or more dedicated service subscriptions that may have be enabled. The EDA may execute on the launchpad multi-app environment using the launchpad enterprise search API and services from the backend. As a dynamic data source lookup, the data source may be determined at runtime and may not need to be defined beforehand in the web.xml or in persistence.xml files. This allows binding to additional schemas to applications for obtaining the corresponding data sources without having to modify the application code or redeploy the application.

In some implementations, in a launchpad implementation, the EDA may be a cloud service including frontend and backend components. The EDA frontend may include a launchpad shell plugin approach, core frontend JavaScript code based on SAP UI5 (or another framework), and/or views, controllers, supporting logic, and a contextual analyzer (e.g., Microservices) that may allow reuse apart from EDA functionality. Accordingly, the EDA may be platform independent that may be integrated into many implementation scenarios. In some implementations, the EDA frontend may use a corresponding cloud-only backend service for both cloud-based and on-premise implementations. In some implementations, the EDA may separately deploy EDA plugins on each platform in the event a user desires multiple launchpads hosted on different legacy platforms.

In some implementations, the EDA backend service may include a java application implementing an OData service and persistence layer, a database schema, and a configuration user interface implementation. Such an implementation may provide metadata to facilitate backend services in an easily consumable way for users with multiple applications.

Figure 5C:
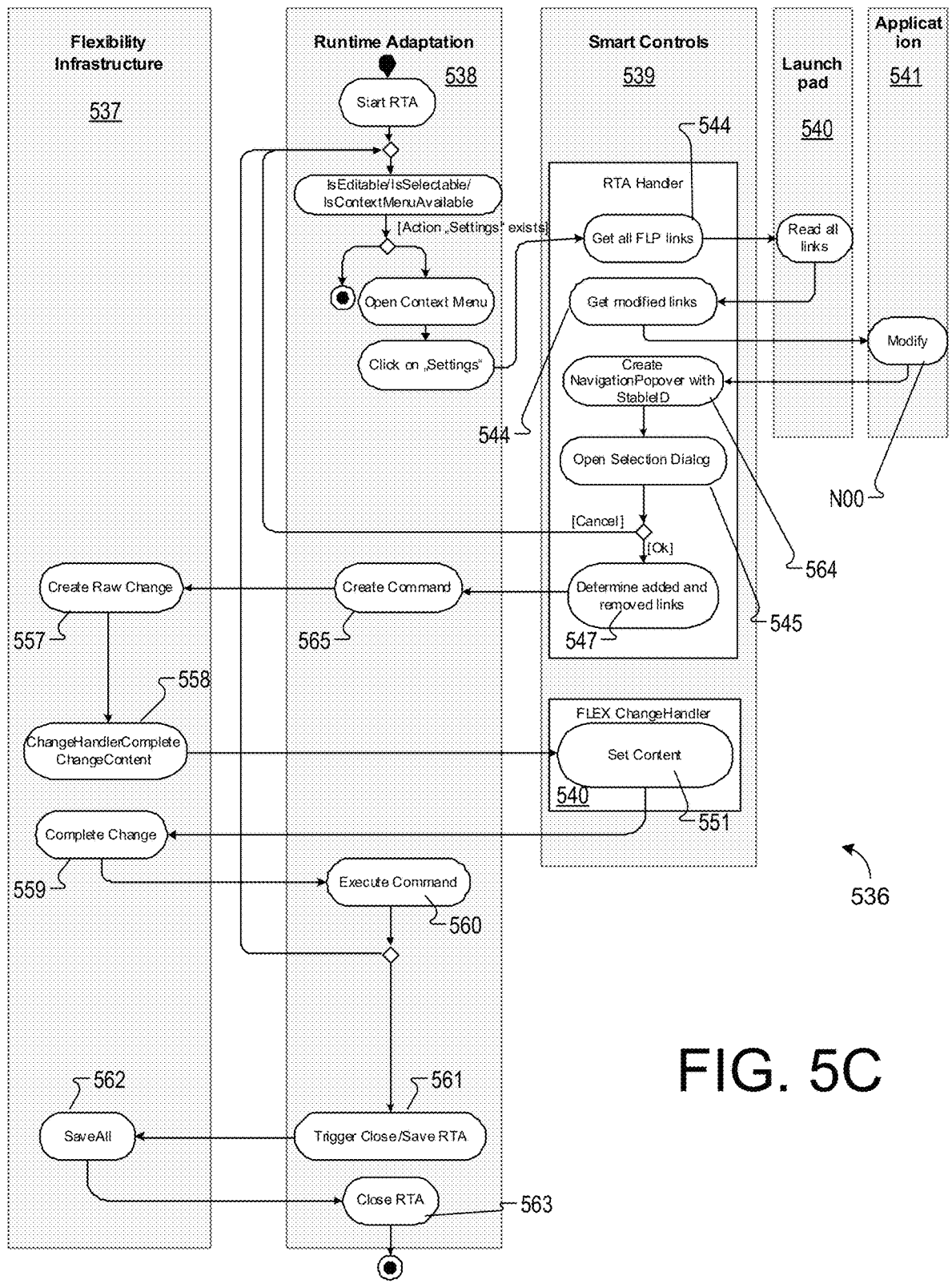
FIGS. 5C-5D are example diagrams depicting an example of implementing smart links using link personalization, in accordance with the embodiments described herein.

FIG. 5C is a screenshot of a diagram 536 depicting an example of implementing link personalization. For instance, diagram 536 shows an example of a method for generating smart links that may be presented in the format of a text link control that uses metadata annotations to offer user-specific navigation by analyzing user-assigned apps to offer relevant navigation targets. Personalized smart links may be used to decrease a number of links that may be generated for display in a launchpad when providing links for access to legacy application functions. The smart links may provide an advantage of cleaning up the launchpad for convenience in finding functions in an easier fashion. For example, each function in a legacy application may be represented as a link in an SAP Fiori® application when an overlay is generated to access the legacy application. The links can analyzed by the systems 700 or 800 described below, for example. The analysis can be used to generate smart links, as described in detail below.

As used herein, the Runtime UI Adaptation (RTA) may represent software and hardware implementations that allow a user to adapt a running application to its needs. Adaption of an application can be done by adding new fields from an EntityType of an OData service, moving fields on the view to another location via drag and drop, hiding fields and/or changing properties of a field, just to name a few examples. All changes on the application may be saved into the layered repository (LRep).

As used herein, the launchpad may represent a role based, personalized, real-time and contextual aggregation point for applications and analytics. The launchpad may be designed according to the simple and intuitive user experience, while supporting established UI technologies. The launchpad may represent an entry point to apps on mobile or desktop devices.

As used herein, the layered repository (LRep) may provide an ABAP based repository for storing UI artifacts in a layered way. The layered architecture may offer a separation of content between the vendor which is creating UIs, entities which are also creating their own UIs as well as changing existing UIs and Customer Users which are either creating UIs as well or also changing existing UIs.

In operation, the SAP Fiori® architecture described herein can be used to generate such smart links. As described herein, the gateway on the front end server may forward one or more backend requests to the backend server where the application logic takes place. The layered repository (LRep) which is deployed on the frontend server is responsible to store some frontend specific data (e.g., user personalization data or grouped tiles displayed in the launchpad).

To store a user personalization, the layered repository (LRep) can be used as the storage repository. For example, for each action (e.g. link is set to visible, link is set to invisible, link has been moved), an LRep change may be created. In addition, default links and key user personalization may be accessible via runtime adaptation (RTA).

In some implementations, smart links can be generated using link personalization based upon role. For example, link personalization can be performed by an SAP Fiori® app, a key user personalization, or an end user personalization. In operation, an application developer may start the runtime adaptation mode to define default links. Such delimitations and changes may be stored in a vendor layer of the LRep. Default links can be delivered to users and the user will be able to view the default links upon opening/launching a popover (e.g., an overlay providing links to access legacy application functions).

A user with a key user role can overwrite the delivered amount of links by starting the runtime adaptation and selecting settings to overwrite the links. All changes done by the key user may be stored in a customer layer of LRep. The links defined by the key user may be displayed for every end user.

An end user can overwrite the delivered amount of links as well as the links defined by one or more key users. In order to do so, the end user can personalize the links directly in the app during runtime. For example, from the popover, the user can open the selection dialog and set links as visible or invisible. As soon as the changes made in dialog are confirmed, these changes may be stored in a user layer of LRep.

Referring to FIG. 5C, an interaction flow between RTA components Flexibility Infrastructure 537, runtime adaptation 538, smart controls (e.g., smart links) 539, launchpad 540, and application 541 is shown. In this example, a user enters into runtime adaptation (RTA) mode in which all editable controls or selectable controls or controls with available context menus can be selected. The user can exit the RTA mode or can click on "setting" context menu of any selected (smart link) control. Clicking on "setting" context menu a selection dialog will opened showing selected and not selected application cross navigation links.

Figure 5D:
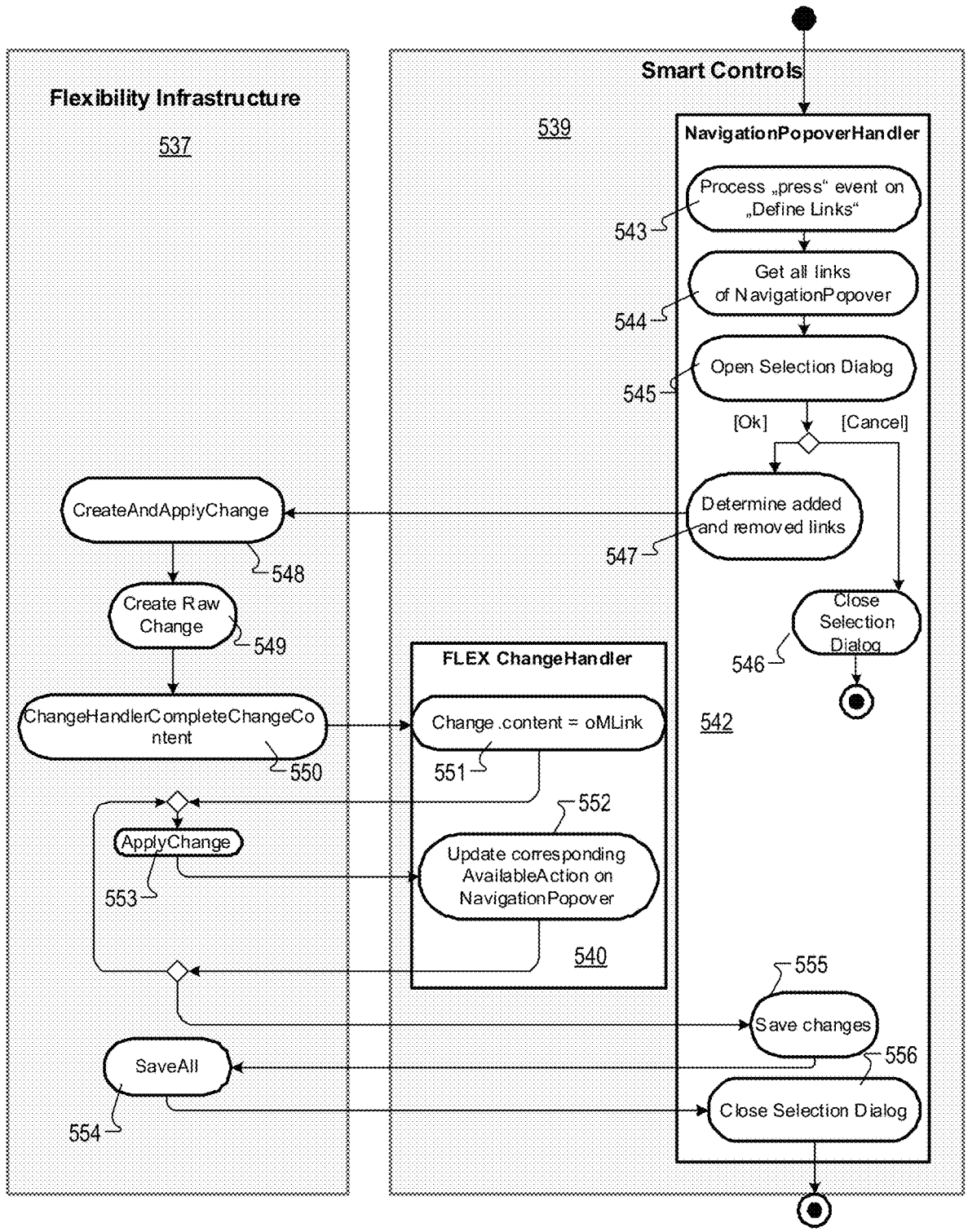

The links displayed in the selection dialog may be determined 543 by a navigation popover handler 542, as shown in FIG. 5D. The navigation popover handler 542 may process 543 all available links from a launchpad and then may provide an application an opportunity to modify these links. The navigation popover handler 542 can create a temporary instance of a control (e.g., a navigation popover control). In general, a popover may provide a user interface control object for changing one or more controls, links, interface items, etc. The navigation popover handler 542 can retrieve 544 all links of a popover and open 545 a selection dialog. The navigation popover handler 542 can close the selection dialog if no links are to be modified. The navigation popover handler 542 can determine 547 added and removed links and send the modifications to the flexibility infrastructure 537.

The flexibility infrastructure 537 can create 548 the popover and apply the modifications/change by creating 549 a change to the raw data. The tasks of reading the (LRep) changes and calling FLEX Change Handler 550 may be performed by flexibility infrastructure 537. After the collection of selected and not selected links is taken over to the selection dialog, the popover instance may be destroyed.

In the selection dialog, the user can select and deselect displayed links to invoke the FLEX change handler 550 to change 551 content to particular links and to update 552 corresponding actions in the popover. Such changes can be applied and implemented 553 by the flexibility infrastructure 537. The changes can be saved 554 by the flexibility infrastructure 537, which may prompt the navigation popover handler 542 to save 555 the changes and close 556 the selection dialog. In some implementations, selecting a cancel dialog closes the dialog. Selecting OK may also close the dialog and prompt the navigation popover handler 542 to determine what exactly has been changed by user and for each action (selection of link or deselection of link) and a new LRep change can be created 564 for a stable ID associated with the popover. The stable ID may include an app component name and semantic object name(s).

As shown in FIG. 5C, in some implementations, the creation and save of new changes may be orchestrated by the runtime adaptation 538. In some implementations, the runtime adaptation 538 can receive determined/added 547 links and generate 565 a command for such links. The command can be provided to the flexibility infrastructure 537 to implement the change. In order to do so, the runtime adaptation 538 calls the flexibility infrastructure 537, which creates 557 for each change a raw LRep change, determines 558 the content of the LRep change and completes 559 the creation of the LRep change. The runtime adaptation 538 can then execute the command 560, trigger 561 close and save of the RTA. When the runtime adaptation mode is finished the runtime adaptation 538 calls the flexibility infrastructure 537 in order to save 562 new LRep changes and then triggers the runtime adaptation 538 to close the RTA 563.

Referring again to FIG. 5D, an end user can make personalization directly in the app without switching to any mode. For example, the end user may select 543 a define links control within the navigation popover after the popover of a smart link is opened. Then the same selection dialog will be opened showing selected and not selected application cross navigation links like for the key user, for example.

At the point in time when the smart link has been selected, the links displayed later on in the popover may be determined by navigation popover handler 542 (in the same way like for key user) which retrieves all available links from the launchpad and then gives the application an opportunity to modify the links. The navigation popover handler 542 then generates a control. During the creation of popover, the stored LRep changes are applied. The tasks of reading the changes and calling the FLEX change handler 540 may be performed by the flexibility infrastructure 537.

When a smart link is selected, the navigation popover handler 542 determines available links. To do so, the navigation popover handler 542 retrieves a list of all of the available links from launchpad and provides the application an opportunity to modify the links. The navigation popover handler 542 creates one or more controls with a stable ID. During the creation of the popover, the flexibility infrastructure 537 may be triggered to read and apply all changes belonging to the popover. The LRep changes may then be applied by the flex change handler 540.

Figure 6:
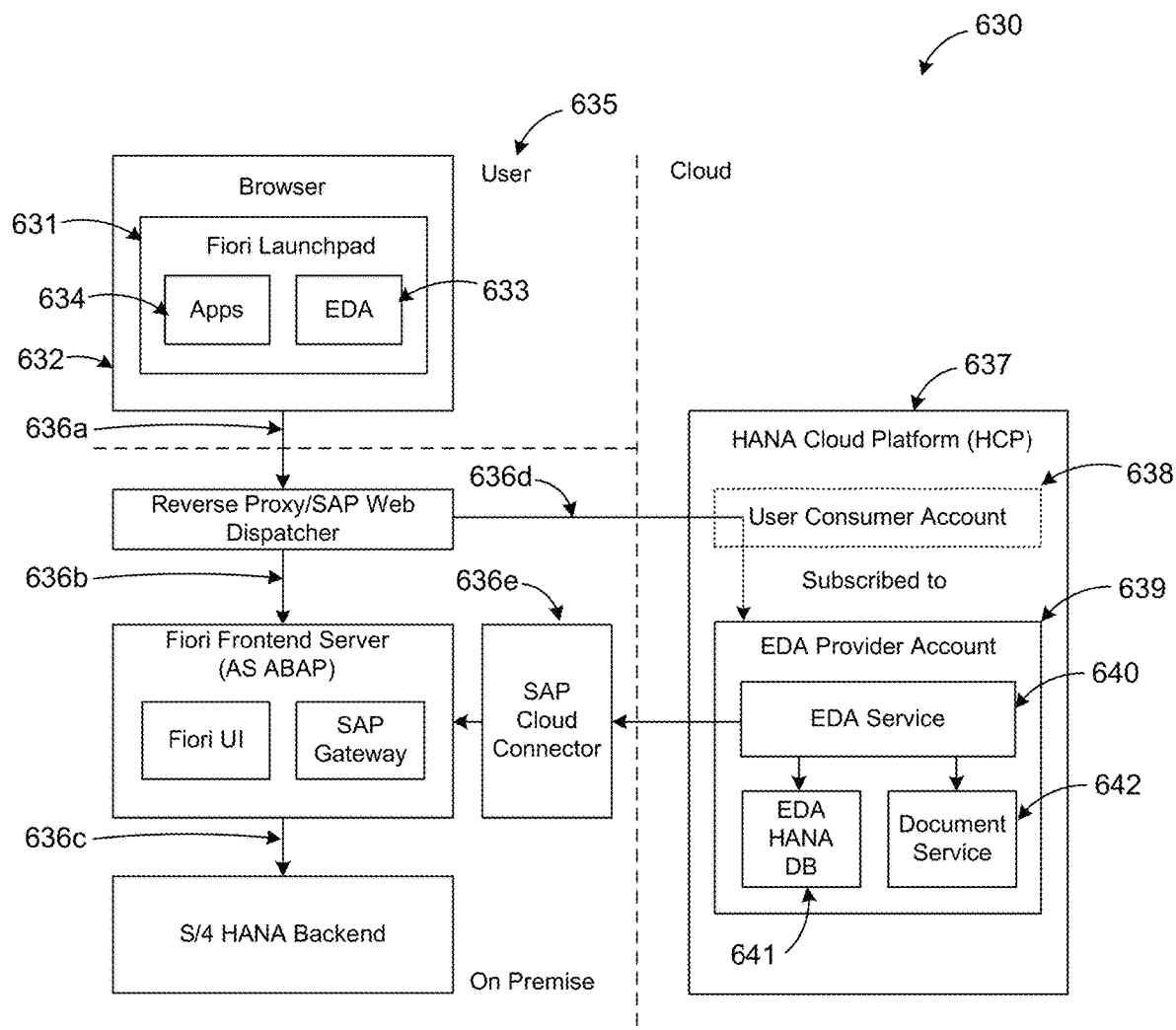
FIG. 6 is a block diagram of an example system that can implement the user interfaces and user experiences described herein.

In an example embodiment, the simplified EDA system diagram 630 in FIG. 6 provides a primary user interface for a user 635 of the EDA 633 and launchpad apps 634 as being the launchpad 631 within a browser deployment 632. In support of context awareness functionalities 106 of FIG. 1 and as described above, EDA system architecture 630 connectors 636a-636e enable the overall system for both EDA on-premise and cloud deployments via the launchpad 101 of FIG. 1. The Cloud Platform 637 contains the EDA provider account 639 including EDA services 640 and EDA database 641 as described above that are subscribed to by a User/Consumer account 638. Document Services 642 provides screen capture functionality provided by a JavaScript library and additionally stores the images.

Figure 7:
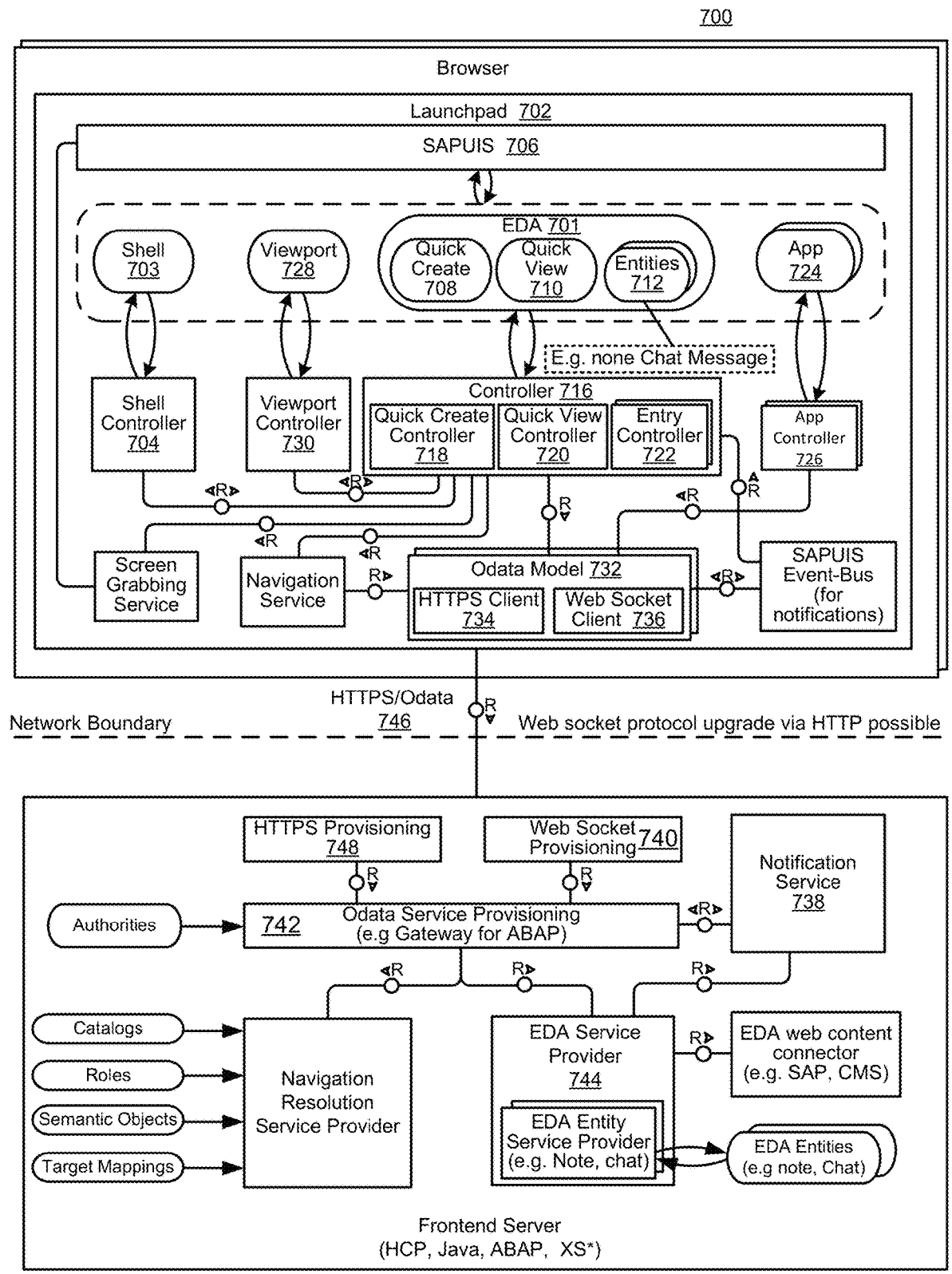
FIG. 7 is a block diagram of an example architecture to support an enterprise digital assistant, in accordance with the embodiments described herein.

Referring to FIG. 7, an example block diagram illustrates a system 700 with example system architecture for an enterprise digital assistant (EDA) 701. The EDA 701 solution includes a frontend and backend part. The frontend part includes a launchpad 702 having a shell 703 plugin (with shell controller 704, EDA Core Frontend JavaScript code based on SAPUI5 706 (quick create 708, quick views 704 and entities 712), and Contextual Analyzer Microservice (not shown) that communicate with one or more controllers 716. The EDA Quick Create 708 and Quick View 710 are applications with a small scope. Small scope applications may use a minimal number of attributes for creating data objects. To improve app developer efficiency, the Quick Create apps can be based on Smart Templates. In some implementations, rich semantic annotations can be used to enable the automatic contextual value transfer into e.g. quick creates by prefilling the form.

The controllers 716 may access or include one or more of a quick create controller 718, a quick view controller 720, and/or an entry controller 722. The launchpad 702 also includes apps 724 that may communicate with one or more app controllers 726. The launchpad 702 may also include or have access to a viewport 728 that may use viewport controller 730.

The launchpad 702 can be hosted from three different platforms: HCP, Enterprise Portal (Netweaver Java) and SAP ABAP System (NetWeaver ABAP). The EDA frontend code is platform independent and can be integrated into any launchpad implementation (HCP, Corporate Portal (Netweaver Java) and S/4 (Netweaver ABAP), assuming the launchpad shell plugin concept is fully supported. In all three frontend deployment scenarios, the EDA uses its cloud only backend service running on HCP. In other words, the EDA frontend can run on-premise or in the cloud (e.g., Fiori-as-a-Service), but the EDA backend is typically cloud only.

If a user uses multiple launchpads that are hosted on different platforms, the launchpad configuration (for example to include the EDA as a plugin and to make the plugin visible to certain user roles) is done on each platform separately. This fact will be mitigated by the services (e.g., Fiori Cloud Services), which will provide a new Cloud Cockpit and will automate this landscape setup and cloud onboarding.

The launchpad 702 may use an OData model 732 that includes an HTTPS client 734 and a web socket client 736. To propagate EDA-specific updates to end users, EDA invokes a Notification Service API 738. To notify users of EDA updates to chat messages, collections or collection items while the EDA is still active a Web Sockets 740 implementation that is tightly integrated into the EDA backend service is used.

The EDA Backend Service includes Java Application implementing the OData 2 Service 742 and persistence layer (JPA), Database Schema(s) on designated HANA instance, Configuration UI implemented with UI5. The EDA OData Service will be deployed as a Java Application onto a Provider account on the productive factory HCP landscape. It will also be integrated into the HCP Service Cockpit as a HCP platform service. The necessary service metadata, which is used by the Service Cockpit, will be provided. This metadata is used by the Service Cockpit in order to render the service tile, facilitate the automatic subscription to the app when the service is enabled, display the link to the service documentation, display the link to the service configuration UI, display the link to administration UIs, and display the link to, for example, a Service Transparency Page (e.g., for cloud reporting and monitoring).

The EDA 701 is an integral part of the launchpad 702. In general, the EDA 701 includes an application 724 that is responsible for notes, chat messages, or quick creates and quick views. In addition, a plugin is initialized by the launchpad 702 that loads the EDA application 701 on demand as well as records the users' interactions with other applications and entities. The EDA lifetime is bound to the launchpad lifetime. If the EDA is active then it will be notified by the shell 703 about context changes like app navigation 724 or viewport 728 changes. The collections and items in the EDA can be stored in relation to the context of origin or made related to a specific context in the launchpad 702 by the user, for example, to the current active app. The EDA will store the context meta-data associated to the created items. This serves as the base for deep linking, navigation, and context driven item filtering.

The EDA data may be stored on the Hana Cloud Platform and uses a user tenant account with subscription to the EDA service provider application 744. The persistency fulfills all legal requirements and sizing. The protocol to the backend is OData over HTTPS 746 using OData service provisioning 742 and HTTPS provisioning 748 on the fronted server communicating the OData model 732 on the launchpad 702.

Notifications are not to be mixed up with the EDA entities like chat messages or collection items. These are typically represented within EDA while notifications are represented within the notification center. Screenshots are supported via a client-side library and the image binary stored in the HCP document service.

The EDA uses documentation which is supported via a user assistance/help program (e.g., SAP xRay®). The EDA and user assistance program may be built within the launchpad based on the same overlay concept so that they can be displayed side by side. It is possible to have user assistance documentation in the EDA and vice versa that when the user assistance program is open for a app it is possible to chat via EDA. So both z-order variants are supported.

The following explains an example principle for a set of entities 712 created and managed by the EDA. One entity may represent a collection. Each collection may include a set of items and meta-information. The items contained in the collection can be homogeneous (all of the same type), but can as well be heterogeneous, that is, mixed (different item types). The existing collections can be accessed through the collection list which can be filtered and searched. A collection can contain several similar or different items including, but not limited to a Note, an Object, a Chat, a Quick Create, a Data Snapshot, a System Message, an EDA Message, etc.

Collections can be private, such as to support memory and the collection and its content are visible only to the owner. As soon as the first participant is invited to a collection, all items are visible to the invitee, as well as all other participants invited thereafter. A clear visual representation and affordance will be provided on collection level and possible content level where relevant to ensure that the user is aware that the collection and contained items is private, that is, especially that the collection and all of the contained items is now visible to participants post invitation.

One example collection item is a Note Item. The note item type displays text entered by the user that is augmented with system administrative data, such as created on or created by. The text in a note item is parsed. Recognized objects are highlighted and can later be added as objects to the collection. Succeeding notes (not interrupted by other item types) are combined and are displayed as one (to a certain time delay limit).

Another example collection item is a Software object Item. The object item type represents a software object. It contains visual representation like an image for product or person, the name or/ID (name preferred), the object type, additional relevant attributes depending on object type like the price, address, or relation and the time stamp. A software object item can be added to an EDA collection through a feature that discovers visible entities of the currently running application, via quick create or text analysis of chat/note messages.

Another collection item is a Chat Message Item. The chat message item type displays message text entered by the user for the purpose of communicating. It differentiates itself from the note text through the visual representation of the intent to communicate. In addition to the written text similar to the note, a chat item type includes the visual representation of chat participants, such as an image or initials, an online/offline marker, the name of the chat participant, the message text, and the timestamp. It is also possible to reference a software object from a chat.

Another collection item is a Quick Create Item. The quick create item type is used to create a entities (e.g. a Lead or Order) inside the EDA window. It displays a subset of input fields of the original create screen of the software object. The system can prefill input fields from the context of the current page or items in the EDA collection. After the object has been created it will be displayed as a regular related software object with a remark that it was created with the help of a quick create.

Another collection item is a Screenshot Item. The screenshot item type displays a thumbnail image of an area of data or screen content that was selected by the user as a snapshot. A full screen view can be triggered from the detail screen of the item as well as the possibility to navigate to the context of origin where authorized.

Another collection item is a System Message. From time to time it makes sense to alert the user about something in the EDA. Therefore a system message is can be used. Some system messages may be clicked to trigger a menu or similar. These messages are triggered by the EDA itself not by the end user. EDA system messages are not to be mixed up with notifications introduced later on in this document.

Other entities may include Augmentative Functions on Item Types. In order for the EDA to provide flexibility for the user to mix and use items, a set of functions are provided for all item types as relevant for the item type. For example, an item type can be copied and used either to create a new collection based on the item type or Add to an existing collection.

Figure 8:
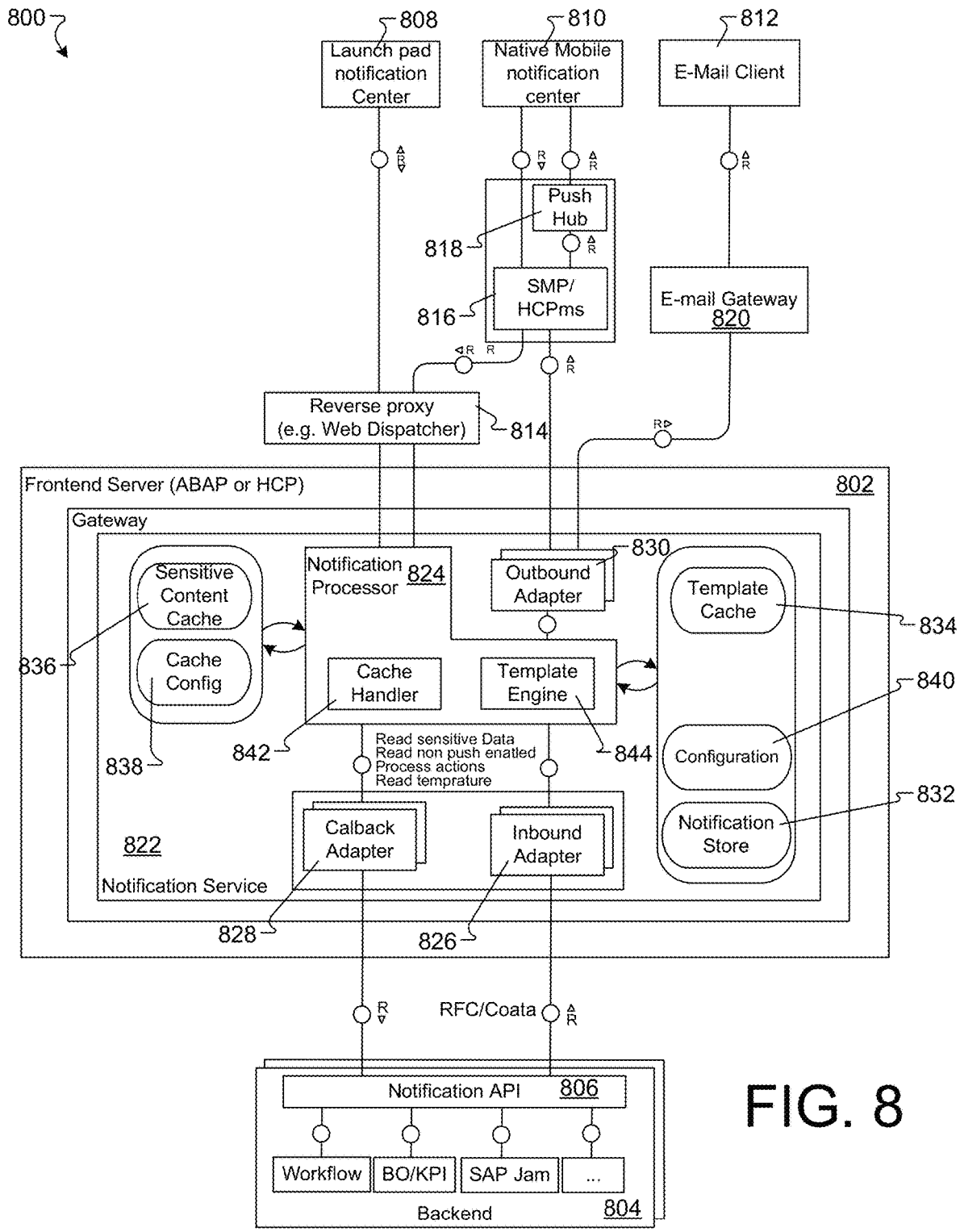
FIG. 8 is an example block diagram depicting an integration of notification services, in accordance with the embodiments described herein.

FIG. 8 is an example block diagram 800 depicting an integration of notification services. A frontend server 802 retrieves and displays notifications to a user via backend server 804 using a notification API 806, for example. A launchpad notification center 808, a native mobile notification center 810, and an email client 812 may be integrated to utilize notification services provided by server 802. Such access can be provided by a reverse proxy 814, an SMP HCP block 816 (e.g., via push hub 818), and/or email gateway 820, respectively for 808, 810, and 812.

The frontend server 802 includes notification services 822. In some implementations, the notification services 822 deliver real-time streaming notifications from a variety of system sources which may include, but are not limited to, workflows, system alerts, app reminders, approval request actions, collaborative messages, EDA notifications, user actions (confirmations), etc., pertaining to an applied user role 103 and corresponding launchpad app permissions and authorizations. As described below, notification services 822 and corresponding notification settings and banner alerts provide a comprehensive flexible and secure integrated notification solution across all enterprise apps and devices within the described multiple application experience.

The notification services 822 may be accessible as a central service to all notification providers and consumers. It may also be integrated seamlessly into the infrastructure (e.g., FIGS. 1-3). Therefore, the notification service 822 (e.g., notification services 107 in FIG. 1) may be deployed to either the on-premise Frontend Server 802 or/and as a central service on the HCP 816. The notification service 822 may serve as a central aggregation point as well as a runtime and configuration place.

The notification service 822 includes one or more notification processors 824, inbound adapters 826, notification APIs 806, callback adapters 828, outbound adapters 830, notification stores 832, templates in a template cache 834, sensitive content cache 836, cache configurations 838, and configurations 840.

The notification processor 824 is one component responsible for processing and sending notifications to the configured consumers including the template handling and processing. As such, the notification processor 824 includes a cache handler 842 to cache notifications and a template engine 844 to generate notifications using particular templates. The notification processor 824 can read (836) sensitive data from the notification provider, handle the caching (838) of sensitive data handling the consumption lifecycle (e.g., read, snoozed, etc.), handle the action processing (e.g., approved, rejected, etc.) towards the notification provider, and handle the configuration.

Inbound adapters 826 may be configured to receive the push notifications from the notification providers and storing them in the notification store. There is typically one adapter per technical communication channel (e.g., RFC, OData). The channel specific data format is transformed into the internal storage format. Depending on the backend system type, there might also be a generic component.

Notification APIs 806 may be implemented on the system 800, which provides convenient functions for the notification provisioning developer. This component may not perform any implicit commits in order to not mess with the commit logic of the caller. The Notification API is also responsible for queuing the calls towards the notification service.

Callback adapters 828 may provide backend type specific implementations to synchronously trigger the notification related functionality in the backend (e.g., triggering actions, reading un-cached sensitive data, reading templates, etc.). The Inbound and Callback adapter are a logical couple for communicating with the backend systems.

Outbound adapters 830 may be responsible for transferring the push notification to the consumption channels. There may be one adapter per technical channel (e.g., mobile, email). The adapter implementation can enrich the internal notification service data with additional channel specific data (e.g., form-factor configurations from the frontend server 802 in the mobile scenario).

Notification stores 832 store notifications that were received from the notification providers. The store 832 also contains lifecycle information (e.g., read, snoozed, etc.). It contains the notification content, which can safely be sent to non-secure communication channels like email or mobile push channels.

Templates may include text templates for generating the notification message. Templates may be stored in a template cache 834. Together with the notification data from the backend, the template engine may generate the messages for the different consumption channels. The templates (i.e., the way, the text is generated) are originated from the backend system. During the configuration time of the connected backend system, the relevant templates are replicated from the backend and cached in the template cache. The update can be triggered manually at a later time. In some implementations, the notification service may also implement a template editor (e.g., for backend systems, where no access is available). In this case, the Template Cache is not solely a cache but a primary persistence. An administrator may invalidate the cache.

Sensitive content cache 836 stores information that is related to the notification store content. The sensitive content is decoupled from the non-sensitive content in order for the user to be able to handle it differently (e.g., switching off caching for certain notification types or the lifetime of cached information). The content of the cache can be encrypted according to SEC97/106. The notification provider is responsible for classifying which parts of the notification have to be treated as sensitive and non-sensitive content. Cache configurations 838, and configurations 840 contain all relevant configurations for the notification service.

In order to enable an application as a service provider the developer implements an interface from the Notification API 806 in order to process the actions and deliver the notification types and sensitive texts. The developer may also register the implementation in the Notification API 806 for the specific provider and call a provided functionality from the Notification API 806. The notification provider also may deliver the intent for the intent based navigation on the consumption channel. Configurations done by an administrator may function to configure the landscape and the infrastructure including, but not limited to communication channels to/from the notification provider, service end point (notification service and Notification API), authentication, and protocol (e.g., inbound adapter 826/callback adapter 828).

The notification service may provide functions and features to allow administrators and the IT responsible to reliably operate the system. This includes (but is not limited to) for example monitoring for delivered and stuck notifications, logging and tracing, manual deletion of notifications, resending of notifications, and/or invalidating cache.

In some implementations, notification services 822 may be provided in a centrally aggregated fashion. Notification services 822 runs within a single entry point environment launchpad and thus, is centrally aggregated service for all native and legacy apps and system services within. As a launchpad solution, notification services may be seamlessly integrated into the enterprise multiple app environment making accessible to all notification providers, consumers and in all launchpad deployments (cloud, on-premise, native mobile apps etc.) on all devices and screen sizes. Notification services 822 may also provide runtime and configuration system components.

In some implementations, launchpad supports legacy apps and platform integration to provide user experience (UX) harmonization. In general, legacy integration may include harmonization, navigation, and integration. The combination of may provide, as much as possible, the same similar operational (e.g., interaction, navigation, control paradigms) and visual experience (e.g., component and element layouts, fonts, spacing, theme color palette, highlight colors, etc.) for legacy apps as is delivered by native launchpad apps.

Applying harmonization techniques to legacy applications provides one consistent experience across all apps contained in the launchpad and may allow incremental user adoption of, or transition to the new launchpad system while retaining use and navigational access between the launchpad user interface and legacy systems and apps within Single Point Entry Environment 100 (FIG. 1).

In some implementations harmonization may focus on the visual and internal app interaction experience of a legacy app or platform. As it is possible that legacy apps and platforms may run many multiple disparate user interface frameworks, tools, visual design, control libraries, backend bindings, etc., applying harmonization may be achieved in different ways depending on the legacy system. In one embodiment, an additional "Harmonized" user interface layer may be implemented that sits on top of an existing legacy user interface framework without the modifying or removing an existing legacy user interface framework. The harmonized layer may connect to and extract control types, behaviors, functionalities, backend content, etc. and may translate these attributes into new user-accessible controls that replicate those of the Single Point Entry native launchpad apps. Other parameters, for example, may provide the ability to apply a harmonized theme (colors and font size, style, icons and GUI elements). In some implementations, the harmonized user interface layer tool may provide additional attributes for example for modified control size, spacing/padding, screen position, modified general layout/floorplan arrangements, app navigation behaviors, etc. to further replicate an experience consistent with native launchpad apps.

In another example embodiment, harmonization of a legacy app or system may rely on existing legacy system tools in combination with making GUI programming parameter changes. For example, the legacy system may deploy a theming tool that may allow changing visual design aspects such as backgrounds, controls and interaction colors and effects, changes to focus highlights, roll-over indications, etc. that may further move the legacy app to provide a similar experience to the experience of interacting in the native launchpad app. In some implementations, programmatic changes may also be possible. For example, programmatic changes may include any or all of replacing icon and visual element assets, programmatically modifying CSS attributes, and changing or adding animation and transitions that may further move a legacy app towards the native launchpad app experience.

Figure 9:
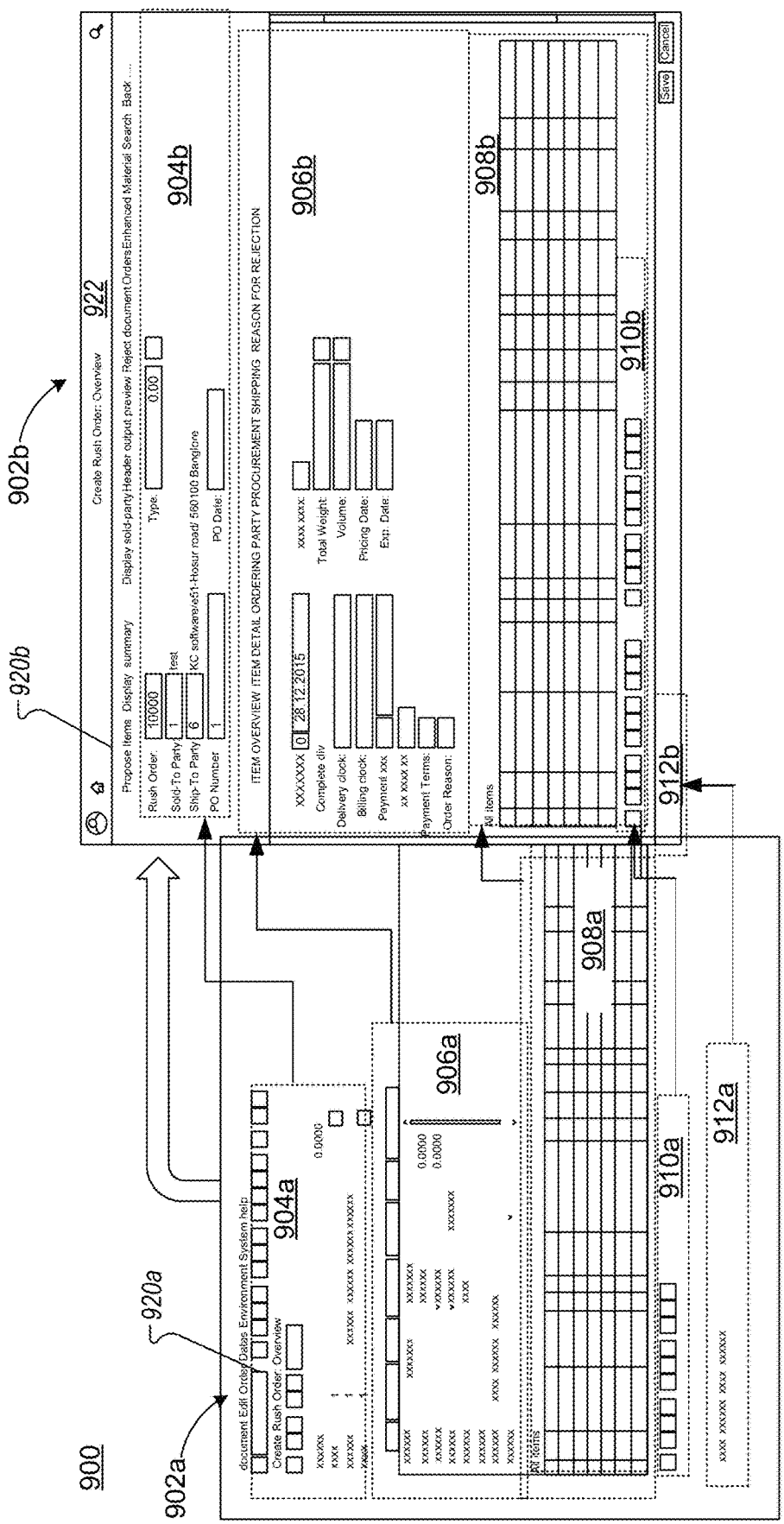
FIG. 9 is an example of harmonizing a screen for a legacy application, in accordance with the principles of the present disclosure.

FIG. 9 is an example of harmonizing a screen 900 for a legacy application, in accordance with the principles of the present disclosure. Screen 902a depicts a version of an application (e.g., a legacy application) before harmonization. Screen 902b depicts an illustration of screen 902a after undergoing visual harmonization techniques. Here, the systems and methods described herein were used to generate a consistent (e.g., cohesive) user experience overlaid onto a legacy application. In particular, the systems 630, 700, and 800 can be used to turn a create rush order overview area 904a into a similar area 904b that provides the same functionality with an updated look and feel (i.e., user experience) that is consistent with the launchpad infrastructure, for example. Similarly, area 906a can be updated to example areas 906b and areas 908a and 910a can be updated to areas 908b and 910b, respectively.

In some implementations, the harmonizing of such screens, apps, functions, etc. can be implemented using screen persona software. For example, screen persona software may be used to transform legacy applications and functions into native launchpad apps (e.g., SAP Fiori® apps) and functions. In general, the screen persona software is a software implementation that allows personalization of particular screens, apps, functions, etc. The screen persona software may enable drag and drop modification of screens, apps, and functions.

The screen persona can be used to integrate legacy apps and systems into the launchpad navigation paradigm. In the depicted example, controls (e.g., icons 920a) may be turned into a text toolbar 920b to provide ease of use. Similarly, headers and title bars may be merged to generate a cohesive title bar 922. In addition, footers, processing actions, saving actions, closing actions, navigating actions, and disabling or hiding actions can be reconfigured using screen personas to provide a common look and feel between legacy applications and native launchpad applications, for example. In some implementations, new icons, condensed content and label alignment can be achieved for legacy applications using the screen persona software.

As a Single Point Entry Environment, the launchpad system (e.g., launchpad 101) implements and provides operational support for legacy apps and systems. Legacy integrations include visually and physically deploying one or more legacy apps in the launchpad in the form of a home tile or link thus providing user access to legacy apps and systems in the same, (or similar) ways as launchpad native apps.

Navigation from within an app to another app or an object within an app is also included in the launchpad navigation paradigm and experience. As legacy apps and system may deploy different user interface technologies and navigation methods, certain incompatibilities with the launchpad user interface technologies and navigation methods can be addressed to accomplish a harmonized launchpad experience.

Performing harmonization may include identifying and determining dimension requirements related to app navigation, including but not limited to Navigation Environment (e.g. browser shell, legacy GUI, launchpad), App user interface technologies and frameworks, (e.g. launchpad UI5, other legacy user interface technologies and frameworks), desired window behaviors, (e.g. In-Place within launchpad, ex-place in another browser window or tab), Navigation Methods to be used, (Intent-Based Navigation (IBN), Object-Based Navigation (OBN), Absolute navigation), and Determine start navigation and App Lifecycle parameter requirements.

Figure 10:
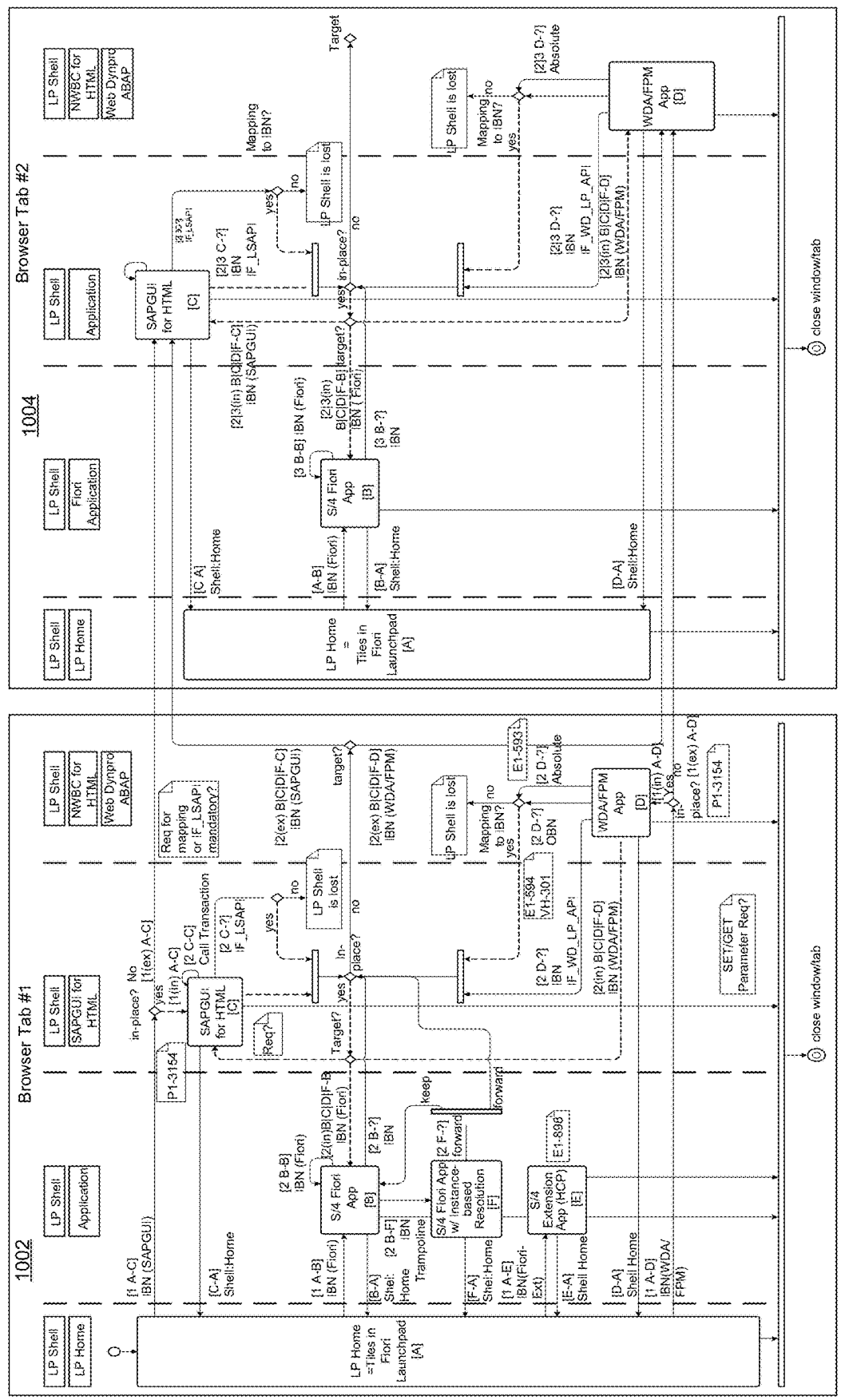
FIG. 10 is an example mapping schema supporting conversion legacy apps into launchpad apps, in accordance with the principles of the present disclosure.

In some implementations, the launchpad makes use of Intent Based Navigation (IBN) flexible navigation mapping schemas. This means that on starting a navigation, the source application communicates the intent of navigation to the launchpad, but may not communicate an explicit target application. The launchpad may then perform a lookup in its repository and start the application matching the requested intent. An example embodiment of one such a mapping schema from a first browser tab 1002 to a second browser tab 1004, as illustrated in FIG. 10.

Figure 11A:
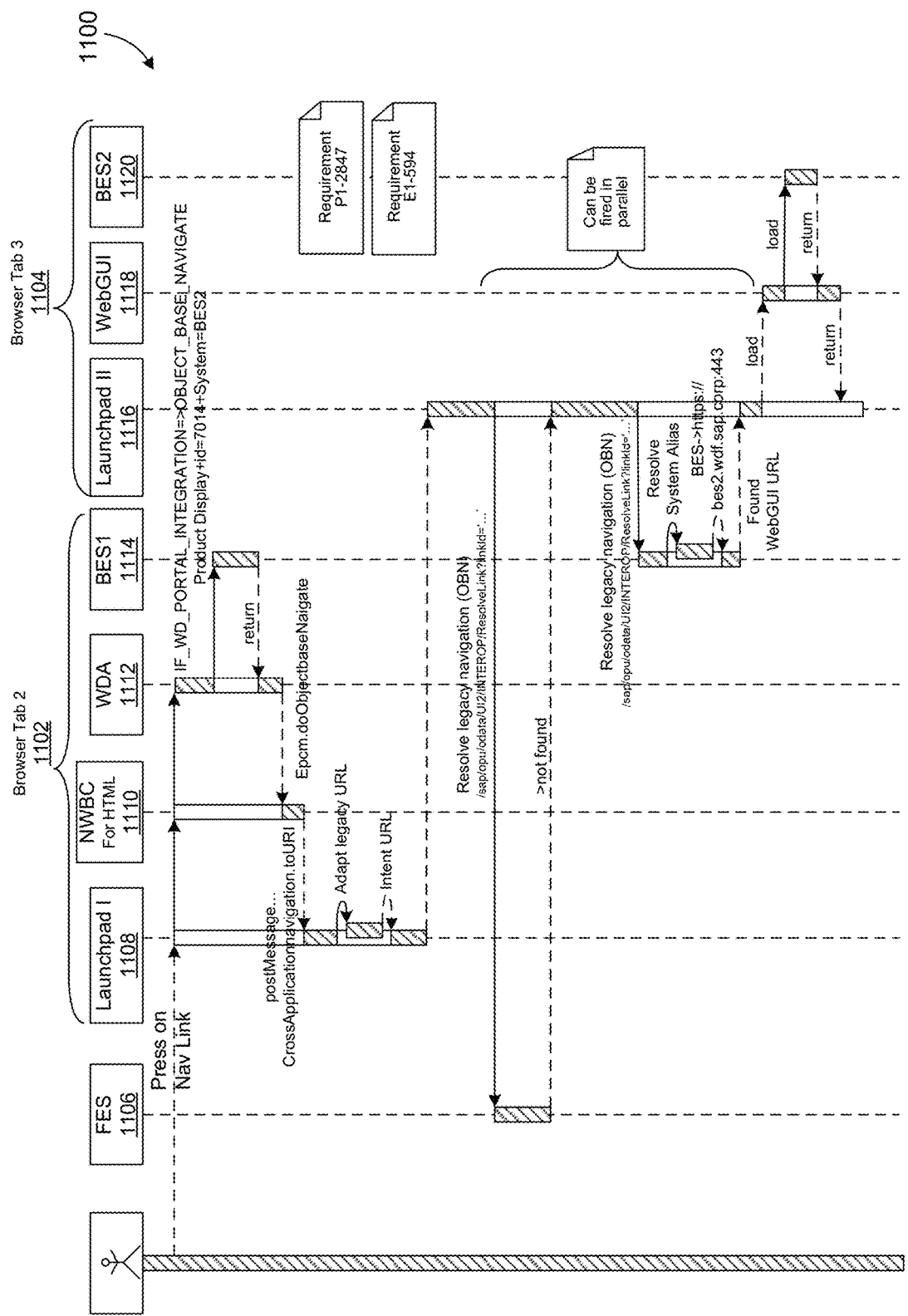
FIGS. 11A-11C are example swimlane diagrams depicting translation of three legacy applications into launchpad ready applications, in accordance with the principles of the present disclosure.
Figure 11B:
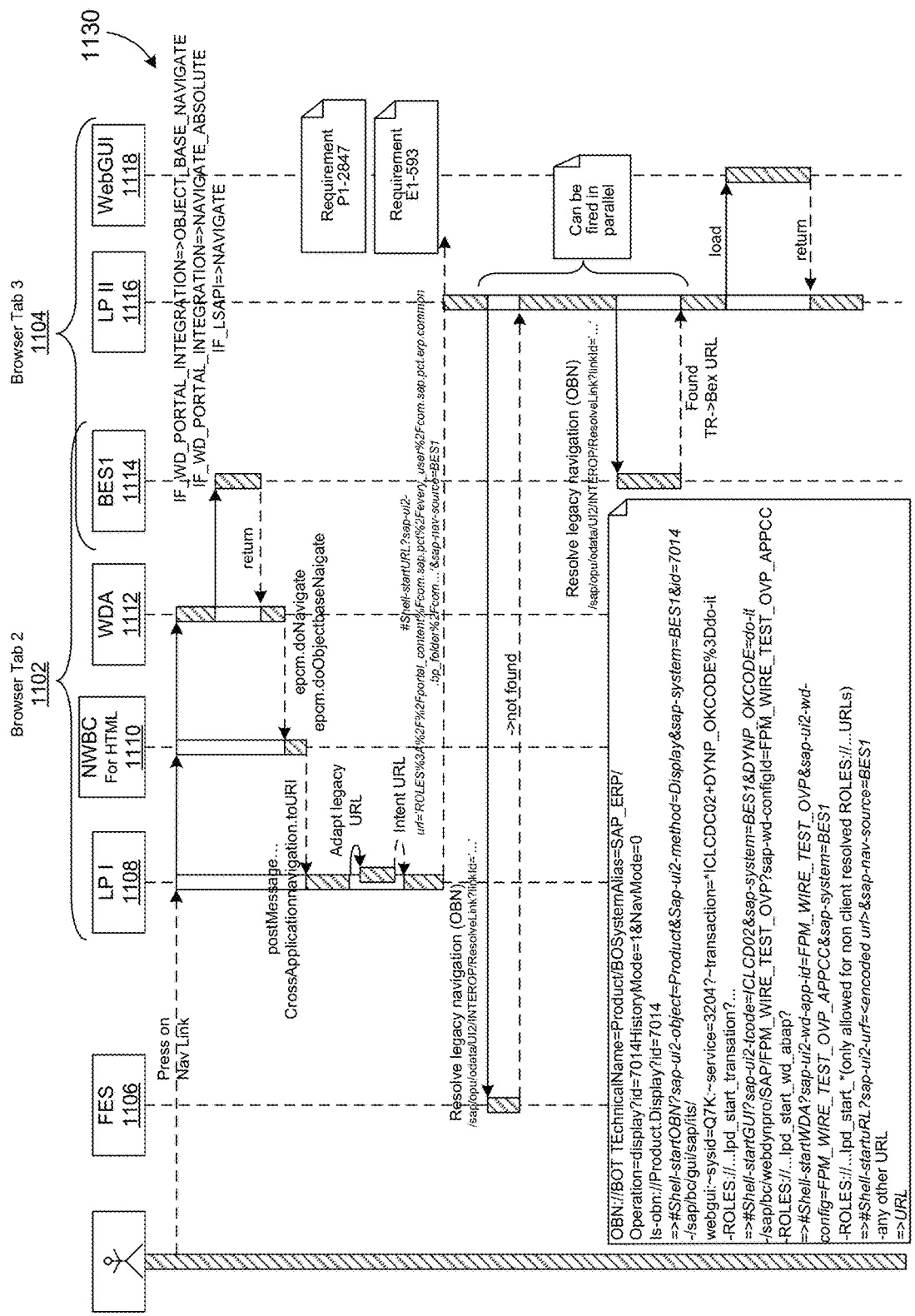
Figure 11C:
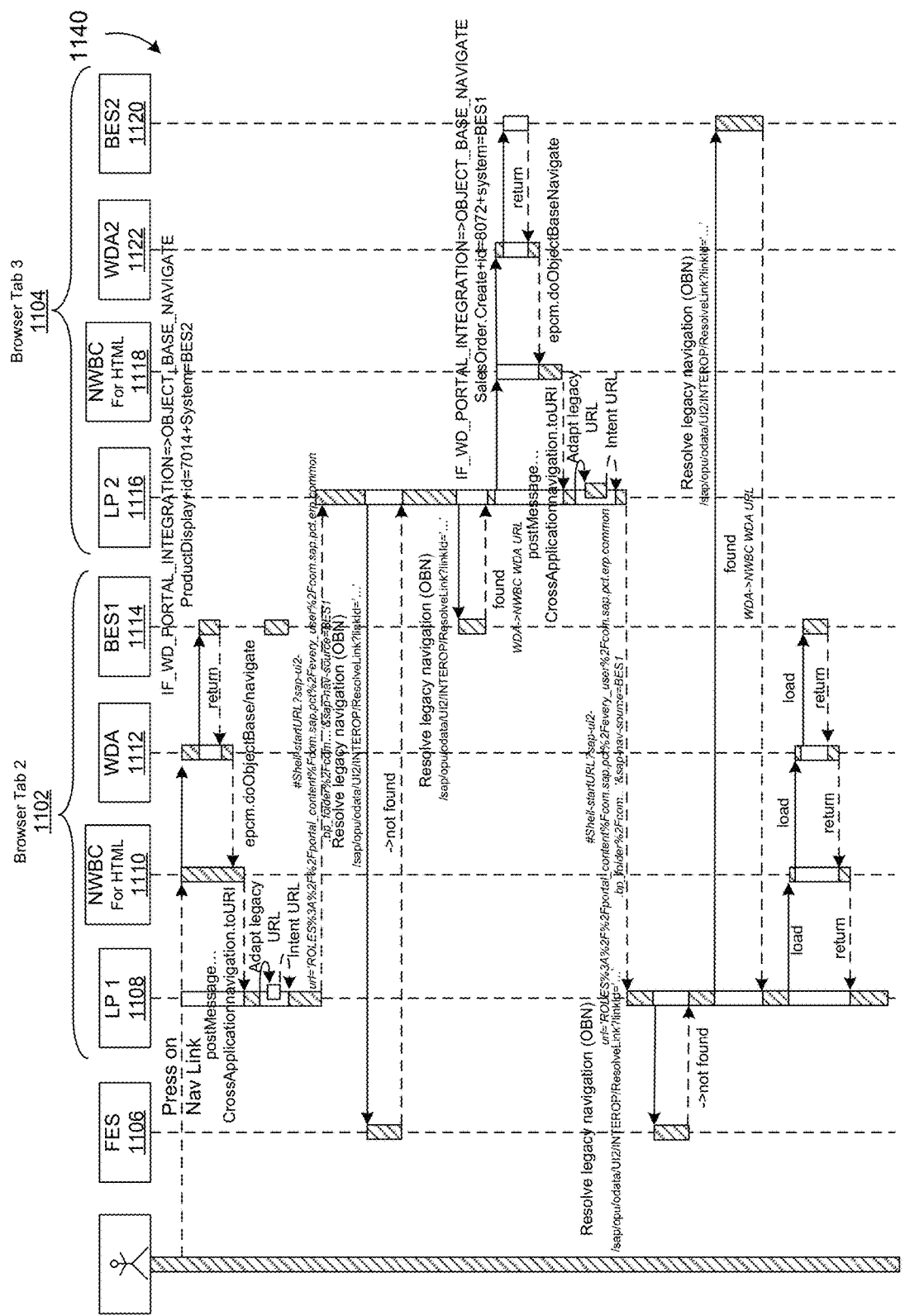

FIGS. 11A-C are example flow diagrams depicting translation of three legacy applications into launchpad ready applications, in accordance with the principles of the present disclosure. In general, the mapping schema may use an intent based navigation with at least three parts: a semantic object, an action, and parameters. The semantic object may describe the entity (e.g. user, cost center, order, etc.). The action defines what shall be done with the semantic object (e.g. display, edit, create . . . ). The parameters may contain further information for instantiating the target application (e.g. the user id, the cost center number, etc.).

To start navigation via the launchpad IBN method, the application may execute a call to an API provided by the launchpad and thus, provide an intent. After this, other incompatibilities may be addressed. For example, while the launchpad is JavaScript based and executing (i.e., running in a browser alongside the browser's JavaScript navigation API), other legacy systems may have completely different navigation methods and non-web app architectures (e.g. app code running on a backend system). To bridge frontend-backend boundary limitations, among other technical barriers, various architectures, code extension methods, user interface presentations, APIs, etc. may be deployed according to navigational use cases to deliver a launchpad navigation paradigm experience within the Single Point Entry Environment to support legacy apps and platforms. In some implementations, the launchpad may make use of Object Based Navigation (OBN) methods for launchpad navigation scenarios, for example, as related to SAP WebDynpro ABAP legacy applications (WDA).

FIG. 11A shows an example swimlane diagram 1100 of object based navigation implemented for applications on the launchpad. In particular, the flow diagram pertains to navigating WebDynpro ABAP legacy applications (WDA) to a launchpad platform. As shown, a front end server (FES) 1106 may present any number of legacy apps executing, for example, in browser tab 1102 and browser tab 1104. A first launchpad 1108 (e.g., launchpad I) may be operating in the browser tab 1102. In addition, the NWBC for HTML 1110, WDA 1112, and enterprise service 1114 may also be operating/executing in browser tab 1102. Similarly, a second launchpad 1116 (e.g., launchpad II), a WebGUI 1118, and a second enterprise service 1120 may be operating in the browser tab 1104.

To begin a navigation, a user wishing to operate a legacy application that underlies a application may select a navigation link provided by the application in a graphical user interface application. For example the launchpad 1108 may receive the selected link input and request the NWBC 1110 to post a cross application navigation message to provide a URI via the launchpad 1108. The NWBC 1110 may pass the input at the link onto the WDA 1112, which passes portal integration instructions to the enterprise service 1114. The enterprise service 114 returns an updated linking response to WDA 1112 which returns an object base navigation link to the NWBC 1110. The launchpad 1108 may then adapt a legacy URL and/or an intent URL and pass the URL to the second launchpad 1116. The second launchpad 1116 may resolve legacy navigation (e.g., OBN) to provide the front end server 1106 with a functional link from the application to the legacy application.

If the functional link is not found or not able to be generated, the second launchpad 1116 may resolve the legacy navigation (e.g., OBN) with the enterprise service 1114. The enterprise service 1114 may resolve system aliases, and/or employ one or more other enterprise services until a functional link is found. The enterprise service 1114 may then pass the link to the second launchpad 1116, which can load the link to the WebGUI 1118, which loads the link to the second enterprise service 1120. The second enterprise service 1120 may return the link to the WebGUI 1118, which returns the link to the second launchpad 1116.

FIG. 11B shows an example swimlane diagram 1130 of an absolute navigation implemented for applications on the launchpad, for example, for browser tab 1102 and browser tab 1104. In particular, the flow diagram pertains to navigating WDA legacy applications to a launchpad platform. The FES 1106 may pass input to a first launchpad 1108, which may pass data to NWBC 1110, WDA 1112, and BES1 1114. Such input can be returned to WDA 1112, NWBC 1110 and launchpad 1108 in order. The launchpad 1108 can adapt legacy URLs and intent URLs and pass them to a second launchpad 1116 and WebGUI 1118.

FIG. 11C shows an example swimlane diagram 1140 of remote object based navigation implemented for WDA applications on the launchpad. In the current state, when OBN navigation is triggered inside of NWBC or Portal, resolving of the OBN is always done against of a host system, from which NWBC/Portal has been loaded. For example, if a user connects to NWBC on BES1 and loads application APP1, OBN navigation is triggered to an application APP2 located on system BES2—i.e., resolution of OBN target is done on host system—BES1. Further, in APP2 on BES2, the user triggers OBN navigation to APP1 on BES1. OBN may then be resolved on host system BES1. In the launchpad, when the user can work simultaneously with two NWBC host systems, BES1 and BES2 can be utilized directly. In this case, if the user loads APP2 directly from BES2, further OBN navigation triggered from such an activity will be resolved against NWBC host system (which is BES2 now). Thus, resolution may lead to a different target than resolution done on BES1. Therefore, OBN resolution performed for the same app, can be different depending on the way a user accesses the app.

It may be difficult to automatically detect input parameters for a target application. Parameters can be passed as SET/GET, as shared memory objects or DB entries. The calling of the alternative application may result in difference to expected behavior while calling for the alternative target is not blocking, and no values can be returned in that scenario. A LEAVE TO TRANSACTION may behave differently compared to a CALL TRANSACTION.

In addition to usage of SET/GET parameters as containers for passing initial values to selection screens of target transactions during navigation, they are also used in a GUI environment to fill default values, for new started standalone transactions. SET/GET parameters used for passing start values for targets during navigation may not have to be persisted. The system may instead perform a restore of default values in a UI if transactions are directly started in new, parallel sessions. One example solution here may include a lazy store of SET/GET parameters on write in persisted storage (user dependent, database) and a subsequent restoring of such defaults from persisted storage in the new session upon a first access.

Figure 12A:
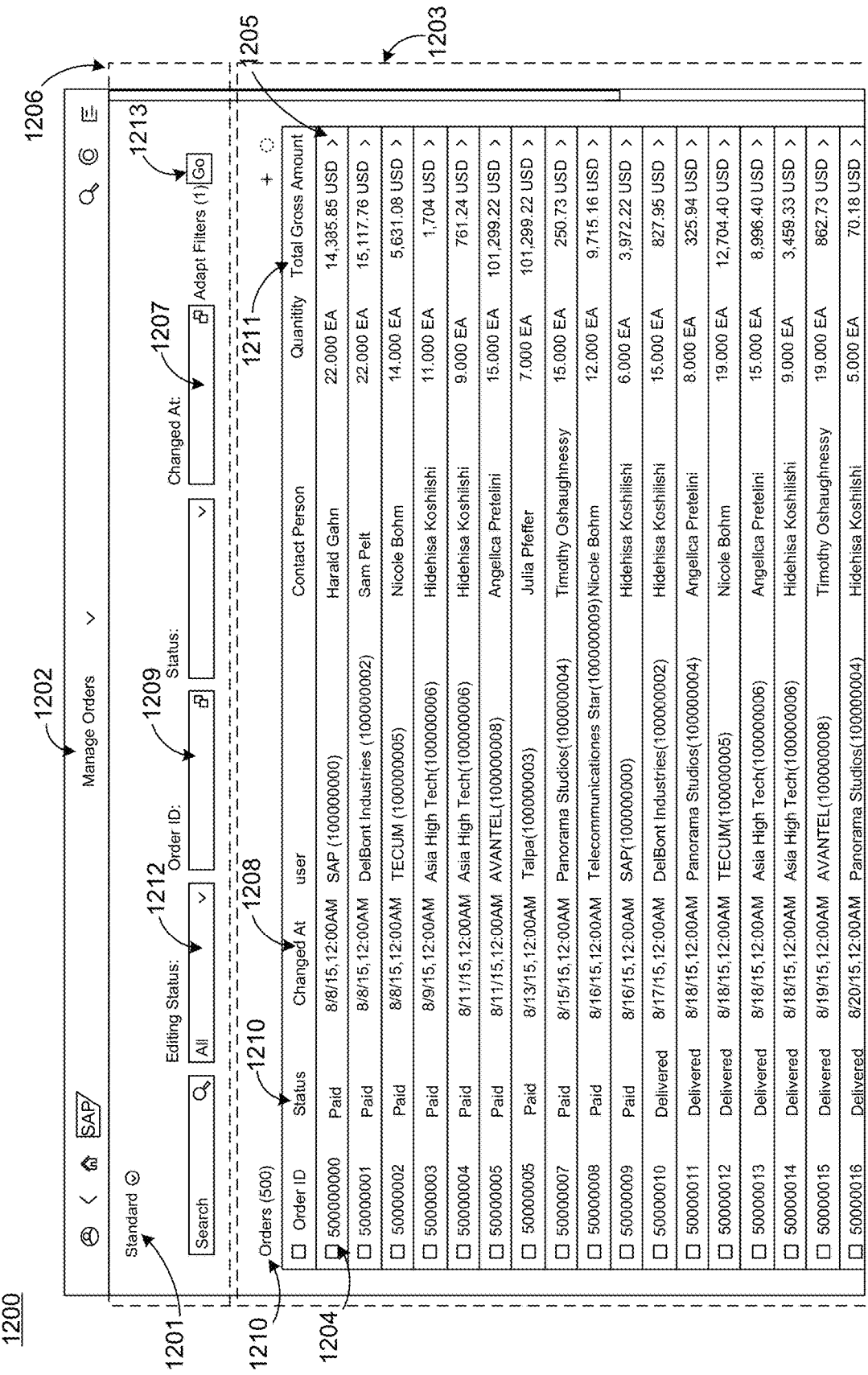

FIG. 12A is an example graphical user interface 1200 for entering an order using a standard variant 1201. In general, the interface 1200 may be accessed and utilized by an enterprise user in a sales manager role. For example, a user may be operating an order application 1202 and may wish to generate and/or manage variants of such an application (or portion of the application) for a new launchpad tile.

An area 1203 displays order data in a table that may be listed by order ID numbers 1204. In some implementations, among other functionalities, the user may select a row corresponding to order ID 1204 by clicking or tapping on arrow icon 1205 to view details associated with order ID 1204. A filter bar area 1206 may display an array of filter settings and functions that may change the format of the data table 1203 in various ways. For example, a user may select the Changed At filter 1207 to limit the table 1203 to a subset of Changed At date/times as listed in column 1208. In some implementations, a user may select the Order ID filter 1209 to limit the table 1203 to a subset of Order ID numbers as listed in column 1210. In some implementations, according to an example use case the user may desire to limit table 1203 to display only paid status orders listed in column 1210, as viewing only a paid orders list with corresponding Total Gross Amounts in column 1211 may be of importance in producing daily reports. Accordingly, the user selects Editing Status filter 1212 and changes the filter from All (as shown) to Paid, and then selects the Go button 1213 which applies the filter setting to the table as shown in FIG. 12B.

Figure 12B:
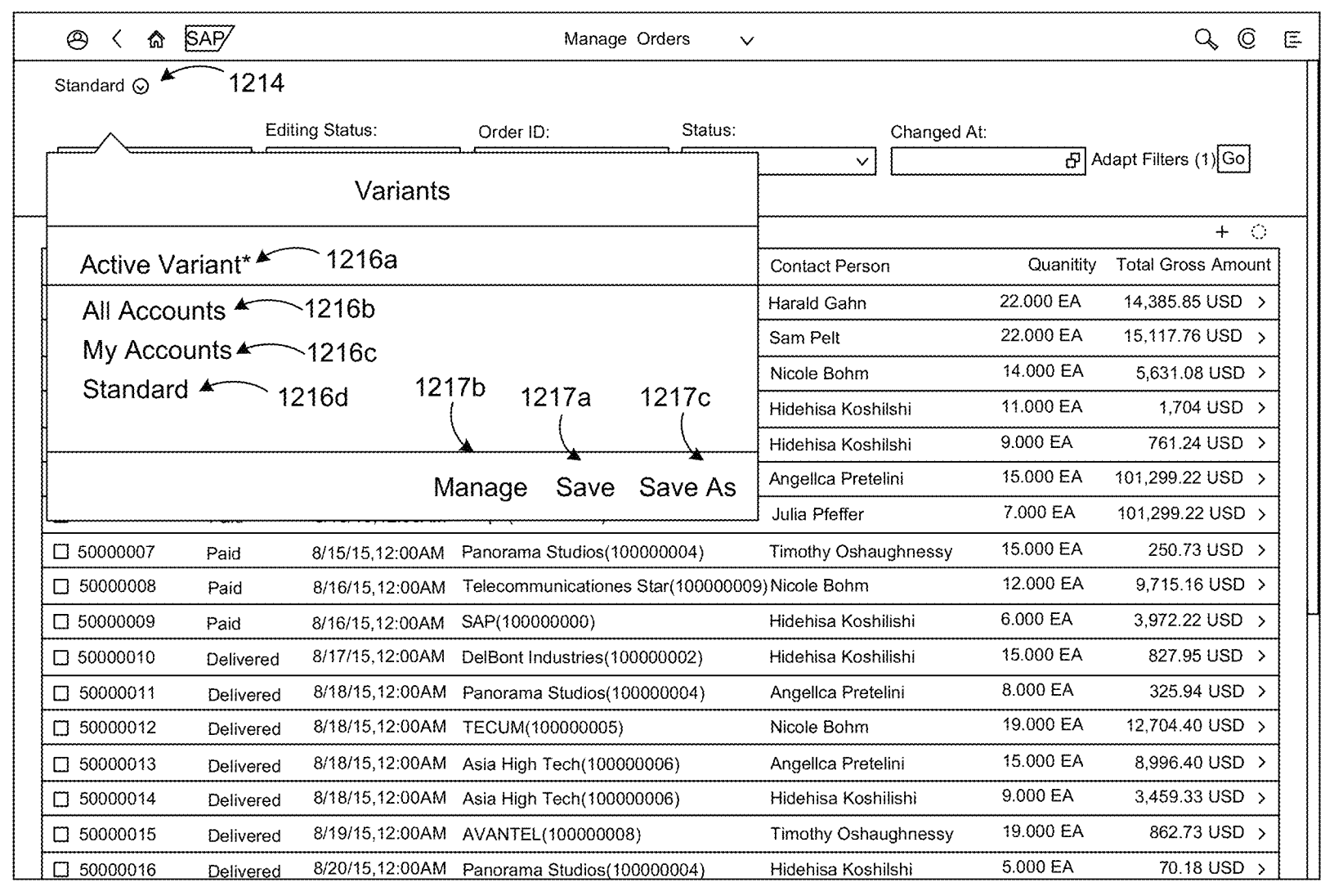

Referring to FIG. 12B, the user may decide to create a new variant tile on the launchpad and to do so may select button 1214 to open the variants drop-down 1215. In some implementations, drop-down 1215 shows a current active variant 1216a with a highlighted list indication, an All Accounts variant 1216b, a My Accounts variant 1216c, and the standard variant 1216d, which may be the original launchpad app from which one or more variants may have been derived. The variants shown at 1216a-d depict a listing of prior and current variants that may have been created as a launchpad tile, or saved within an app for later selection.

In some implementations, the highlighted current active variant 1216a may be a version of another variant whereby the variant changes have been made, but not yet saved, for example, in a standard variant 1216c after adjustments to filters in area 1206 of FIG. 12A. In some implementations, the Save button 1217a may be disabled or active in accordance with some, a combination or all of the above-mentioned variants change states.

Figure 12C:
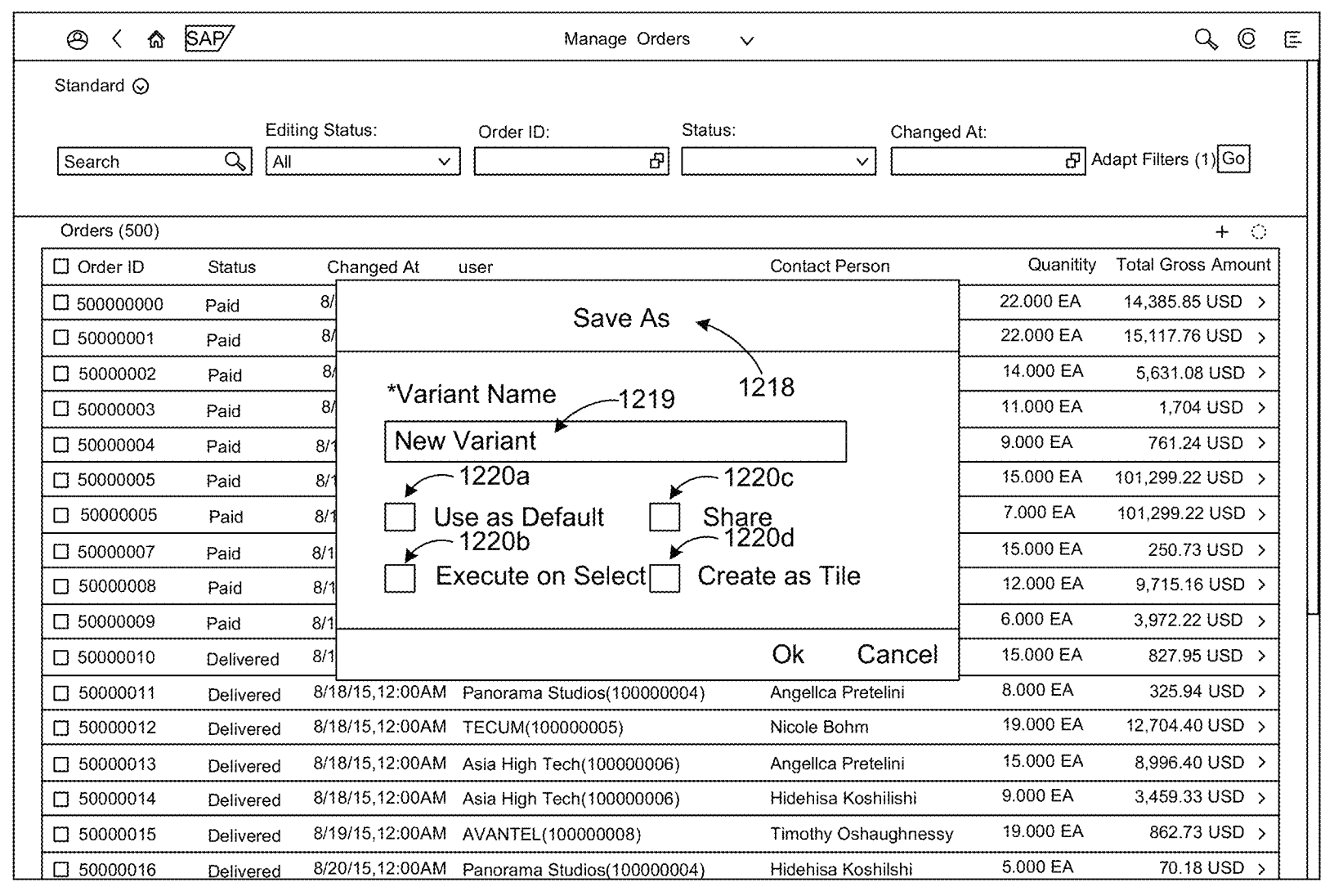

In operation of the order application, the user may elect to select the Manage button 1217b whereby a dialog may display options including setting a default variant version, deleting a variant, renaming a variant, etc. In the depicted example, the user selects a Save As button 1217c, which may open a dialog as shown in FIG. 12C at 1218. Dialog 1218 displays options for the save as, which may include, entering a name for the new variant at 1219, enabling the new variant as a default at 1220a, execute on select at 1220b, which may eliminate selection or provision of a go/execute button 1213 when changing variants in the filter bar 1206 in FIG. 12A. Other options may include a share option at 1220c which may make the variant available to other users, and a create as Tile option at 1220d.

The user in this example provided a number of entries and selections, as shown in FIG. 12D. A dialog 1221 whereby a new variant name, e.g. Paid Orders were entered in field 1222, and Create as Tile 1223 was enabled via, for example, a checkbox or other select-type control. In some implementations, the user then selects the OK button 1224 which in turn may close the dialog 1221 and display the new variant application as shown in FIG. 12E.

Figure 12F:
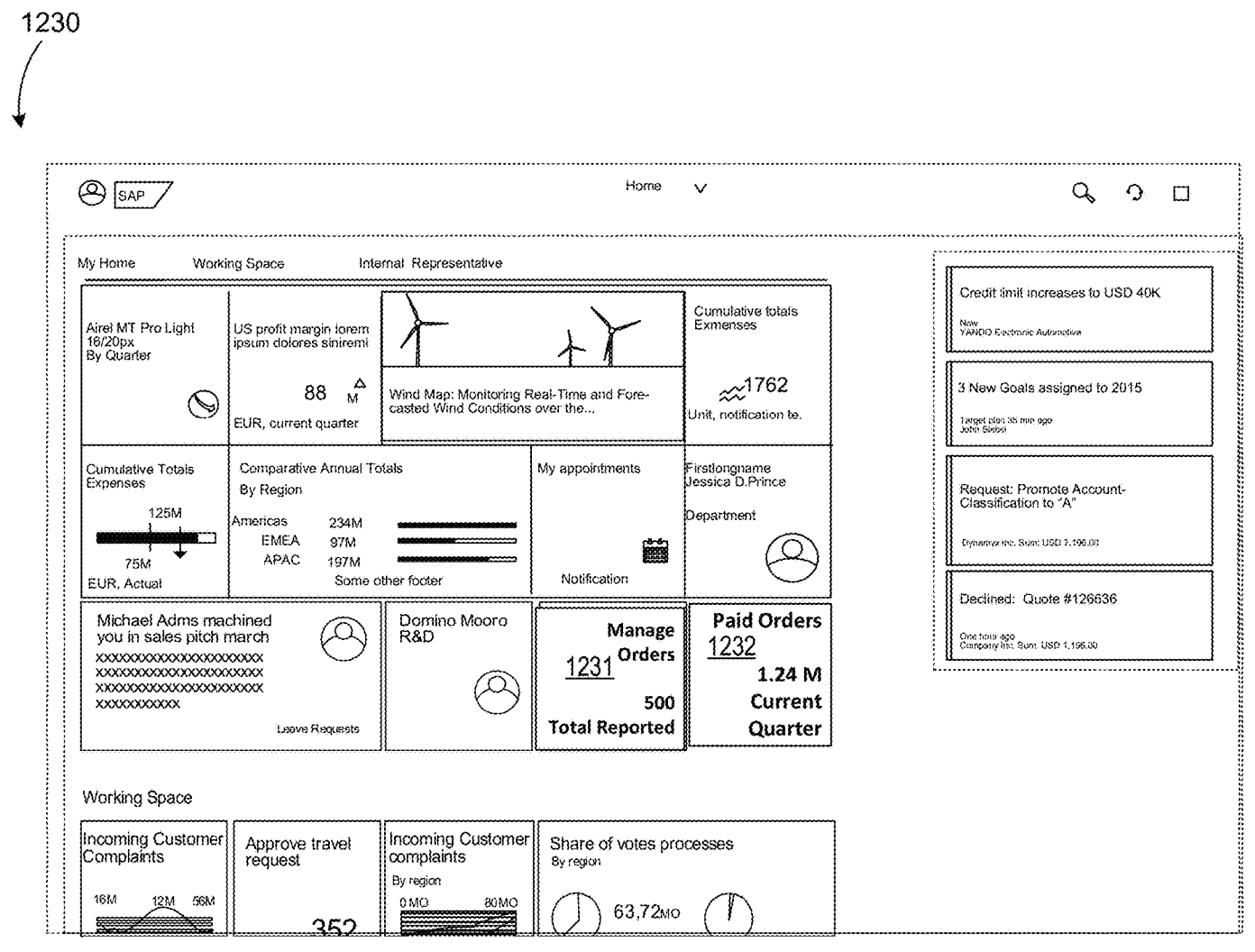

In FIG. 12E the GUI 1225 now shows the new variant name 1226, the filter change to Paid status 1227, and the table change whereby all orders in the list now only show paid status orders as shown in column 1228. In some implementations, upon returning to the launchpad home as shown in FIG. 12F, launchpad home GUI 1230 now shows the original standard Manage Orders app tile 1231 and the new variant Paid Orders app tile 1232 including display of the current quarter aggregate amount 1.24 M. In some implementations, attributes of a tile may be determined by a user, for example display of the aggregate current quarter amount as shown. In addition, a user may move a tile to another location within a grouping or to another grouping as is described later in this specification.

FIGS. 13A-13E depict example screenshots of a launchpad enterprise search (LES) application, in accordance with the principles of the present disclosure. In general, the launchpad 101 shown in FIG. 1 deploys a contextual enterprise search 110 function and GUI. Large global enterprise organizations may store tens of thousands, or even many millions of documents, records and entities over time, (navigation targets), any of which may be in multiple languages. This presents a myriad of search data related issues to overcome, including but not limited to organization, categorization, prioritization, user relevance balancing, providing a usable responsive GUI on multiple devices and screen sizes, and data management and data navigation management. Simply managing the sheer magnitude of data and search navigation targets. The LES may provide features that overcome the above search issues.

In some implementations, the enterprise search functionality may be from a user-based context and may apply a user role with associated permissions and authorizations that may limit access to certain documents and objects, including but limited to apps, and company, user, and product information, order information, etc. when returning information from search queries. In some implementations, contextual limits and permissions may be configured by a system administrator or the system itself.

In some implementations, the launchpad enterprise search (LES), may incorporate user behaviors and launchpad activities that may utilize machine learning and matching algorithms to personalize and improve the accuracy and user-relevance for rankings of the LES results and suggestions, including but not limited to recent EDA activities and contexts, most used or recently used launchpad apps, notification content and contexts, contextual creation of app variants, etc. In some implementations, the LES may use the context of the current app opened and in the background of the launchpad work space, for example if the current app is of a particular context, LES query returns and suggestions may prioritize display of the particular context associated with related information and entities. In some implementations, the LES may provide search results from other data providers, for example in a Tab selector control organized from left-to-right according to the number of result hits allowing the user to select or switch between tabs to quickly and easily view result categories.

Figure 13A:
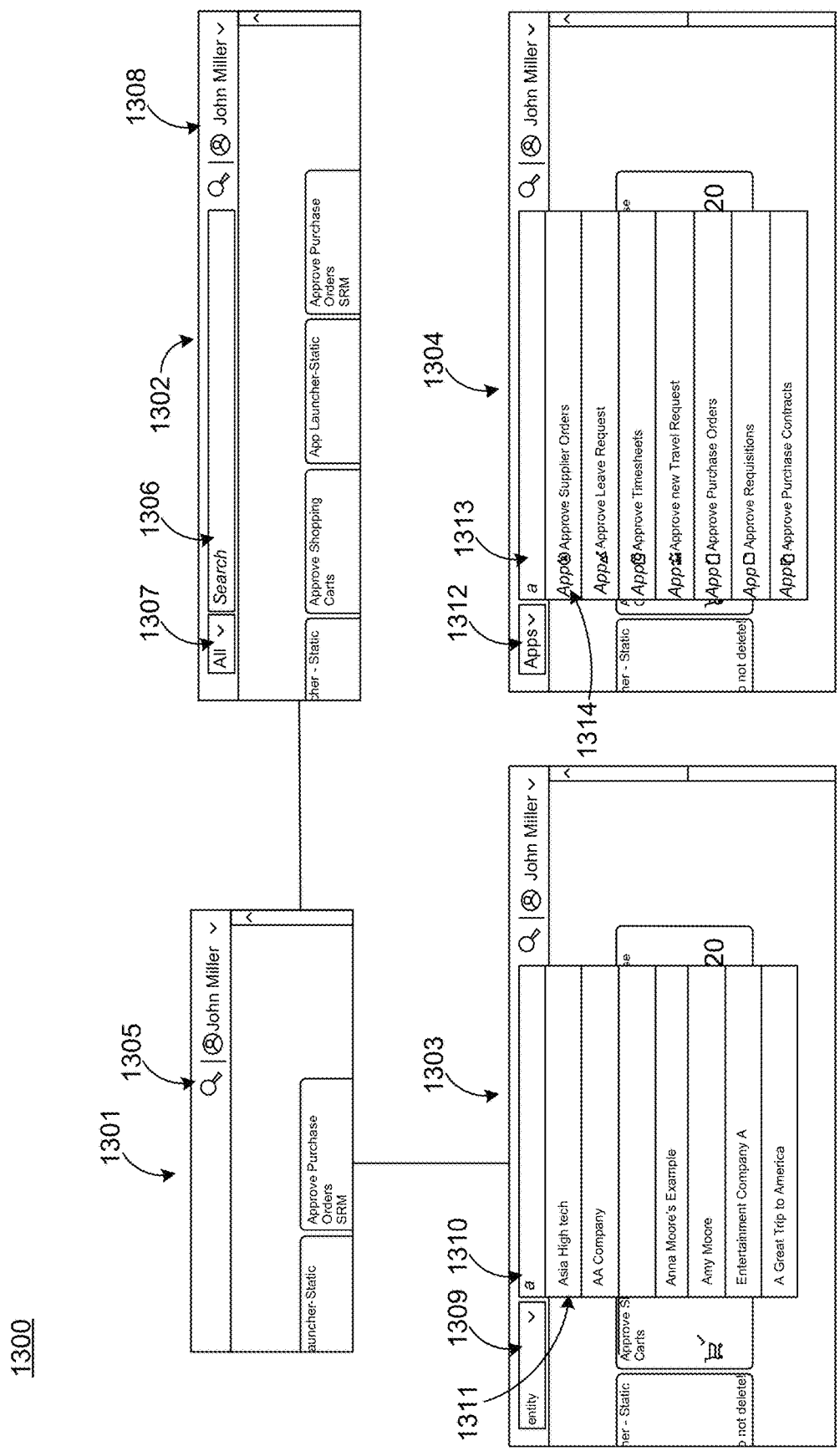
Figure 13B:
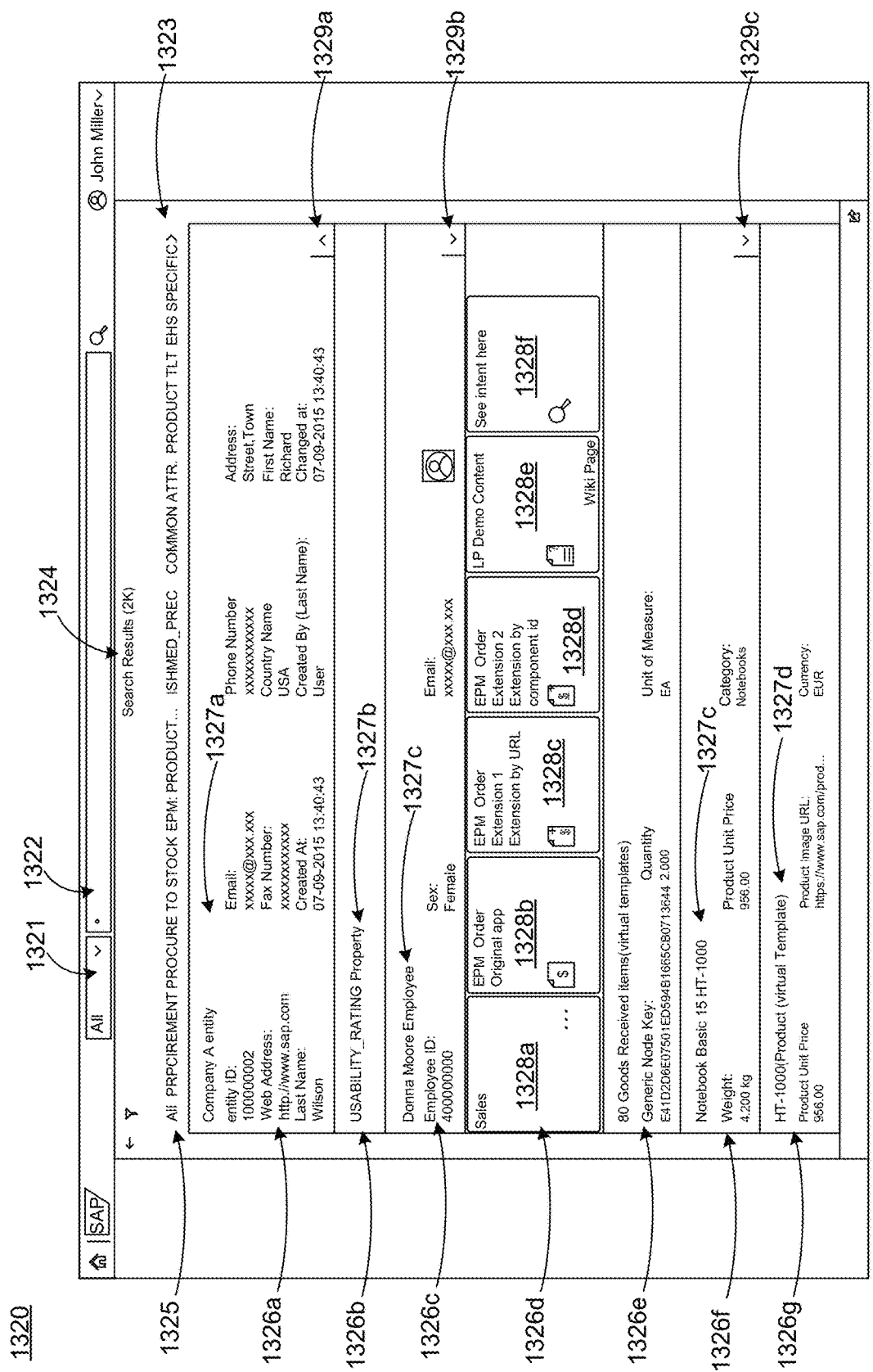

FIG. 13A shows partial views of the LES search bar user interface 1300 in various states and search parameters 1301, 1302, 1303, and 1304. In some implementations, state 1301 represents a normal resting state showing only the magnifier icon button 1305. Upon selecting the icon button 1305 the LES search bar user interface 1302 is displayed comprising of a search field 1306 and a search type menu button 1307 shown with "All" selected as a default. In some implementations, the search type menu may contain contexts for search criteria, for example including but not limited to All, Business Partner, software objects, Apps, Materials, Orders, Users, Contacts, etc. In some implementations, if nothing has been entered in search field 1306, selecting the icon button 1308 while in state 1302 will close the search field 1306, remove the type selector button 1307 and reverts back to state 1301. In some implementations, while in state 1302 pressing the enter key on the keyboard will invokes a search for "All" as is shown as selected in 1307, and place an asterisk symbol (*) in the search field with an accompanying search "All" query return as shown in FIG. 13*b*, result list user interface 1320.

In some implementations, launchpad enterprise search (LES) may be used to return navigation targets to different types of search criteria for example including but not limited to All, Business Partner, software objects, Apps, Materials, Orders, Users, Contacts, etc. As shown in FIG. 13A, icon button 1306, 1309 and 1312 different search criteria may be easily selected by a user. Selecting icon button opens a menu, (not shown), containing a list of possible sections. In some implementations, an "All" criteria may also be included. As mentioned above, any one or all search criteria selections may contain thousands or even millions of relevant navigation targets enterprise applications resulting in an unmanageable number of search return possibilities. In some implementations, in addition to methods described above, (e.g. filter, app context, priorities according to the number of hits, user role contexts, etc.), the LES may track contexts of a user's actual behaviors using the launchpad and apps to, inter alia, return LES results per semantic object sorted by actual usage of the system. In some implementations, this may be achieved by deploying a dedicated usage personalization container app to store all user clicks in conjunction with a service to sort get links calls, (get links method), according to a user's actual usage of the system.

In some implementations, a getLinks service may use a central navigation event to track a user's actual navigations. This method may assume that all navigation steps should trigger the event. In some implementations, the getLinks service may filter out navigations that may not have been registered to the service. In an additional embodiment, the getLinks service may be encapsulated in a cross application navigation service to retrieve the actual targets available that may be later sorted based on actual clicks events performed.

State 1303 as shown is a result from a user selecting a Business Partner context in the search type menu 1309 and typing the letter "a" in the search field 1310. In some implementations, upon typing a character or characters into the search field, in this case the letter "a", a search is carried out and suggestions 1311 are displayed in a list under the search input field 1310. In some implementations, continuously typing characters dynamically generates suggestions according to the entered characters. In some implementations, suggestions 1311 may also be influenced by the contextual functionality of the LES above, for example the Business Partners suggestions 1311 may prioritize (place at the top of the list) those the user has recently communicated with. In another embodiment, according to the example shown in state 1303, the LES may also include, at a lower priority and position in the suggestions list, partners according to the user's role and domain even if the user has had no communications with these partners at all.

Referring to FIG. 13A, state 1304 as shown is a result from, for example, a user selecting an "Apps" context in the search type menu 1312 and typing the letter "a" in the search field 1313. In some implementations, according to this example, suggestions 1314 display a list of apps containing the letter "a." In some implementations, the LES contextual functionality may prioritize (place at the top of the list) those apps containing the letter "a" that the user has recently used. In some implementations, the apps shown in suggestions 1314 may include those located in the launchpad home. In some implementations, the apps shown in suggestions 1314 may also include those located in the launchpad 101 App Finder 112 catalog of FIG. 1. In some implementations, suggestions 1311 may also include apps according to contextual relevance. In some implementations, suggestions 1311 may also contain app variants created by the user. In some implementations, the apps shown in suggestions 1314 may be launched directly from recommendation list 1314.

Referring to FIG. 13B, a result list user interface 1320 depicts an example of a launchpad enterprise search (LES) result for "All," as shown in type selector 1321 and an empty search field 1322 with only the symbol (*) as was previously described in FIG. 13A. Area 1323 is a tab list of search results from other data providers arranged from left-to-right according to the number of hits (e.g. categories with the most hits are displayed first). Tab 1325 is shown as selected with a semantic color and underline indication. The number of search results corresponding to the selected category tab, (e.g., 2K) is displayed in the title text 1324. Beneath the tab area 1323 is a scrollable ranked results list of all matching items arranged as a series of horizontal tiles 1326*a-g* with the top ranked item at the top of the list. Each list tile 1327*a*, 1327*b*, 1327*c*, and 1327*d* may incorporate a selectable element, e.g. text, icon or another element type to show detailed information corresponding to the list tile, for example, display a document or image, a data visualization, navigate to an object, display a record, etc. List tile area 1326*d* displays a horizontal arrangement of app tiles 1328*a-f*. In some implementations, if more app tiles are available than can fit, the list tile area 1326*d* may be horizontally scrollable. In some implementations, selecting any of app tiles 1328*a-f* directly launches the corresponding app. In certain tile list items, for example 1326*b*, 1326*c*, and 1326*f*, may incorporate expand/collapse arrow controls 1329*a-c* respectively to show or hide additional list tile content in order to save screen space. As shown in FIG. 13B, list item 1326*a* incorporates an up arrow 1329*a*. In some implementations, selecting up arrow 1329*a* may collapse list item 1326*a*. As shown tile list items 1326*c* and 1326*f* incorporate down arrows 1329*b* and 1329*c* respectively. In some implementations, selecting down arrow 1329*b* or 1329*c* may expand list items 1326*c* and 1326*f* respectively.

Figure 13C:
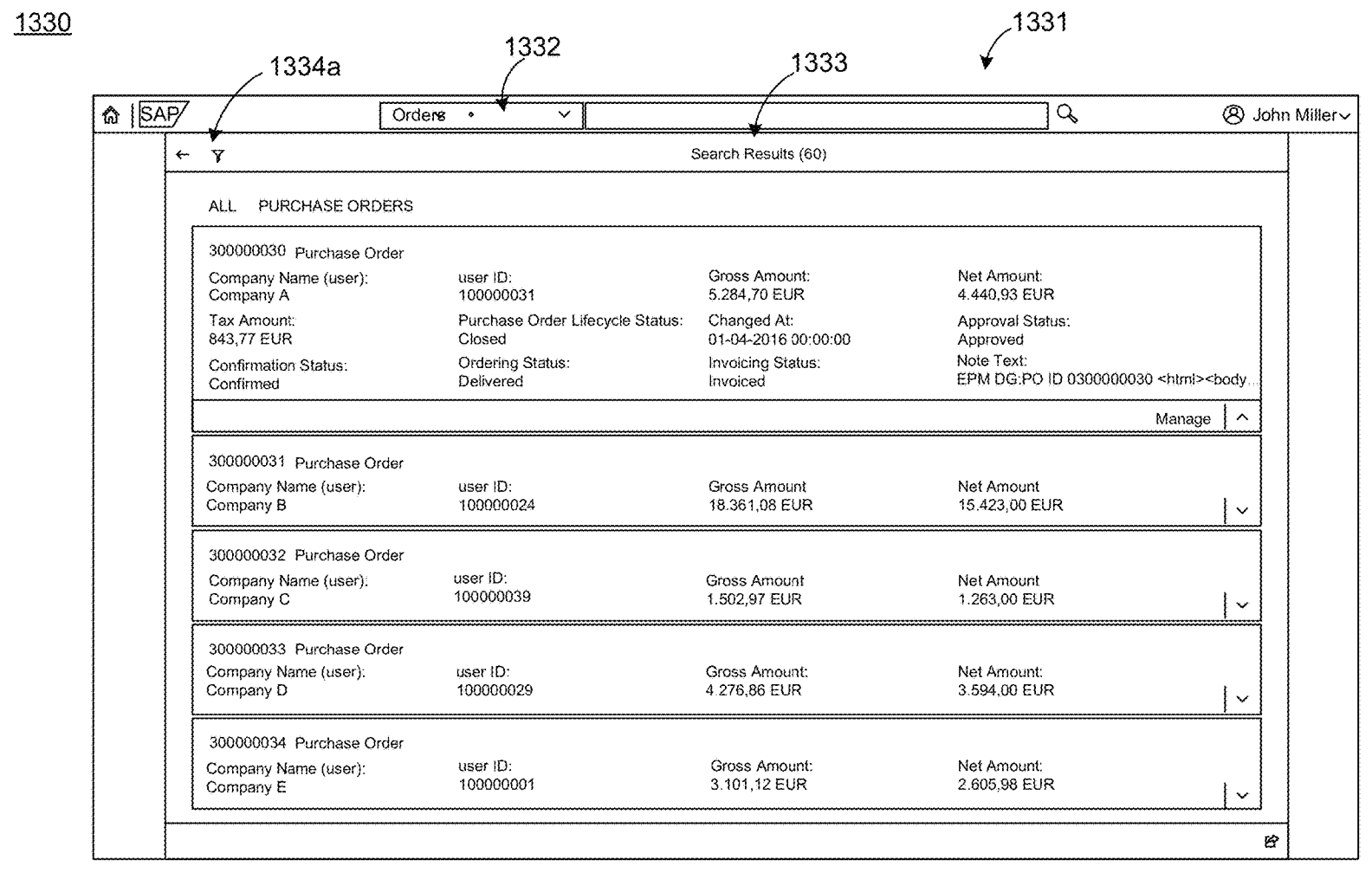

Referring to FIG. 13C, result list user interface 1330 and GUI screen 1331 shows an example of a launchpad enterprise search (LES) result for orders, as shown in type selector 1332 and an empty search field 1333 with the symbol (*) as was previously described in FIG. 13A. Selecting filter icon button 1334*a*, may cause a filter panel 1336 to open, for example on the left side of the screen as shown in GUI screen 1335, as illustrated in FIG. 13D.

Figure 13D:
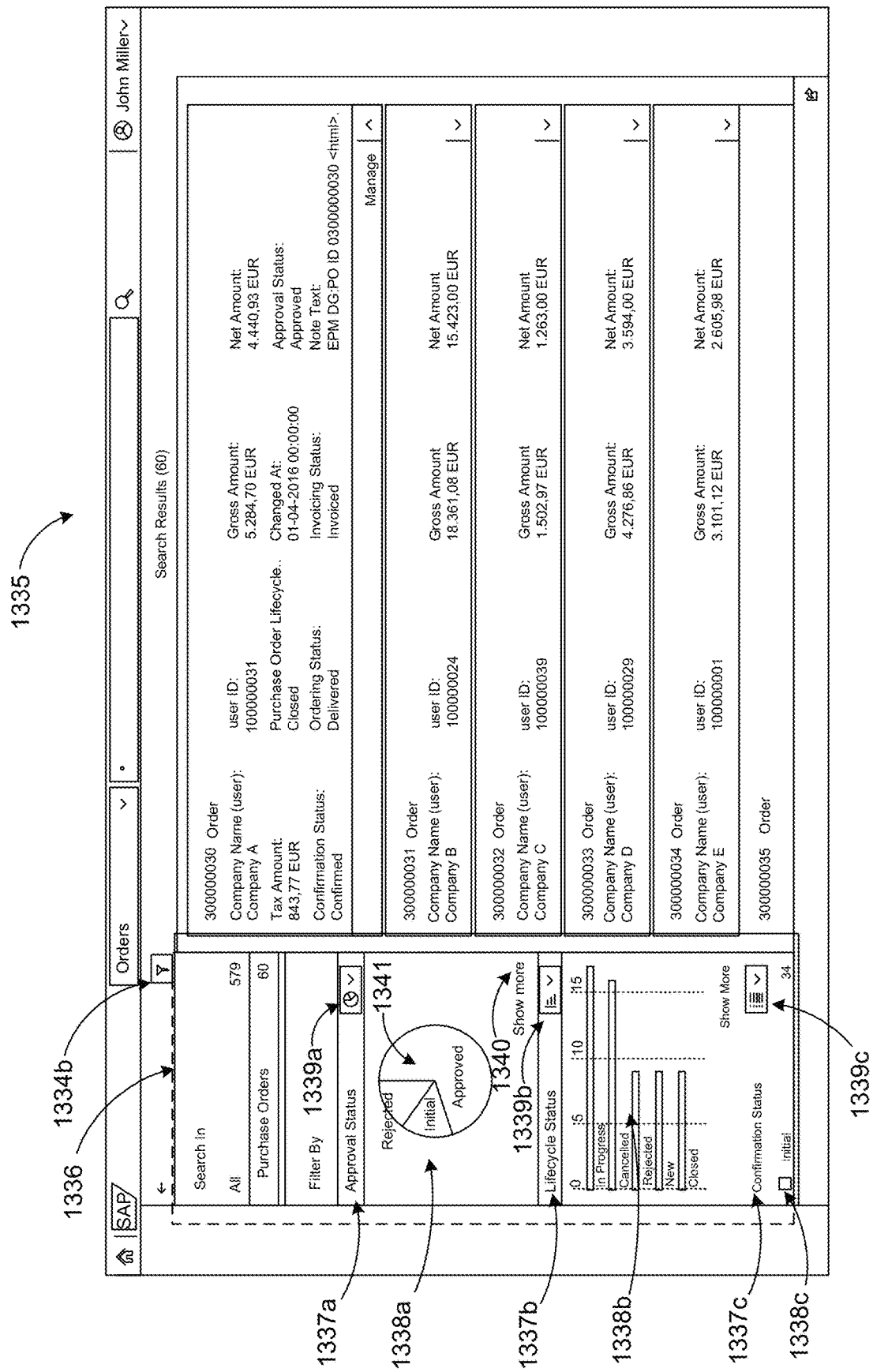

Referring to FIG. 13D, the GUI screen 1335 is depicted with additional options displayed. Selecting filter icon button 1334b may cause a filter panel 1336 to close as shown in GUI screen 1331. In some implementations, the filter pane 1336 may comprise of interconnected filter types, for example by Approval Status 1337a, Lifecycle Status 1337b, and by Confirmation Status 1337c. In some implementations, each filter type may display content and or data related to that filter type/context in text list, or various selectable data visualizations, e.g. charts, graphs, etc. as shown in 1338a-c. In some implementations, a user may select the type of visualization via selectors 1339a-c. In some implementations, a user may expand a filter type section by selecting a show more button 1340 to view additional filter details if available. In some implementations, as interconnected filter type graphics are selectable, a user may select, for example, the "Approved" pie chart sub-filter 1341 as is shown in a selected state in FIG. 13E at 1342.

In some implementations, as filter types are interconnected, making a change to one filter type may cause changes to one or more other filter types. In an example, as sub-filter for "Approved" orders has now been selected, the total number of order was decreased from 60 in GUI 1335 to 42 as indicated in FIG. 13E. Additionally, among other things, the bar graph 1338b for Lifecycle Status 1337b has been reduced by removing statuses new and rejected as these filter parameters are no longer selected and have been replaced by the newly selected "Approved" sub-filter parameter.

FIG. 13F shows example source code of an API for a getLinks service. FIG. 13G shows example source code of a click detection implementation for a get links service.

Figure 13H:
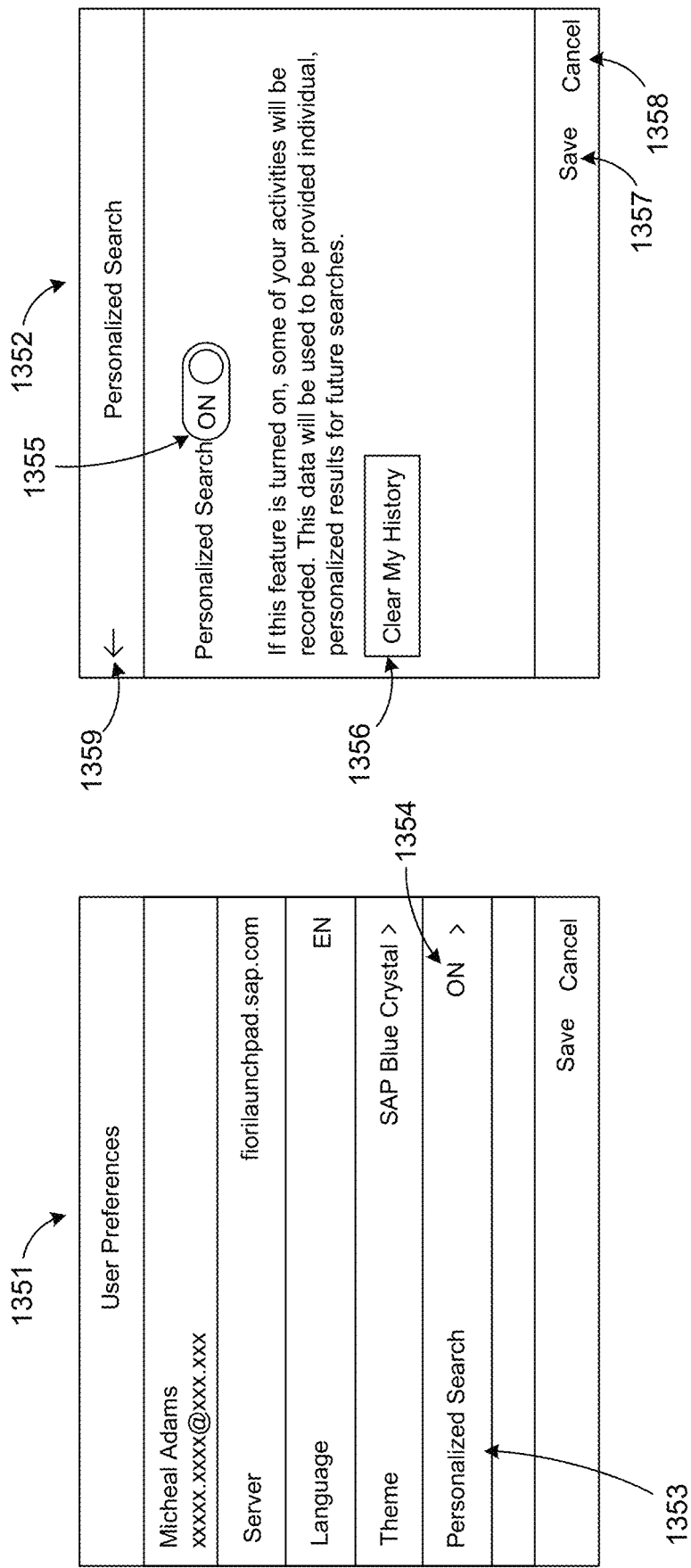
FIG. 13H depicts an example screenshot for setting user defined preferences.

FIG. 13H shows an example screenshot for setting user defined preferences. The preferences can be used to further refine the contextual awareness 106 (FIG. 1). As shown, these components are persistently interconnected to provide the contextual aspects of the launchpad 101 as related to the launchpad enterprise search, and all other contextual aspects of the overall system UX and user interface experience 102. In this regard, the launchpad system 101 components 102-115 are contextually integrated with the user experience and interface 102.

Referring to FIG. 13H, user interfaces 1351 and 1352 may include settings that a user can modify. User interface 1351 may be a general access point to a centralized settings area, (user preferences), whereby a user may select a personalized search 1353 listed item to navigated to user interface 1352. In some implementations, listed item 1353 may display the current selected parameter 1354 as shown in an "On" state. In some implementations, a user's selection of list item 1353 may navigate to user interface 1352 displaying parameters for a LES personalized search. While in user interface 1352, a user may turn on or off personalized search tracking using switch 1355 to suspend tracking functionality of Contextual Sensitive Usage Behavior Tracking. In some implementations, a user's selection of button 1356 may clear a recorded history of tracked activities associated with the user. In some implementations, selecting save button 1357 may save changes made to the personalized search setting parameters and close user interface 1352 thus navigating back to user interface 1351. Selecting the cancel button 1358 may not save changes made to user interface 1352 the personalized search setting parameters and close user interface 1352 thus navigating back to user interface 1351.

In some implementations, a back button 1359 may provide a back navigation to return to user interface 1351. For example, if the user made changes to the personalized search setting parameters contained in user interface 1352 then selected the back button 1359, a popup dialog (not shown) may be presented to inform the user that changes to settings are not saved, and provide additional button means to either save or not save changes, then navigating back to the user preferences user interface 1351.

Figure 13I:
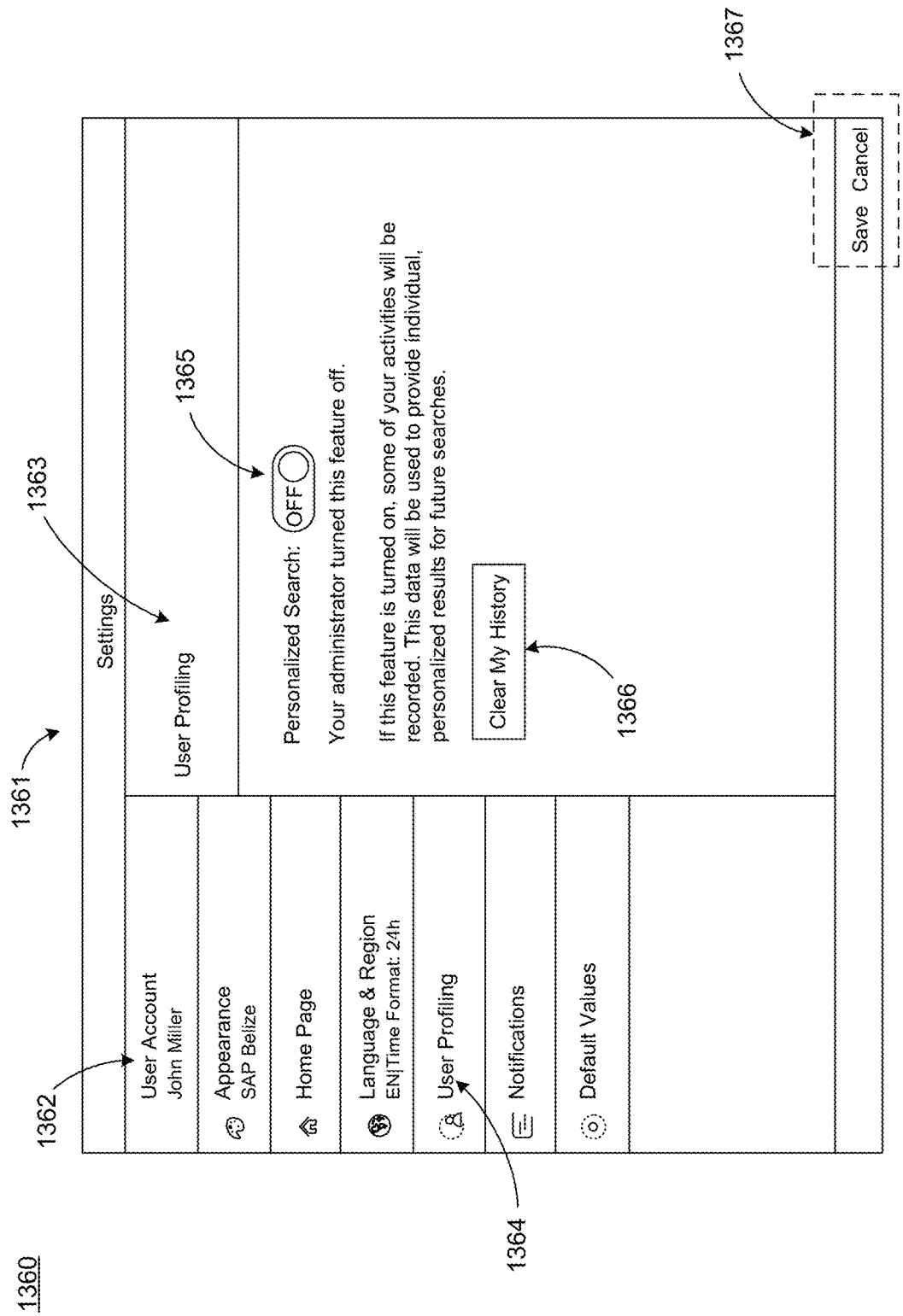
FIG. 13I depicts an example screenshot that provides an example personalized search user interface.

FIG. 13I depicts an example screenshot of a GUI 1360 that provides an alternative to the personalized search user interfaces 1351 and 1352 in FIG. 13H. In some implementations, GUI 1360 may be used as an improved user interface layout for large device screens for example a desktop computer or mobile tablet. In some implementations, user interface 1361 uses a split screen combining a settings list 1362 and a corresponding settings detail area 1363 as selected setting from the list 1362. In this case, the user profiling list item 1364 is shown as selected via a highlight together with the corresponding settings detail area 1363. In some implementations, the personalized search button 1365 is shown in an off state. The settings detail area 1363 deploys a clear my history button 1366 and a save and cancel buttons in area 1367.

The systems and methods described throughout this disclosure may provide a number of advantages. For example, the systems and methods described herein enable Apps and app instances to interoperate with each other in ways to minimize user navigation and operation, and readily access relative content without having to open an app instance and perform numerous disparate navigations and discrete screen views. In addition, individual apps can be generated to be focused on a particular work task that are part of a bundle of apps that perform similar tasks or different aspects of a domain. Apps can anticipate a user's context based on varying heuristics to make suggestions and provide easy access and selection of other relevant and related apps according to a user's work context. This can provide an advantage over systems that use multiple app UIs that provide explorative browser-type screens typically arranged in hierarchical fashions with a back and forward whereby users scroll through thousands of possibilities before discovering which apps are relevant to their current task.

The systems and methods described herein can provide a central area for accessing app settings, rather than having App Settings accessible from each individual app to minimize numerous navigations for a user to personalize their overall multi-app experience. In addition, in an environment that contains hundreds or even thousands of apps that users, administrators, or the system can make significant changes, a user is able to use the methods and systems described herein to keep track and be informed of this dynamically changing environment. The user interface dynamically provides feedback when the user or administrator make changes to user authorizations and apps in the Home Screen (e.g. Add a new app or remove an existing app), or when the system updates an app version, and when the user or administrator makes changes to authorizations, etc. There are feedback mechanisms to indicate or inform dynamic user and system changes. Relative contexts related to user roles and expertise are provided to configure apps to empower employees to do their job better, faster, and in a more deliberate way.

The systems and methods enable a means for users to personalize their Home Screen experience according to their role requirements that will automatically provide proposals for what a particular user would wish to view such proposals at a time and place that is convenient. In addition, a number of visualizations can be generated based on user role and can be readily viewable, at a glance. The visualizations may include live data that is relevant to a user's personal and professional daily activities, responsibilities and organizational accountabilities.

The systems and methods may also provide a mechanism to compare multiple app instances. A user can use such instances to view and compare data in a single screen view. In addition, a central interface may provide users with immediate and nimble ways to readily communicate, collaborate, initiate, or respond to colleagues, managers, and users across apps without leaving the context of their current activity or app instance. Instead of relying on email, IM, social media, fax, etc. for task related communications or collaborations, a user can utilize the system provided communication environment to share information and effectively collaborate. Thus, instead of exporting, scanning, printing, or generating screenshots of documents, a user can easily generate messages within the system. The messages can include content, visualizations, and/or messages that can be easily inserted from within the system.

The launchpad as described herein may provide a consistent navigation paradigm in a Single Point-Of-Entry (SPOE) experience for both newly implemented systems and legacy system apps. Both legacy and new system apps within the SPOE user interface (e.g., launchpad) enable a user to personalize (e.g. rearrange, reorganize, add, remove, hide, etc.) all apps according to desired access locations, hierarchies, visual design formats, etc. to configure a personal, and optimized operational experience according to a functional role associated with the user and a user-selected way of interacting with the user interface. In one example, the user interface is configured to enable legacy apps to be discoverable and searchable in a similar manor as discovering and searching new system apps.

In some implementations, legacy apps may be integrated into a particular environment, communication, notification, and collaboration infrastructures associated with the launchpad. In some implementation, launching legacy apps is implemented in the launchpad environment. In some implementations, particular application programming interfaces (APIs) are used to conform to a new system ability to access and/or extract objects and corresponding backend system data within the system environments described herein.

Figure 14:
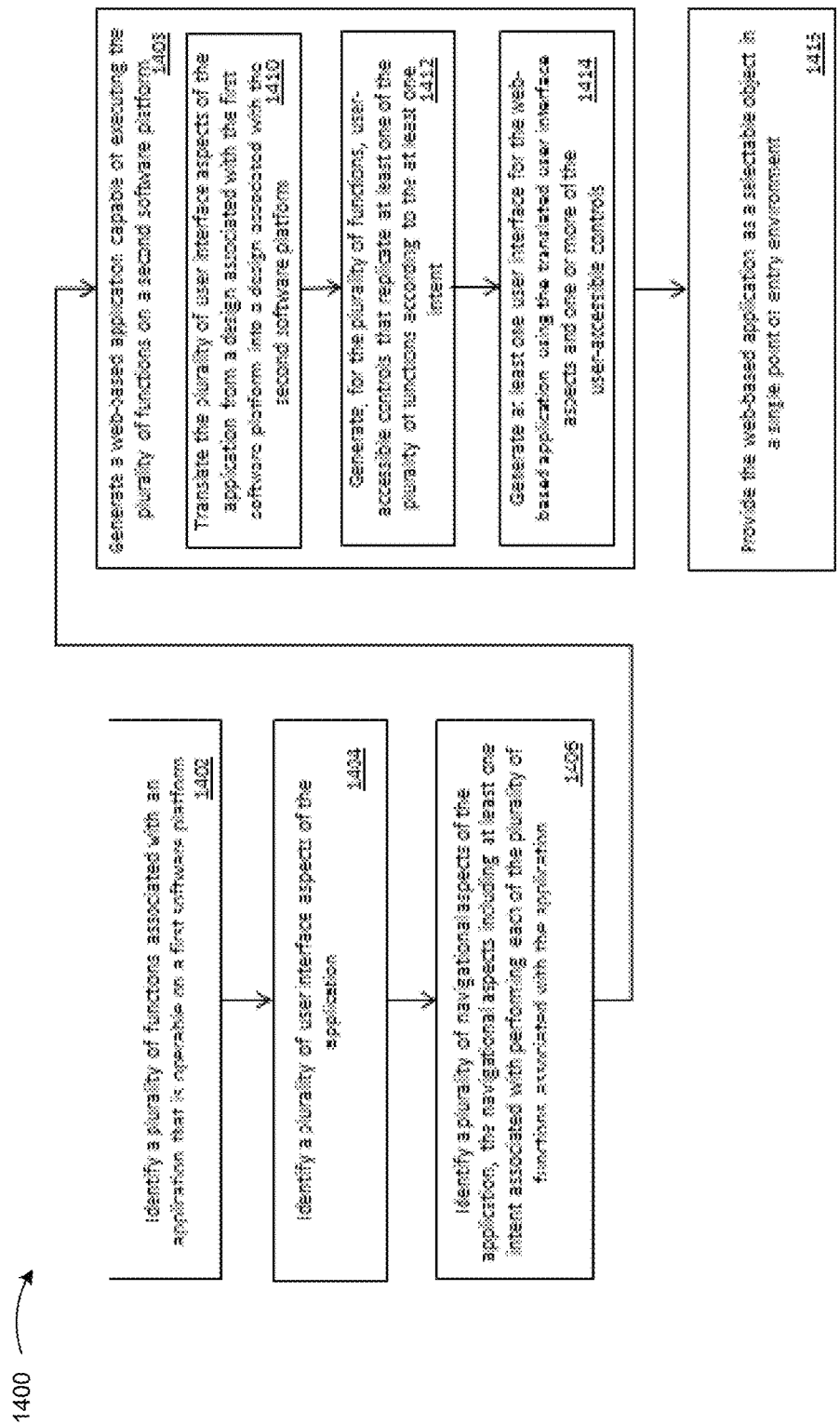
FIG. 14 is an illustration of an example process for generating a web-based application, in accordance with the principles of the present disclosure.

FIG. 14 is an illustration of an example process 1400 for generating a web-based application, in accordance with the principles of the present disclosure. In some implementations, generating the web-based application includes generating a reformatted user interface that provides access to a legacy app or platform, for example. The process 1400 can be carried out using any combination of system 100, system 630, system 700, and/or system 800. For example, a front end server 802 may obtain and/or identify any number of legacy applications that may be re-cast into an application that may have a similar look and feel to a SAP Fiori® application. That is, the front end server can identify one or more applications for recasting (e.g., conversion) into an application that may be accessed, utilized and modified in a launchpad environment.

The launchpad is executed using a runtime environment that provides a technical foundation by which all native launchpad and legacy apps contained in the launchpad run and are functionally integrated (e.g. navigation, search, cross-app data access, actionable notifications, contextual system awareness, etc.) to act as one system. The launchpad provides a home screen launch area, but also ensures seamless interoperability across all apps, consistent app navigations, and access/display of live app data from any app to any app, as also may be referred to as cross-app integration.

In some implementations, the legacy apps and platform integration module 108 may provide user experience harmonization that focuses on the visual and internal app interaction experience of a legacy app or platform. As it is possible that legacy apps and platforms may run many multiple disparate user interface frameworks, tools, visual design, control libraries, backend bindings, etc., applying harmonization may be achieved in different ways depending on the legacy application/system. In one embodiment, an additional harmonized user interface layer may be implemented that sits on top of an existing legacy user interface framework without the modifying or removing an existing legacy user interface framework.

Once a legacy application is identified, the method may include identifying a plurality of functions associated with an application that is operable on a first software platform, at block 1402. The first software platform may pertain to a legacy application infrastructure/platform/architecture, etc. For example, the module 108 may identify functionality associated with the legacy application. Such functionality may include controls, underlying navigation, stored data, communication means, etc. The functionality/functions may be identified for purposes of mimicking the functionality/function in an SAP Fiori® architecture and/or application, for example.

At block 1404, the process 1400 may include identifying a plurality of user interface aspects of the application. In some implementations, the plurality of user interface aspects include visual application content and functional application content of the application operable on the first software platform. Such aspects may include font, color, spacing, component and element layouts, theme color palette, highlight colors, etc. The aspects can be identified in order to provide look and feel of one type of application (e.g., an SAP Fiori® application) while maintaining proper legacy functionality. In some implementations, a look and feel of the user interface may be described using user interface aspects.

At block 1406, the process 1400 may include identifying a plurality of navigational aspects of the application. The navigational aspects may include at least one intent associated with performing each of the plurality of functions associated with the application. For example, each function may have an underlying navigation intent that indicates what the function wishes to accomplish. Upon starting a navigation, the source (legacy) application communicates the intent of a navigation to the launchpad, rather than communicate an explicit target application. The launchpad may then perform a lookup in its repository and start the application matching the requested intent. An example embodiment of one such a mapping schema from a first browser tab 1002 to a second browser tab 1004, shown in FIG. 10.

At block 1408, the process 1400 may include generating a reformatted user interface (e.g., a web-based application) capable of executing the plurality of functions on a second software platform. The second software platform may pertain to SAP Fiori architecture in a web/cloud platform. At block 1410, generating the reformatted user interface may include translating the plurality of user interface aspects of the application from a design associated with the first software platform into a design associated with the second software platform. For example, the module 108 may translate a legacy application layout into a layout likened to SAP Fiori® application look, for example, to provide an experience similar to other SAP Fiori® applications.

In some implementations, translating the plurality of user interface aspects of the application from a design associated with the first software platform into a design associated with the second software platform includes modifying the plurality of user interface aspects to include a harmonized visual appearance that is cohesive and consistent with the second software platform.

At block 1412, the process 1400 may include generating, for the plurality of functions, user-accessible controls that replicate at least one of the plurality of functions according to the at least one intent. For example, the module 108 may generate one or more controls (e.g., links) to ensure that the functions of the application can be ported and usable on the second platform. The user-accessible controls may be links, selectable dropdown boxes, radial dials, buttons, text entry areas, tiles, icons, messaging controls, etc.

At block 1414, the process 1400 may also include generating at least one user interface for the reformatted user interface (e.g., web-based application) using the translated user interface aspects and one or more of the user-accessible controls. For example, the user interface may include a number of aspects from the application executable on the first platform with the updated look and integration of an application executable on the second platform.

At block 1416, the process 1400 may include providing the reformatted user interface (e.g., web-based application) as a selectable object in a single point of entry environment. For example, the web-based application may be operable to provide the at least one user interface and one or more user-accessible controls to a user accessing the single point of entry environment (e.g., launchpad).

In some implementations, the application executable on the first platform includes a legacy application and the reformatted user interface (e.g., web-based application) is generated to replace the legacy application while maintaining functionality of the plurality of functions within the single point of entry environment. In some implementations, the first software platform includes an object based navigation platform and the second software platform includes an intent-based navigation platform.

In some implementations, the navigational aspects of the application invoke execution of a search performed on the second software platform. The search may be performed to match the at least one intent to a predefined data store of intents. The predefined data store of intents may be accessible on the front end server 802, for example. The at least one intent may be defined by a semantic object, an action to be performed using the semantic object, and a plurality of parameters for executing the application. In some implementations, the semantic object may represent an entity (e.g., user, cost center, order, etc.). The action may represent a process or function that shall be done with the semantic object (e.g. display, edit, create . . . ). The parameters may contain all further information (e.g. the user id, the cost center number, etc.) for instantiating a target application (e.g., the web-based application).

In some implementations, generating user-accessible controls that replicate at least one of the plurality of functions according to the at least one intent includes extracting, for each of the plurality of functions, one or more control types, behaviors, and functionalities and mapping the one or more control types, behaviors, and functionalities to at least one of the user-accessible controls. For example, a navigation intent associated with the application (e.g., a legacy application) can be mapped to a navigation link in the web-enabled application.

Various modifications, however, will remain readily apparent to those of ordinary skill in the art of enterprise software. The various systems and techniques described herein may be implemented in digital electronic circuitry, or in computer hardware, firmware, software, or in combinations of them. The various techniques may implemented as a computer program product, i.e., a computer program tangibly embodied in an information carrier, e.g., in a machine readable non-transitory storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory may be supplemented by, or incorporated in special purpose logic circuitry.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

What is claimed is:

1. A computer-implemented method, the method comprising:

identifying a plurality of functions of a legacy application executable on a first software platform, wherein the legacy application was generated prior to the availability of a second software platform;

identifying a plurality of graphical user interface aspects of the legacy application;

identifying a plurality of navigational aspects of the legacy application, the navigational aspects including at least one identifier associated with performing each of the plurality of functions of the legacy application; and generating a translated user interface for the legacy application, the translated user interface allowing execution of the plurality of functions of the legacy application on the second software platform, the generating including:

translating the plurality of user interface aspects of the legacy application from an architecture associated with the first software platform into an architecture associated with the second software platform, wherein translating comprises modifying the plurality of user interface aspects to include a harmonized visual appearance that is consistent with the second software platform;

generating, for the plurality of functions and based on the at least one identifier, user-accessible controls for executing one or more of the plurality of functions on the second software platform;

generating at least one functional user interface for the second software platform using, the translated user interface aspects, and one or more of the user-accessible controls; and triggering display of the at least one functional user interface executing on the second software platform, in response to receiving a request to access the legacy application within a single point of entry environment associated with the second software platform.

2. The method of claim 1, wherein the translated user interface for the legacy application is generated to replace the legacy application while maintaining functionality of the plurality of functions of the legacy application within the single point of entry environment.

3. The method of claim 1, wherein the first software platform comprises an object based navigation platform and the second software platform comprises an intent-based navigation platform.

4. The method of claim 1, further comprising: providing the translated user interface as a selectable object in the single point of entry environment, the translated user interface providing the at least one user interface and one or more user-accessible controls.

5. The method of claim 1, wherein the navigational aspects of the legacy application invoke execution of a search performed on the second software platform, the search being performed to match the at least one identifier to a predefined data store of identifiers, the at least one identifier being defined by a plurality of parameters for executing the legacy application.

6. The method of claim 1, wherein generating user-accessible controls that replicate at least one of the plurality of functions comprises:

extracting, for each of the plurality of functions, one or more control types, behaviors, and functionalities; and mapping the one or more control types, behaviors, and functionalities to at least one of the user-accessible controls.

7. A system for launching a plurality of applications on a client computing device, the system comprising:

a scripting engine accessing at least one processor;

memory storing instructions that, when executed by the at least one processor, cause the system to perform operations including, identifying a plurality of functions of a legacy application executable on a first software platform, wherein the legacy application was generated prior to the availability of a second software platform;

identifying a plurality of graphical user interface aspects of the legacy application;

identifying a plurality of navigational aspects of the legacy application, the navigational aspects including at least one identifier associated with performing each of the plurality of functions of the legacy application; and generating a translated user interface for the legacy application, the reformatted user interface allowing execution of the plurality of functions of the legacy application on the second software platform, the generating including;

translating the plurality of user interface aspects of the legacy application from an architecture associated with the first software platform into an architecture associated with the second software platform wherein translating comprises modifying the plurality of user interface aspects to include a harmonized visual appearance that is consistent with the second software platform;

generating, for the plurality of functions and based on the at least one identifier, user-accessible controls for executing one or more of the plurality of functions on the second software platform;

generating at least one functional user interface for the second software platform using, the translated user interface aspects, and one or more of the user-accessible controls; and triggering display of the at least one functional user interface executing on the second software platform, in response to receiving a request to access the legacy application within a single point of entry environment associated with the second software platform.

8. The system of claim 7, wherein the translated user interface for the legacy application is generated to replace the legacy application while maintaining functionality of the plurality of functions of the legacy application within the single point of entry environment.

9. The system of claim 7, wherein the plurality of user interface aspects comprise visual application content and functional application content of the legacy application executable on the first software platform.

10. The system of claim 7, wherein the navigational aspects of the legacy application invoke execution of a search performed on the second software platform, the search being performed to match the at least one intent to a predefined data store of intents, the at least one intent being defined by a semantic object, an action to be performed using the semantic object, and a plurality of parameters for executing the legacy application.

11. The system of claim 7, wherein generating user-accessible controls that replicate at least one of the plurality of functions according to the at least one intent comprises:

extracting, for each of the plurality of functions, one or more control types, behaviors, and functionalities; and mapping the one or more control types, behaviors, and functionalities to at least one of the user-accessible controls.

12. A computer program product tangibly embodied on a non-transitory computer-readable storage medium and comprising instructions that, when executed by at least one computing device, are configured to cause the at least one computing device to:

identify a plurality of functions of a legacy application executable on a first software platform, wherein the legacy application was generated prior to the availability of a second software platform;

identify a plurality of graphical user interface aspects of the legacy application;

identify a plurality of navigational aspects of the legacy application, the navigational aspects including at least one identifier associated with performing each of the plurality of functions of the legacy application; and generate a translated user interface for the legacy application, the translated user interface allowing execution of the plurality of functions of the legacy application on a second software platform, the generating including;

translating the plurality of user interface aspects of the legacy application from an architecture associated with the first software platform into an architecture associated with the second software platform, wherein translating comprises modifying the plurality of user interface aspects to include a harmonized visual appearance that is consistent with the second software platform;

generating, for the plurality of functions and based on the at least one identifier, user-accessible controls for executing one or more of the plurality of functions on the second software platform;

generating at least one functional user interface for the second software platform using, the translated user interface aspects, and one or more of the user-accessible controls; and triggering display of the at least one functional user interface executing on the second software platform, in response to receiving a request to access the legacy application within a single point of entry environment associated with the second software platform.

13. The computer program product of claim 12, wherein the translated user interface for the legacy application is generated to replace the legacy application while maintaining functionality of the plurality of functions of the legacy application within the single point of entry environment.

14. The computer program product of claim 12, wherein the first software platform comprises an object based navigation platform and the second software platform comprises an intent-based navigation platform.

15. The computer program product of claim 12, wherein the plurality of user interface aspects comprise visual application content and functional application content of the legacy application executable on the first software platform.

16. The computer program product of claim 12, wherein the navigational aspects of the legacy application invoke execution of a search performed on the second software platform, the search being performed to match the at least one intent to a predefined data store of intents, the at least one intent being defined by a semantic object, an action to be performed using the semantic object, and a plurality of parameters for executing the legacy application.

17. The computer program product of claim 12, wherein generating user-accessible controls that replicate at least one of the plurality of functions according to the at least one intent comprises:

extracting, for each of the plurality of functions, one or more control types, behaviors, and functionalities; and mapping the one or more control types, behaviors, and functionalities to at least one of the user-accessible controls.

* * * * *